(12) United States Patent
Kinamon et al.

(10) Patent No.: US 11,637,612 B2
(45) Date of Patent: Apr. 25, 2023

(54) MACRO-DIVERSITY USING HYBRID TRANSMISSIONS VIA TWISTED PAIRS

(71) Applicant: Cellium Technologies, Ltd., Tel Aviv (IL)

(72) Inventors: Roy Kinamon, Tel Aviv (IL); Gal Zuckerman, Holon (IL); Oz Liv, Tel Aviv (IL)

(73) Assignee: Cellium Technologies, LTD., Tel Aviv (IL)

( * ) Notice: Subject to any disclaimer, the term of this patent is extended or adjusted under 35 U.S.C. 154(b) by 0 days.

(21) Appl. No.: 17/651,953

(22) Filed: Feb. 22, 2022

(65) Prior Publication Data

US 2022/0182124 A1 Jun. 9, 2022

Related U.S. Application Data

(63) Continuation-in-part of application No. 16/539,514, filed on Aug. 13, 2019, now Pat. No. 11,303,346, (Continued)

(51) Int. Cl.
*H04B 7/06* (2006.01)
*H04L 5/00* (2006.01)
(Continued)

(52) U.S. Cl.
CPC ......... *H04B 7/0697* (2013.01); *H04B 7/0413* (2013.01); *H04B 7/06* (2013.01);
(Continued)

(58) Field of Classification Search
CPC ...... H04B 7/0697; H04B 7/0413; H04B 7/06; H04B 10/114; H04B 10/1149; H04B 10/25; H04B 10/40; H04L 5/00; H04L 5/0032
See application file for complete search history.

(56) References Cited

U.S. PATENT DOCUMENTS 5,809,395 A 9/1998 Hamilton-Piercy et al.
5,867,763 A 3/1999 Dean et al.
(Continued)

OTHER PUBLICATIONS

S. Lipoff, "Personal Communications Services and Cable TV", 1992, pp. 22-25, IEEE.
(Continued)

*Primary Examiner* — Rahel Guarino
(74) *Attorney, Agent, or Firm* — Intrinsic Law Corp.

(57) ABSTRACT

An orthogonal frequency-division multiplexing (OFDM) base station operative to transmit a sequence of spatially multiplexed OFDM signals simultaneously using at least two separate twisted pairs, in which each of the OFDM signals is modulated by a plurality of sub-carriers. At least two converters are connected to the OFDM base station using the at least two twisted pairs, respectively, in which each of the converters, and simultaneously with the other converters, is configured to receive each of the OFDM signals from the OFDM base station using the respective twisted pair, up-convert the OFDM signal into a radio-frequency (RF) band, and re-transmit wirelessly the OFDM signal, in conjunction with the RF band, from at least one antenna associated with each converter, thereby together creating a macro-diversity effect in conjunction with the spatially multiplexed OFDM signals.

17 Claims, 44 Drawing Sheets

Related U.S. Application Data which is a continuation-in-part of application No. 16/149,768, filed on Oct. 2, 2018, now Pat. No. 10,484,074, which is a continuation-in-part of application No. 15/941,873, filed on Mar. 30, 2018, now Pat. No. 10,148,336, which is a continuation of application No. 15/894,182, filed on Feb. 12, 2018, now Pat. No. 10,177,832, which is a continuation-in-part of application No. 15/244,306, filed on Aug. 23, 2016, now Pat. No. 10,027,374.

(60) Provisional application No. 62/209,404, filed on Aug. 25, 2015.

(51) Int. Cl.
   *H04B 10/25* (2013.01)
   *H04B 10/114* (2013.01)
   *H04B 7/0413* (2017.01)
   *H04B 10/40* (2013.01)

(52) U.S. Cl.
   CPC ....... *H04B 10/114* (2013.01); *H04B 10/1149* (2013.01); *H04B 10/25* (2013.01); *H04B 10/40* (2013.01); *H04L 5/00* (2013.01); *H04L 5/0032* (2013.01)

(56) References Cited

U.S. PATENT DOCUMENTS

| | | |
|---|---|---|
| 6,005,884 A | 12/1999 | Cook et al. |
| 6,052,085 A | 4/2000 | Hanson et al. |
| 6,160,800 A | 12/2000 | Atsuta |
| 6,594,827 B1 | 7/2003 | Pennings |
| 6,665,279 B1 | 12/2003 | Kwak et al. |
| 6,967,943 B1 | 11/2005 | Hämäläinen et al. |
| 7,002,934 B2 | 1/2006 | Dolgonos et al. |
| 7,315,586 B2 | 1/2008 | Jalloul et al. |
| 7,376,130 B2 | 5/2008 | Farmwald |
| 7,463,905 B1 | 12/2008 | Smiley et al. |
| 7,710,907 B2 | 5/2010 | Mahany |
| 7,787,416 B2 | 8/2010 | Gidwani |
| 7,813,738 B2 | 10/2010 | Shpak |
| 7,962,174 B2 | 6/2011 | Lipowski et al. |
| 9,037,094 B2 | 5/2015 | Moshfeghi |
| 9,179,495 B1 | 11/2015 | Scherzer et al. |
| 9,240,866 B2 | 1/2016 | Petrov |
| 9,319,257 B2 | 4/2016 | Campos et al. |
| 9,380,636 B2 | 6/2016 | Lu et al. |
| 9,385,907 B2 | 7/2016 | bin Mohd Yussof et al. |
| 9,602,176 B2 | 3/2017 | Schmid et al. |
| 9,819,403 B2 | 11/2017 | Forenza et al. |
| 2002/0048071 A1 | 4/2002 | Suzuki et al. |
| 2002/0137464 A1 | 9/2002 | Dolgonos et al. |
| 2002/0145988 A1 | 10/2002 | Dahlman et al. |
| 2002/0147978 A1 | 10/2002 | Dolgonos et al. |
| 2003/0072055 A1 | 4/2003 | Mickelsson et al. |
| 2003/0138029 A1 | 7/2003 | Gerard |
| 2003/0161637 A1 | 8/2003 | Yamamoto et al. |
| 2004/0053602 A1 | 3/2004 | Wurzburg |
| 2004/0146072 A1 | 7/2004 | Farmwald |
| 2004/0166869 A1 | 8/2004 | Laroia et al. |
| 2004/0264683 A1 | 12/2004 | Bye |
| 2005/0013379 A1 | 1/2005 | Duvaut et al. |
| 2005/0232223 A1 | 10/2005 | Muller |
| 2006/0063494 A1 | 3/2006 | Zhang et al. |
| 2006/0182076 A1 | 8/2006 | Wang |
| 2006/0270431 A1 | 11/2006 | Yoshi |
| 2007/0002796 A1 | 1/2007 | Horn et al. |
| 2007/0070959 A1 | 3/2007 | Almeroth et al. |
| 2007/0077968 A1 | 4/2007 | Kuzminskiy |
| 2007/0121546 A1 | 5/2007 | Zuckerman et al. |
| 2007/0155323 A1 | 7/2007 | Matsumoto et al. |
| 2007/0285308 A1 | 12/2007 | Bauregger et al. |
| 2008/0186881 A1 | 8/2008 | Ahl et al. |
| 2009/0115658 A1 | 5/2009 | Zimmerman et al. |
| 2009/0124214 A1 | 5/2009 | Zhang et al. |
| 2010/0099451 A1 | 4/2010 | Saban et al. |
| 2010/0202557 A1 | 8/2010 | Harris |
| 2011/0200030 A1 | 8/2011 | Noh et al. |
| 2011/0201368 A1 | 8/2011 | Faccin et al. |
| 2012/0057508 A1 | 3/2012 | Moslifeghi |
| 2012/0307917 A1 | 12/2012 | Goldhamer |
| 2012/0327879 A1 | 12/2012 | Stadelmeier et al. |
| 2013/0058281 A1 | 3/2013 | Berlin et al. |
| 2013/0170569 A1 | 7/2013 | Karabinis |
| 2013/0195467 A1 | 8/2013 | Schmid et al. |
| 2014/0219255 A1 | 8/2014 | Eyuboglu et al. |
| 2014/0226698 A1 | 8/2014 | Negus et al. |
| 2015/0003350 A1* | 1/2015 | Yu .............. H04B 7/0452 370/329 |
| 2015/0055729 A1 | 2/2015 | Karabinis |
| 2015/0146813 A1 | 5/2015 | Petrov |
| 2015/0341200 A1 | 11/2015 | Bin Mohd Yussof et al. |
| 2016/0013855 A1 | 1/2016 | Campos et al. |
| 2016/0088473 A1 | 3/2016 | Feher |
| 2016/0135184 A1 | 5/2016 | Zavadsky et al. |
| 2016/0164647 A1 | 6/2016 | Agee et al. |
| 2016/0302088 A1 | 10/2016 | Eyuboglu et al. |
| 2016/0329631 A1 | 11/2016 | Rheinfelder et al. |
| 2017/0195015 A1 | 7/2017 | Schmid et al. |
| 2017/0317987 A1 | 11/2017 | Vijayasankar et al. |
| 2017/0353214 A1 | 12/2017 | Lins de Medeiros et al. |
| 2018/0034556 A1 | 2/2018 | Willner et al. |
| 2018/0152923 A1 | 5/2018 | Xiong et al. |

OTHER PUBLICATIONS

R.W. Donaldson et al., "Wireless CATV Network Access for Personal Communications Using Simulcasting", IEEE Transactions on Vehicular Technology, Aug. 1994, pp. 666-671, vol. 43, No. 3, IEEE.

A.S Beasley, "The Advantages of Using Cable TV Distribution Plant for Linking PCS-Microcells", 1992, pp. 292-295, IEEE.

* cited by examiner

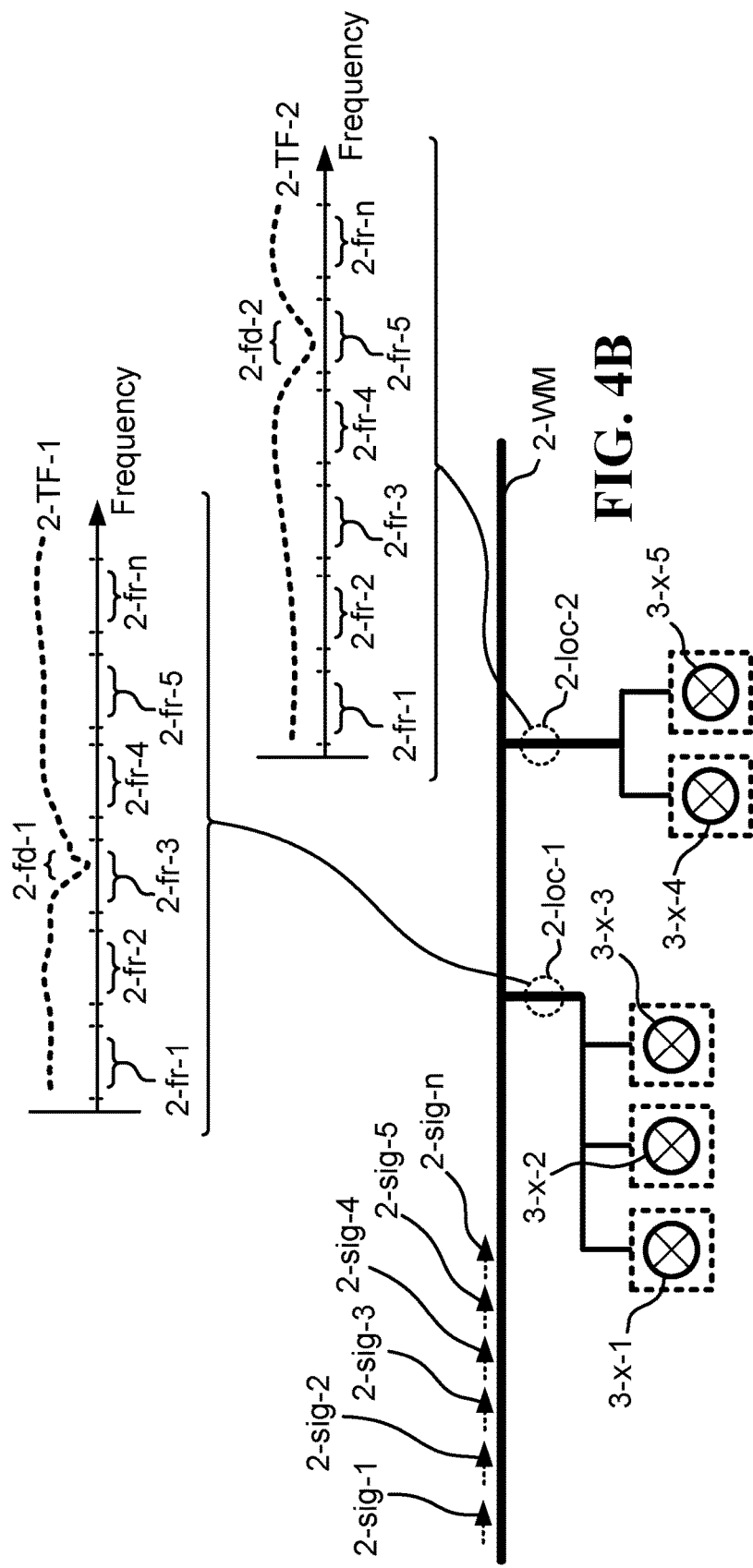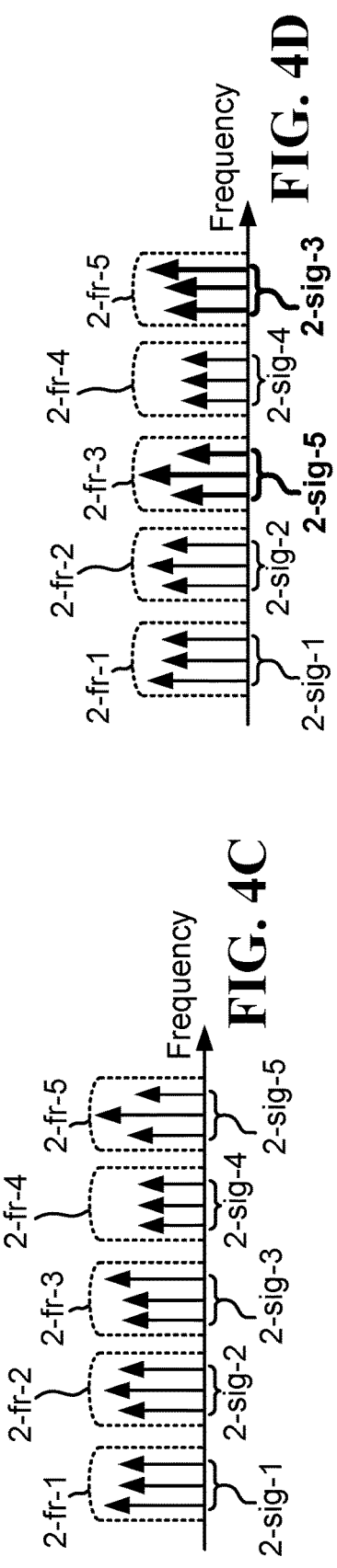

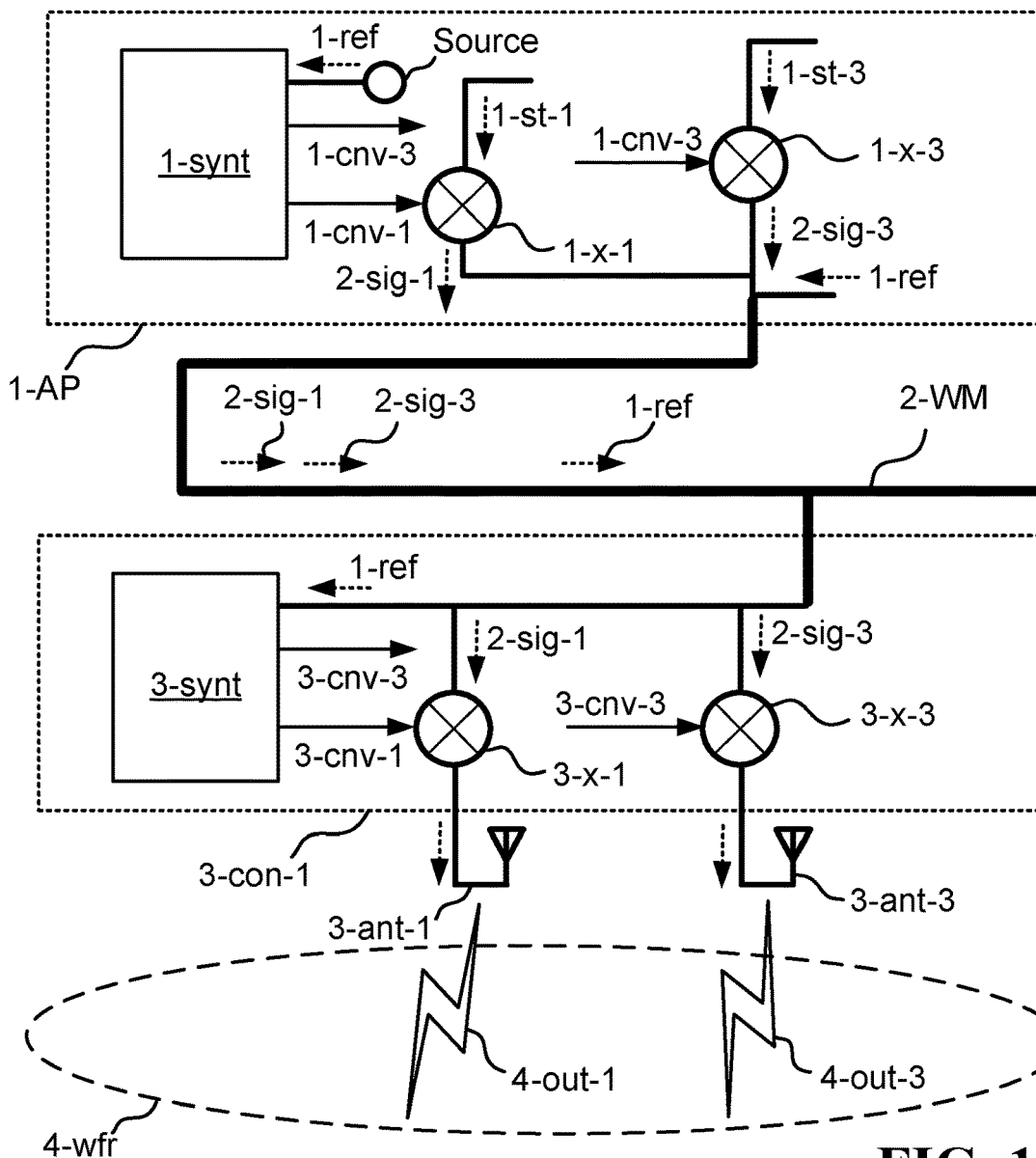
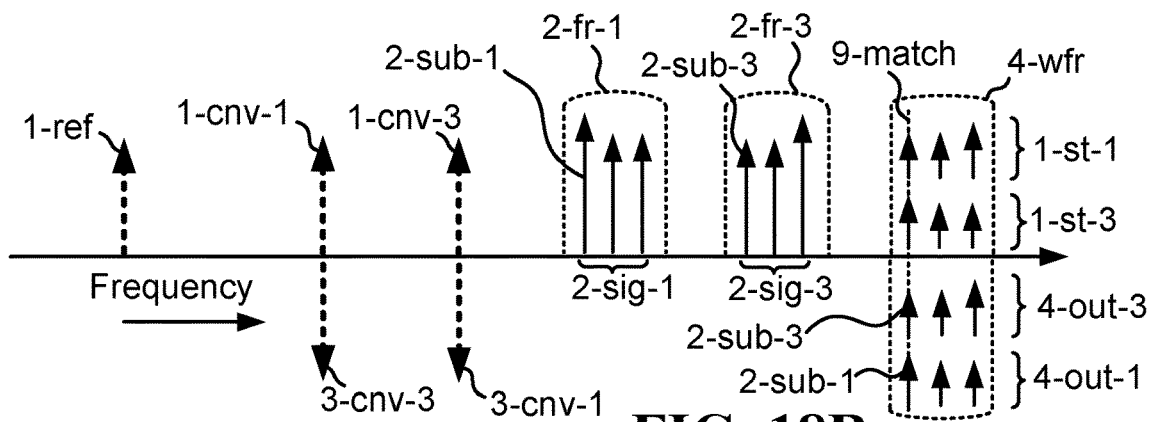
FIG. 18A
FIG. 18B

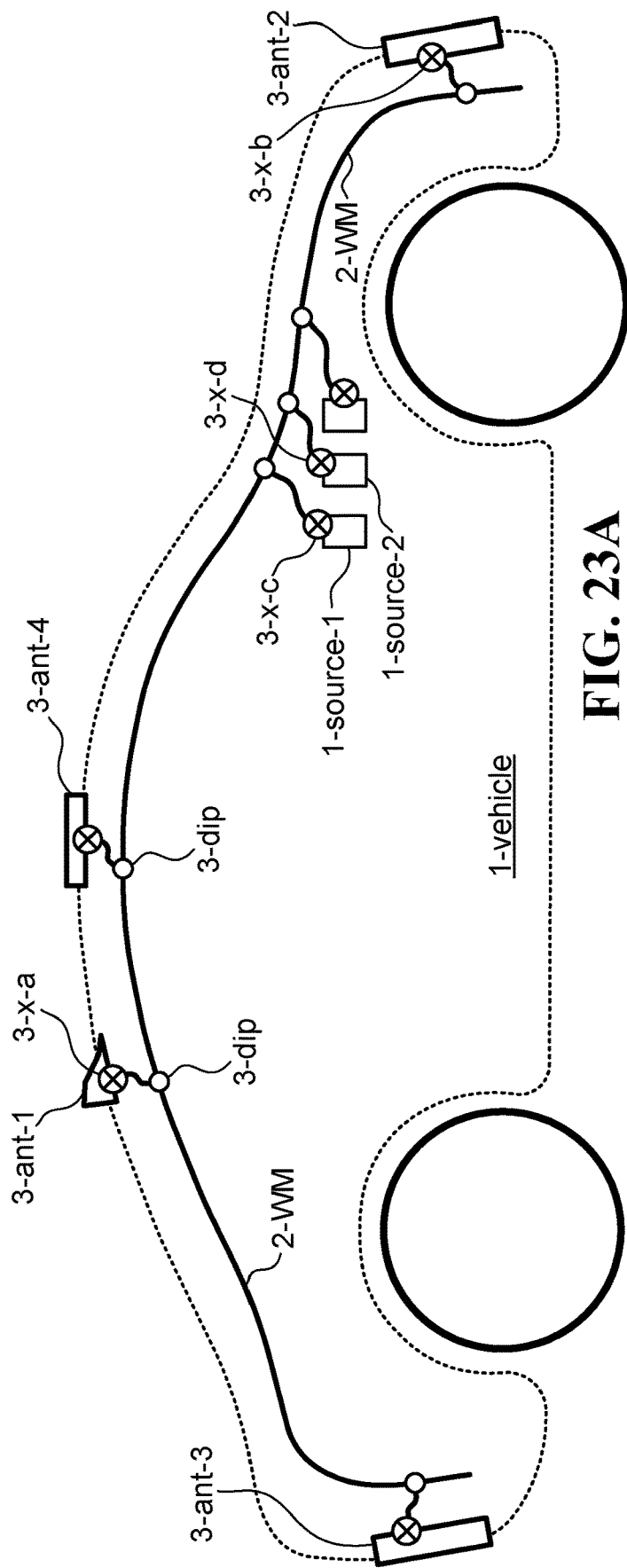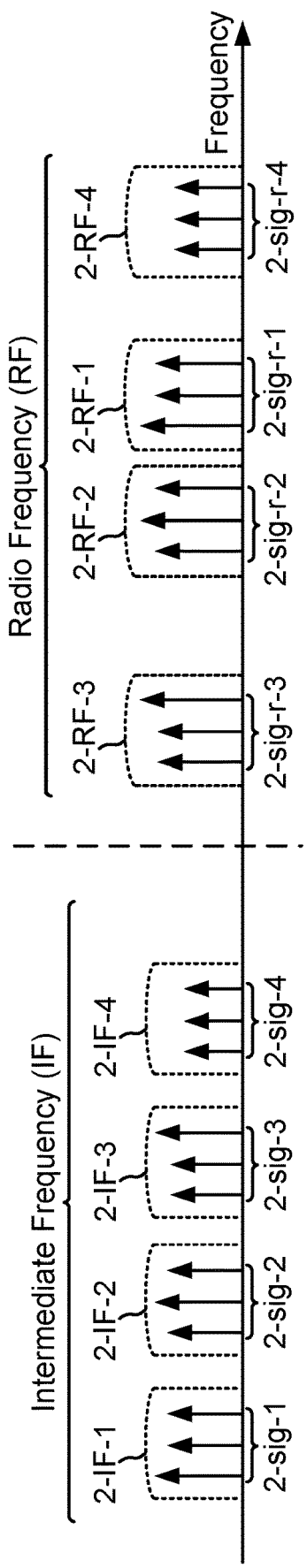
FIG. 23A
FIG. 23B

MACRO-DIVERSITY USING HYBRID TRANSMISSIONS VIA TWISTED PAIRS

CROSS-REFERENCE TO RELATED APPLICATIONS

This application is a continuation-in-part of U.S. patent application Ser. No. 16/539,514, titled "Systems and Methods for Transporting Signals Inside Vehicles," filed on Aug. 13, 2019, which is a continuation-in-part of U.S. patent application Ser. No. 16/149,768, now U.S. Pat. No. 10,484,074, titled "Systems and Methods For Maximizing Data Transmission Rates in Conjunction with a Spatial-Multiplexing Transmission," filed on Oct. 2, 2018, which is a continuation-in-part of U.S. patent application Ser. No. 15/941,873, now U.S. Pat. No. 10,148,336, titled "Systems and Methods for Using Spatial Multiplexing in Conjunction with a Multi-Conductor Cable," filed on Mar. 30, 2018, which is a continuation of U.S. patent application Ser. No. 15/894,182, now U.S. Pat. No. 10,177,832, titled "Using a Coaxial Cable for Distributing MIMO Signals In-House," filed on Feb. 12, 2018, which is a continuation-in-part of U.S. patent application Ser. No. 15/244,306, now U.S. Pat. No. 10,027,374, titled "Systems and Methods for Wireless Communication Using a Wire-Based Medium," filed on Aug. 23, 2016, which claims priority to U.S. Provisional Application No. 62/209,404, titled "Systems and Methods for Wireless Communication Using a Wire-Based Medium," filed on Aug. 25, 2015.

TECHNICAL FIELD

The present application relates generally to the field of wireless communication.

BACKGROUND

Wireless communication with mobile devices may be adversely affected by signal fading, multi-path, electromagnetic wave propagation through walls, and other such phenomena. Needed are methods and systems to better facilitate wireless communication.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a method for improving reception using macro-diversity transmissions, comprising: converting a plurality of streams associated with spatial multiplexing into a plurality of intermediary frequency (IF) signals; transmitting the plurality of IF signals at least twice: a first time respectively over a plurality of conductors belonging to a first multi-conductor cable reaching a first location, and a second time respectively over a plurality of conductors belonging to a second multi-conductor cable reaching a second location; shifting, at the first location, the plurality of IF signals respectively into a first plurality of output signals each occupying a single wireless frequency range, and transmitting the first plurality of output signals respectively over a first plurality of antennas; and shifting, at the second location, the plurality of IF signals respectively into a second plurality of output signals each occupying the single wireless frequency range, and transmitting the second plurality of output signals respectively over a second plurality of antennas, in which the first plurality of output signals transmitted wirelessly and the second plurality of output signals transmitted wirelessly, all occupying the single wireless frequency range, are combined wirelessly at different spatial locations so as to create macro-diversity in conjunction with the spatial multiplexing.

In one or more embodiments, the first and second multi-conductor cables are multi-paired cables. In one or more embodiments, the multi-paired cables are category 5 cables (CAT5).

In one or more embodiments, the plurality of streams are formed together from a plurality of independent data streams as part of a conversion process associated with the spatial multiplexing, in which a first client device decodes the plurality of independent data streams from the output signals combined and in conjunction with said macro-diversity. In one or more embodiments, the first plurality of output signals and the second plurality of output signals are OFDM and/or OFDMA, in which a plurality of sub-carriers in the plurality of output signals facilitate said macro-diversity in conjunction with the spatial multiplexing. In one or more embodiments, said formation of the plurality of streams comprises generating each of the streams from a linear combination of at least two of the independent data streams, in accordance with said spatial multiplexing.

In one or more embodiments, the plurality of streams are generated by an access point. In one or more embodiments, the access point is a WiFi access point supporting at least partly a standard associated with IEEE 802.11 in which the spatial multiplexing in conjunction with plurality of streams is part of the standard. In one or more embodiments, the standard associated with IEEE 802.11 includes IEEE 802.11n and/or IEEE 802.11ac.

In one or more embodiments, each of the plurality of IF signals has a bandwidth that is either 20 Mhz, 40 Mhz, 80 Mhz, or 160 MHz. In one or more embodiments, each of the plurality of IF signals has a center frequency located below 1 Ghz. In one or more embodiments, the single wireless frequency range is located in either a 2.4 Ghz band or a 5 Ghz band.

In one or more embodiments, the access point is an LTE access point or an LTE base-station supporting at least partly a standard associated with LTE, in which the spatial multiplexing in conjunction with the plurality of streams is part of the standard. In one or more embodiments, the first client device is located in a first room during said decoding and in conjunction with said macro-diversity. In one or more embodiments, the first client device is located in a second room after being located in the first room and still in conjunction with said macro-diversity. In one or more embodiments, a second client device is located in a second room and decodes the plurality of independent data streams from the output signals combined and in conjunction with said macro-diversity.

Another aspect of the invention is directed to a system operative to improve reception using macro-diversity transmissions, comprising: at least two converters; and an access point operative to: convert a plurality of streams associated with spatial multiplexing into a plurality of intermediary frequency (IF) signals, and transmit the plurality of IF signals at least twice: a first time respectively over a plurality of conductors belonging to a first multi-conductor cable reaching a first location, and a second time respectively over a plurality of conductors belonging to a second multi-conductor cable reaching a second location. The system is configured to: shift, at the first location, using one of the converters, the plurality of IF signals respectively into a first plurality of output signals each occupying a single wireless frequency range, and transmit the first plurality of output signals respectively over a first plurality of antennas, and shift, at the second location, using another one of the converters, the plurality of IF signals respectively into a second plurality of output signals each occupying the single wireless frequency range, and transmitting the second plurality of output signals respectively over a second plurality of antennas, in which the first plurality of output signals transmitted wirelessly and the second plurality of output signals transmitted wirelessly, all occupying the single wireless frequency range, are combined wirelessly at different spatial locations so as to create macro-diversity in conjunction with the spatial multiplexing.

IN THE DRAWINGS

The embodiments are herein described, by way of example only, with reference to the accompanying drawings. No attempt is made to show structural details of the embodiments in more detail than is necessary for a fundamental understanding of the embodiments. In the drawings:

FIG. 1A illustrates one embodiment of a system operative to: convert a plurality of streams associated with spatial multiplexing into a plurality of signals, transport the plurality of signals via a wire-based medium, shift the plurality of signals into a plurality of output signals occupying a single wireless frequency range, and transmit wirelessly the output signals, thereby achieving spatial multiplexing in conjunction with the wire-based medium;

FIG. 4B illustrates one embodiment of a system operative to resolve a sub-optimal communication condition;

FIG. 4C illustrates one embodiment of frequency assignments for signals prior to resolving the sub-optimal communication condition;

FIG. 4D illustrates one embodiment of frequency assignments for signals after resolving the sub-optimal communication condition;

FIG. 18A illustrates one embodiment of a system operative to replicate an exact frequency match among a plurality of signals associated with spatial multiplexing;

FIG. 18B illustrates one embodiment of various signals in a system operative to replicate an exact frequency match among a plurality of signals associated with spatial multiplexing;

FIG. 23A illustrates one embodiment of a system operative to transport signals between different elements in a vehicle using a shared wire-based medium;

FIG. 23B illustrates one embodiment of intermediate frequency (IF) signals to be first transported in-vehicle over the shared wire-based medium and then converted into radio frequency (RF) signals.

DETAILED DESCRIPTION

The following paragraphs are associated with FIG. 2A, FIG. 2B, FIG. 2C, FIG. 7A, FIG. 7B.

Figure 2A:
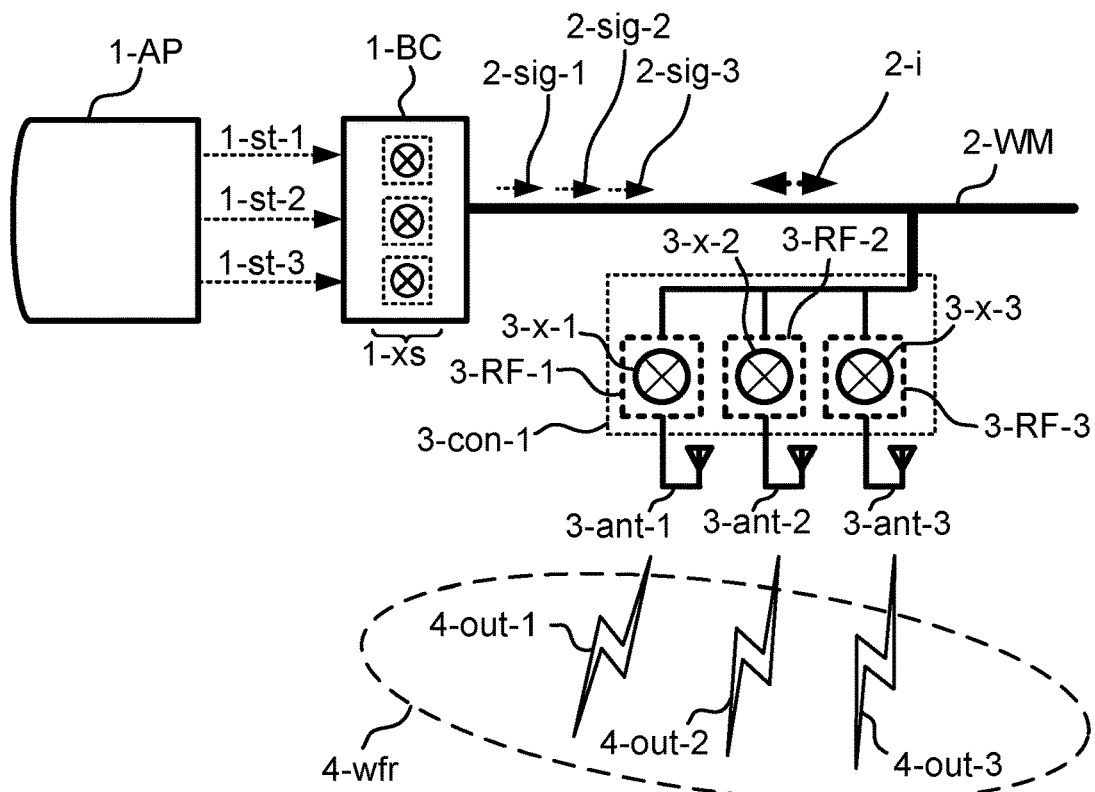
FIG. 2A illustrates one embodiment of a system operative to use spatial multiplexing to mitigate wire-based interferences.
Figure 2B:
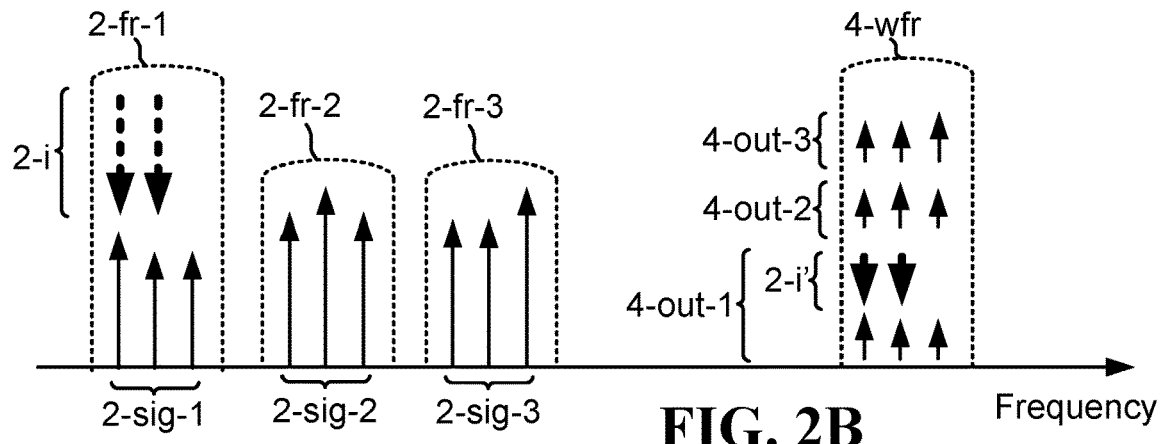
FIG. 2B illustrates one embodiment of different signals occupying various frequencies in conjunction with the system operative to use spatial multiplexing to mitigate wire-based interferences.
Figure 7A:
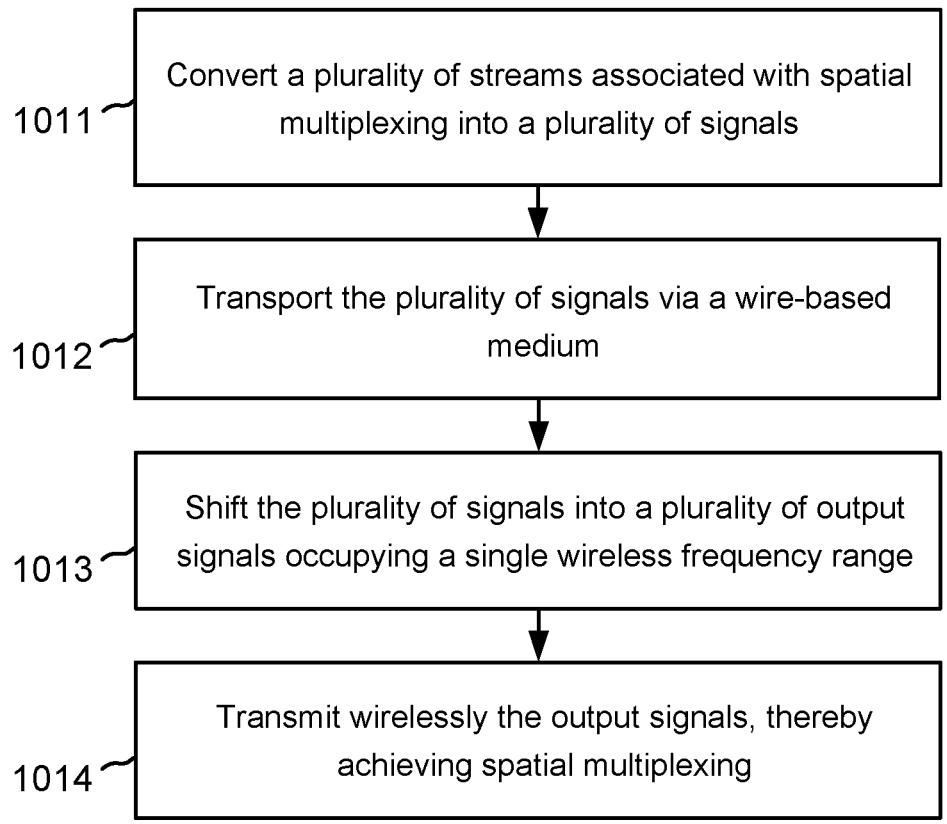
FIG. 7A illustrates one embodiment of a method for using spatial multiplexing in conjunction with a wire-based medium.
Figure 7B:
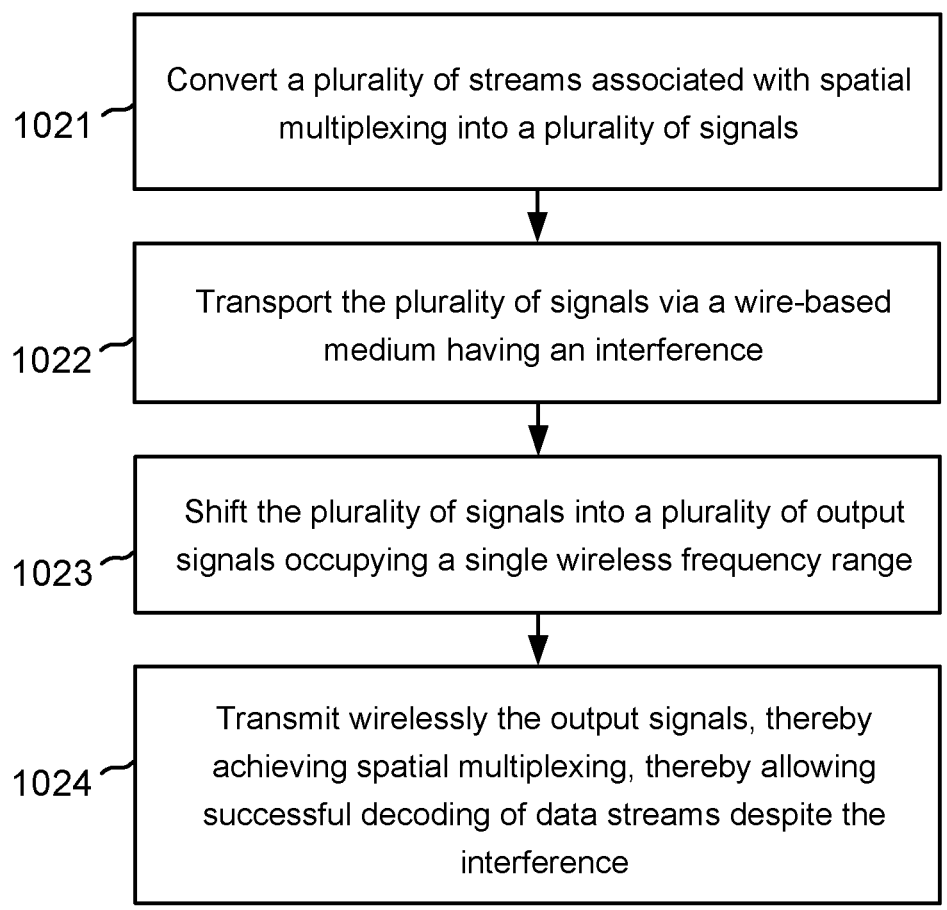
FIG. 7B illustrates one embodiment of a method for using spatial multiplexing to mitigate wire-based interferences.

FIG. 7B illustrates one embodiment of a method for using spatial multiplexing to mitigate wire-based interferences. In step 1021, converting, by a base converter 1-BC, a plurality of streams 1-st-1, 1-st-2, 1-st-3 respectively into a plurality of signals 2-sig-1, 2-sig-2, 2-sig-3 occupying respectively a plurality of different frequency ranges 2-fr-1, 2-fr-2, 2-fr-3, in which the plurality of streams are associated with spatial multiplexing, as illustrated in FIG. 2A. In step 1022, transporting, by the base converter 1-BC, the plurality of signals 2-sig-1, 2-sig-2, 2-sig-3 via a wire-based medium 2-WM respectively to a plurality of mixers 3-x-1, 3-x-2, 3-x-3, in which an interference 2-i (FIG. 2A) associated with the wire-based medium 2-WM affects at least one of the signals 2-sig-1 in one of the frequency ranges 2-fr-1, but not all of the signals in all of the frequency ranges. In step 1023, shifting, by each of the plurality of mixers 3-x-1, 3-x-2, 3-x-3, the respective one of the signals from the respective frequency range to a single wireless frequency range 4-wfr (i.e., 3-x-1 is shifting 2-sig-1 from 2-fr-1 to 4-wfr, 3-x-2 is shifting 2-sig-2 from 2-fr-2 to 4-wfr, and 3-x-3 is shifting 2-sig-3 from 2-fr-3 to 4-wfr), thereby creating, respectively, a plurality of output signals 4-out-1, 4-out-2, 4-out-3 each occupying the single wireless frequency range 4-wfr and corresponding to the respective stream (i.e. 4-out-1 corresponding to 1-st-1, 4-out-2 corresponding to 1-st-2, and 4-out-3 corresponding to 1-st-3). In step 1024, transmitting wirelessly the plurality of output signals 4-out-1, 4-out-2, 4-out-3 respectively via a plurality of antennas 3-ant-1, 3-ant-2, 3-ant-3 thereby achieving spatial multiplexing in conjunction with the plurality of output signals 4-out-1, 4-out-2, 4-out-3 all occupying the single wireless frequency range 4-wfr, wherein at least one of the plurality of output signals 4-out-1 transmitted wirelessly is affected 2-i' (FIG. 2B) by the interference 2-i (since 4-out-1 is derived from 2-sig-1 which was affected by the interference 2-i), but not all of the output signals are affected by the interference, thereby facilitating successful decoding of N data streams 1-ds-1, 1-ds-2 associated with the spatial multiplexing.

Figure 2C:
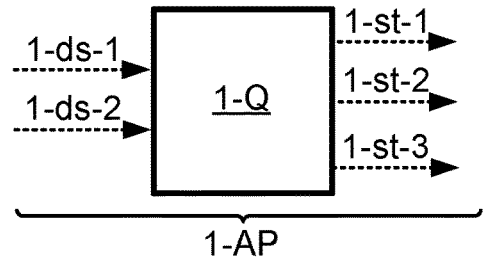
FIG. 2C illustrates one embodiment of a spatial expansion element.

One embodiment further comprises: generating, by an access point 1-AP, the plurality of streams 1-st-1, 1-st-2, 1-st-3, out of the N data streams 1-ds-1, 1-ds-2, using a spatial expansion element 1-Q, wherein: the N data streams 1-ds-1, 1-ds-2 (e.g. N=2) are mapped into the plurality of streams 1-st-1, 1-st-2, 1-st-3 comprising M streams (e.g. M=3), such that M is equal to N, or M is greater than N, in which the interference 2-i causes the access point 1-AP to decrease N relative to M, up to a point that facilitates said successful decoding of the N data streams 1-ds-1, 1-ds-2 associated with the spatial multiplexing, thereby essentially overcoming the interference 2-i. An example of such an embodiment is illustrated in FIG. 2C.

In one embodiment, the access point 1-AP is a wifi access point supporting at least partly a standard associated with IEEE 802.11, such as IEEE 802.11n or IEEE 802.11 ac, in which the spatial multiplexing in conjunction with plurality of streams 1-st-1, 1-st-2, 1-st-3 is part of the standard.

In one embodiment, the plurality of output signals 4-out-1, 4-out-2, 4-out-3 are OFDM signals, thereby further overcoming the interference 2-i in conjunction with the spatial multiplexing.

In one embodiment, the access point 1-AP is an LTE access point or an LTE base-station supporting at least partly a standard associated with LTE, in which the spatial multiplexing in conjunction with plurality of streams 1-st-1, 1-st-2, 1-st-3 is part of the standard.

In one embodiment, said interference 2-i is associated with noise on the wire-based medium 2-WM.

In one embodiment, the interference 2-i is associated with signal reflections associated with the wire-based medium 2-WM, in which the signal reflections adversely affect a transfer function associated with the wire-based medium 2-WM in one of the frequency ranges 2-fr-1 associated with one of the signals 2-sig-1.

In one embodiment, the wire-based medium 2-WM is selected from a group consisting of: (i) a coaxial cable, (ii) a twisted-pair cable, (iii) category-5 cable, and (iv) any cable capable of facilitating propagation of electromagnetic signals.

In one embodiment, the wire-based medium 2-WM is a coaxial cable deployed in-house; the plurality of mixers 3-x-1, 3-x-2, 3-x-3 are associated respectively with a plurality of radio-frequency chains 3-RF-1, 3-RF-2, 3-RF-3 operative together to facilitate said shifting of the plurality of signals 2-sig-1, 2-sig-2, 2-sig-3 to the single wireless frequency range 4-wfr; and the plurality of radio-frequency chains 3-RF-1, 3-RF-2, 3-RF-3 are housed in at least a single converter 3-con-1 placed in a room in-house, or are housed respectively in a plurality of converters placed in a plurality of rooms in-house. In some embodiments, in-house can include a house, a building, or other structure that can include one or more rooms.

In one embodiment, the interference 2-i is associated with signals injected into the coaxial cable by in-house electronic appliances.

In one embodiment, the interference 2-i is associated with reflections produced by in-house stubs of the coaxial cable.

In one embodiment, the plurality of different frequency ranges 2-fr-1, 2-fr-2, 2-fr-3 are located below 1.5 GHz, at frequency zones that are, at least momentarily, not occupied by in-house coaxial signals such as DOCSIS signals, MoCA signals, and cable TV signals.

In one embodiment, the plurality of streams 1-st-1, 1-st-2, 1-st-3 are input to the base converter 1-BC in a radio frequency form at frequency bands above 1.5 GHz, such as a 1.8 GHz band, a 1.9 GHz band, a 2.0 GHz band, a 2.3 GHz band, a 2.4 GHz band, a 2.5 GHz band, or a 5 GHz band; and said conversion of the plurality of streams 1-st-1, 1-st-2, 1-st-3 respectively into the plurality of signals 2-sig-1, 2-sig-2, 2-sig-3 is performed respectively by a plurality of mixers 1-xs in the base converter 1-BC operating as down-converters.

In one embodiment, the plurality of streams 1-st-1, 1-st-2, 1-st-3 are input to the base converter 1-BC in a base-band form; and said conversion of the plurality of streams 1-st-1, 1-st-2, 1-st-3 respectively into the plurality of signals 2-sig-1, 2-sig-2, 2-sig-3 is performed respectively by a plurality of mixers 1-xs in the base converter 1-BC operating as up-converters.

In one embodiment, the plurality of streams 1-st-1, 1-st-2, 1-st-3 are input to the base converter 1-BC in a digital form; and said conversion of the plurality of streams 1-st-1, 1-st-2, 1-st-3 respectively into the plurality of signals 2-sig-1, 2-sig-2, 2-sig-3 is a modulation process, such as OFDM modulation process.

One embodiment further comprising: generating, by an access point 1-AP, the plurality of streams 1-st-1, 1-st-2, 1-st-3, out of the N data streams 1-ds-1, 1-ds-2, wherein: the access point 1-AP is a wifi access point supporting at least partly a standard associated with IEEE 802.11, such as IEEE 802.11n or IEEE 802.11ac, in which the spatial multiplexing in conjunction with plurality of streams 1-st-1, 1-st-2, 1-st-3 is part of the standard.

In one embodiment, the plurality of output signals 4-out-1, 4-out-2, 4-out-3 all occupying the single wireless frequency range 4-wfr are associated with the standard.

In one embodiment, the single wireless frequency range 4-wfr is a single channel associated with the standard.

In one embodiment, the single channel is associated with an unlicensed ism band selected from a group of unlicensed bands consisting of (i) the 2.4 GHz band, and (ii) the 5 GHz band.

In one embodiment, the plurality of output signals 4-out-1, 4-out-2, 4-out-3 are OFDM signals.

One embodiment further comprising: generating, by an access point 1-AP, the plurality of streams 1-st-1, 1-st-2, 1-st-3, out of the N data streams 1-ds-1, 1-ds-2, wherein: the access point 1-AP is an LTE access point supporting at least partly a standard associated with LTE, in which the spatial multiplexing in conjunction with plurality of streams 1-st-1, 1-st-2, 1-st-3 is part of the standard.

In one embodiment, the plurality of output signals 4-out-1, 4-out-2, 4-out-3 all occupying the single wireless frequency range 4-wfr are associated with the standard.

In one embodiment, the single wireless frequency range 4-wfr is a single channel associated with the standard.

In one embodiment, the single channel is associated with a licensed band selected from a group of licensed bands consisting of (i) the 1.8 GHz band, (ii) the 1.9 GHz band, and (iii) the 2.0 GHz band.

In one embodiment, the plurality of output signals 4-out-1, 4-out-2, 4-out-3 are OFDMA signals.

One embodiment is a system 1-AP, 1-BC, 2-WM, 3-x-1, 3-x-2, 3-x-3, 3-ant-1, 3-ant-2, 3-ant-3, 1-Q, configured to facilitate spatial multiplexing to mitigate wire-based interferences.

FIG. 7A illustrates one embodiment of a method for using spatial multiplexing in conjunction with a wire-based medium. In step 1011, Converting a plurality of streams 1-st-1, 1-st-2, 1-st-3, 1-st-4, 1-st-5, 1-st-n associated with spatial multiplexing, respectively, into a plurality of signals 2-sig-1, 2-sig-2, 2-sig-3, 2-sig-4, 2-sig-5, 2-sig-n occupying respectively a plurality of different frequencies 2-fr-1, 2-fr-2, 2-fr-3, 2-fr-4, 2-fr-5, 2-fr-n. In step 1012, Transporting the plurality of signals via a wire-based medium 2-WM. In step 1013, Shifting the plurality of signals into, respectively, a plurality of output signals 4-out-1, 4-out-2, 4-out-3, 4-out-4, 4-out-5, 4-out-n all occupying a single wireless frequency 4-wfr. In step 1014, Transmitting wirelessly the plurality of output signals, respectively, via a plurality of antennas 3-ant-1, 3-ant-2, 3-ant-3, 3-ant-4, 3-ant-5, 3-ant-n, thereby achieving spatial multiplexing in conjunction with the wire-based medium.

Figure 1A:
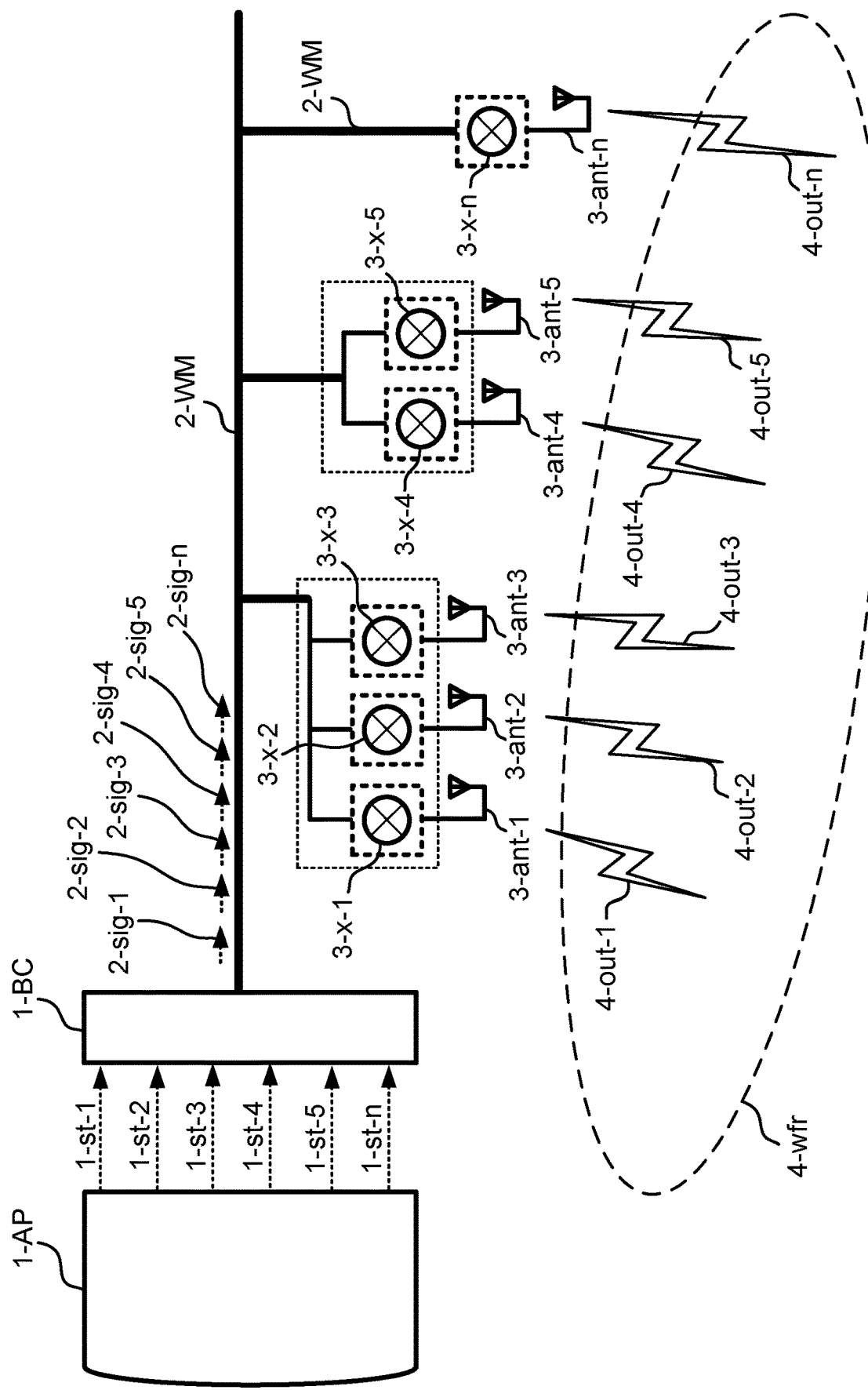
FIG. 1B illustrates one embodiment of the frequencies occupied by the plurality of signals transported via a wire-based medium, and the single wireless frequency occupied by the plurality of output signals.
FIG. 1C illustrates one embodiment of a plurality of mixer signals.

One embodiment is a system (FIG. 1A) operative to use spatial multiplexing in conjunction with a wire-based medium, for example as illustrated in FIG. 1A. The system includes: an access point 1-AP, a base converter 1-BC, a wire-based medium 2-WM, and a plurality of antennas 3-ant-1, 3-ant-2, 3-ant-3, 3-ant-4, 3-ant-5, 3-ant-n.

The system is configured to:

convert a plurality of streams 1-st-1, 1-st-2, 1-st-3, 1-st-4, 1-st-5, 1-st-n associated with spatial multiplexing, respectively, into a plurality of signals 2-sig-1, 2-sig-2, 2-sig-3, 2-sig-4, 2-sig-5, 2-sig-n occupying respectively a plurality of different frequencies 2-fr-1, 2-fr-2, 2-fr-3, 2-fr-4, 2-fr-5, 2-fr-n;

transport the plurality of signals 2-sig-1, 2-sig-2, 2-sig-3, 2-sig-4, 2-sig-5, 2-sig-n, in conjunction with the plurality of different frequencies 2-fr-1, 2-fr-2, 2-fr-3, 2-fr-4, 2-fr-5, 2-fr-n, via the wire-based medium 2-WM;

shift the plurality of signals 2-sig-1, 2-sig-2, 2-sig-3, 2-sig-4, 2-sig-5, 2-sig-n into, respectively, a plurality of output signals 4-out-1, 4-out-2, 4-out-3, 4-out-4, 4-out-5, 4-out-n, in which all said output signals occupy a single wireless frequency 4-wfr, in which said shift is achieved by up-converting each one of the signals 2-sig-1, 2-sig-2, 2-sig-3, 2-sig-4, 2-sig-5, 2-sig-n from the corresponding one of the different frequencies 2-fr-1, 2-fr-2, 2-fr-3, 2-fr-4, 2-fr-5, 2-fr-n into the single wireless frequency 4-wfr; and transmit wirelessly, using only the single wireless frequency 4-wfr, the plurality of output signals 4-out-1, 4-out-2, 4-out-3, 4-out-4, 4-out-5, 4-out-n, respectively, via the plurality of antennas 3-ant-1, 3-ant-2, 3-ant-3, 3-ant-4, 3-ant-5, 3-ant-n all operating in conjunction with the single wireless frequency 4-wfr, thereby achieving spatial multiplexing in conjunction with the wire-based medium 2-WM.

Figure 3A:
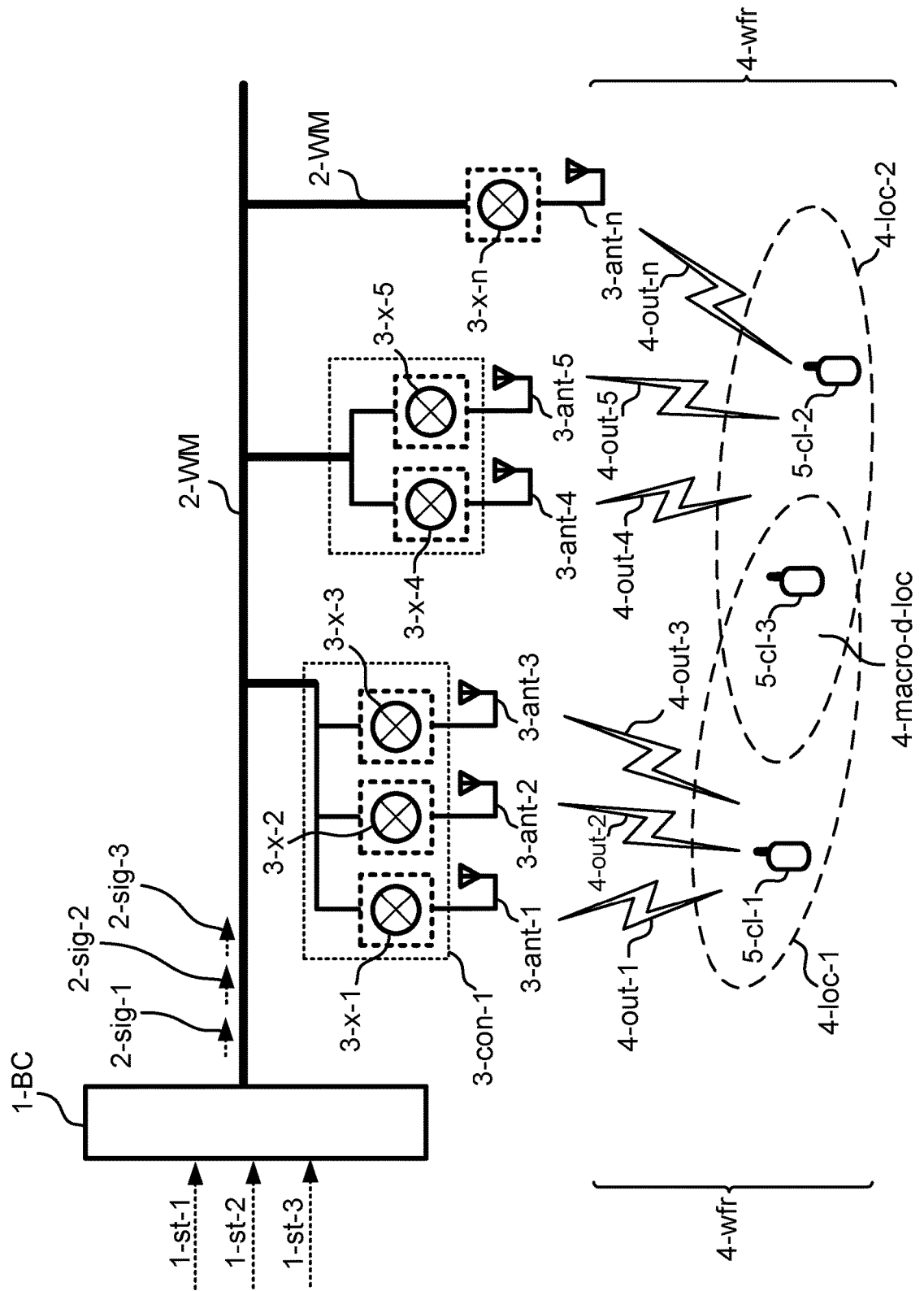
FIG. 3A illustrates one embodiment of a system operative to re-use a plurality of streams associated with spatial multiplexing and transported over a wire-based medium.
Figure 8:
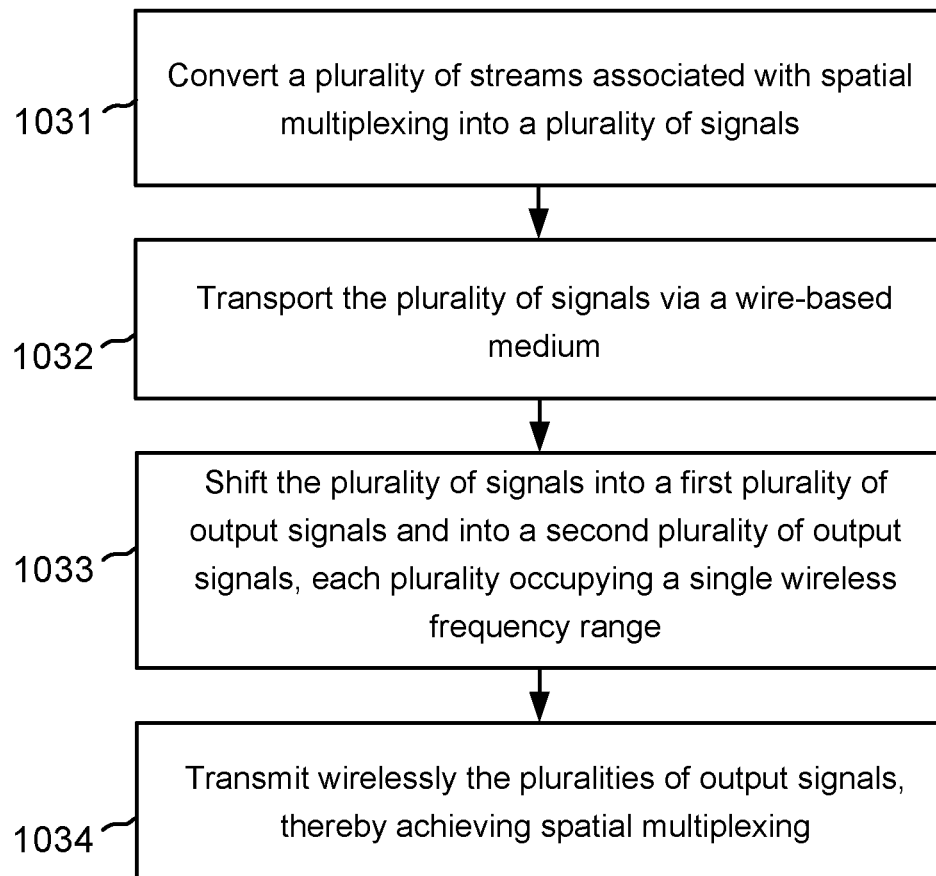
FIG. 8 illustrates one embodiment of a method for re-using a plurality of streams associated with spatial multiplexing and transported over a wire-based medium.

The following paragraphs are associated with FIG. 3A, FIG. 8.

FIG. 8 illustrates one embodiment of a method for re-using a plurality of streams associated with spatial multiplexing and transported over a wire-based medium. In step 1031, converting, by a base converter 1-BC, a plurality of streams 1-st-1, 1-st-2, 1-st-3 respectively into a plurality of signals 2-sig-1, 2-sig-2, 2-sig-3 occupying respectively a plurality of different frequency ranges 2-fr-1, 2-fr-2, 2-fr-3, in which the plurality of streams are associated with spatial multiplexing, as illustrated in FIG. 3A. In step 1032, transporting, by the base converter 1-BC, the plurality of signals 2-sig-1, 2-sig-2, 2-sig-3 via a wire-based medium 2-WM respectively to a first plurality of mixers 3-x-1, 3-x-2, 3-x-3, and respectively to a second plurality of mixers 3-x-4, 3-x-5, 3-x-n. In step 1033, shifting, by each of the first plurality of mixers 3-x-1, 3-x-2, 3-x-3, the respective one of the signals from the respective frequency range to a single wireless frequency range 4-wfr (i.e., 3-x-1 is shifting 2-sig-1 from 2-fr-1 to 4-wfr, 3-x-2 is shifting 2-sig-2 from 2-fr-2 to 4-wfr, and 3-x-3 is shifting 2-sig-3 from 2-fr-3 to 4-wfr), thereby creating, respectively, a first plurality of output signals 4-out-1, 4-out-2, 4-out-3 each occupying the single wireless frequency range 4-wfr and corresponding to the respective stream (i.e. 4-out-1 corresponding to 1-st-1, 4-out-2 corresponding to 1-st-2, and 4-out-3 corresponding to 1-st-3), and shifting, by each of the second plurality of mixers 3-x-4, 3-x-5, 3-x-n, the respective one of the signals from the respective frequency range to the single wireless frequency range 4-wfr (i.e., 3-x-4 is shifting 2-sig-1 from 2-fr-1 to 4-wfr, 3-x-5 is shifting 2-sig-2 from 2-fr-2 to 4-wfr, and 3-x-n is shifting 2-sig-3 from 2-fr-3 to 4-wfr), thereby creating, respectively, a second plurality of output signals 4-out-4, 4-out-5, 4-out-n each occupying the single wireless frequency range 4-wfr and corresponding to the respective stream (i.e. 4-out-4 corresponding to 1-st-1, 4-out-5 corresponding to 1-st-2, and 4-out-n corresponding to 1-st-3). In step 1034, transmitting wirelessly the first plurality of output signals 4-out-1, 4-out-2, 4-out-3 via a first plurality of antennas 3-ant-1, 3-ant-2, 3-ant-3 thereby achieving spatial multiplexing in conjunction with the first plurality of output signals all occupying the single wireless frequency range 4-wfr, and transmitting wirelessly the second plurality of output signals 4-out-4, 4-out-5, 4-out-n via a second plurality of antennas 3-ant-4, 3-ant-5, 3-ant-n, thereby achieving spatial multiplexing in conjunction with the second plurality of output signals all occupying the single wireless frequency range 4-wfr.

In one embodiment, the first plurality of output signals 4-out-1, 4-out-2, 4-out-3 transmitted wirelessly and the second plurality of output signals 4-out-4, 4-out-5, 4-out-n transmitted wirelessly, all occupying the single wireless frequency range 4-wfr, are combined wirelessly at different spatial locations 4-macro-d-loc such as to create macro-diversity in conjunction with the spatial multiplexing.

In one embodiment, the first plurality of output signals 4-out-1, 4-out-2, 4-out-3 and the second plurality of output signals 4-out-4, 4-out-5, 4-out-n are received and decoded in conjunction with said macro-diversity by a client device 5-cl-3 located in one of the different spatial locations 4-macro-d-loc.

In one embodiment, the plurality of signals 2-sig-1, 2-sig-2, 2-sig-3, the first plurality of output signals 4-out-1, 4-out-2, 4-out-3, and the second plurality of output signals 4-out-4, 4-out-5, 4-out-n, are OFDM or OFDMA signals associated with a standard selected from a group consisting of (i) wifi, (ii) wimax, and (iii) LTE, in which a plurality of sub-carriers in the plurality of signals and in the pluralities of output signals facilitate said macro-diversity in conjunction with the spatial multiplexing.

In one embodiment, the first plurality of output signals 4-out-1, 4-out-2, 4-out-3 transmitted wirelessly are associated with a first spatial location 4-loc-1, and the second plurality of output signals 4-out-4, 4-out-5, 4-out-n transmitted wirelessly are associated with a second spatial location 4-loc-2, such that a first client 5-cl-1 device associated with the first spatial location 4-loc-1 is able to decode data streams associated with the spatial multiplexing using the first plurality of output signals 4-out-1, 4-out-2, 4-out-3, and a second client device 5-cl-2 associated with the second spatial location 4-loc-2 is able to decode data streams associated with the spatial multiplexing using the second plurality of output signals 4-out-4, 4-out-5, 4-out-n.

In one embodiment, the wire-based medium 2-WM is a coaxial cable deployed in-house, in which the first spatial location 4-loc-1 is a first room in-house, and the second spatial location 4-loc-2 is a second room in-house. In some embodiments, in-house can include a house, a building, or other structure that can include one or more rooms.

In one embodiment, the first plurality of output signals 4-out-1, 4-out-2, 4-out-3 and the second plurality of output signals 4-out-4, 4-out-5, 4-out-n are associated with LTE in a licensed band and are transmitted each at a power level of below 10 (ten) dBm and above −30 (minus thirty) dBm, which is low enough to not interfere with outdoor LTE transmissions in the licensed band, but is also high enough to be received by the client devices 5-cl-1, 5-cl-2 in the different rooms 4-loc-1, 4-loc-2 as facilitated by the wire-based medium 2-WM.

In one embodiment, the first plurality of output signals 4-out-1, 4-out-2, 4-out-3 and the second plurality of output signals 4-out-4, 4-out-5, 4-out-n are associated with IEEE 802.11 and wifi in unlicensed band and are received by the client devices 5-cl-1, 5-cl-2 in the different rooms 4-loc-1, 4-loc-2 as facilitated by the wire-based medium 2-WM, thereby improving in-house wifi communication.

In one embodiment, the wire-based medium 2-WM is selected from a group consisting of: (i) a coaxial cable, (ii) a twisted-pair cable, (iii) category-5 cable, and (iv) any cable capable of facilitating propagation of electromagnetic signals.

One embodiment is a system 1-BC, 2-WM, 3-$x$-1, 3-$x$-2, 3-$x$-3, 3-$x$-4, 3-$x$-5, 3-$x$-n, 3-ant-1, 3-ant-2, 3-ant-3, 3-ant-4, 3-ant-5, 3-ant-n, configured to re-use a plurality of streams associated with spatial multiplexing and transported over a wire-based medium, for example as illustrated in FIG. 3A.

Figure 3B:
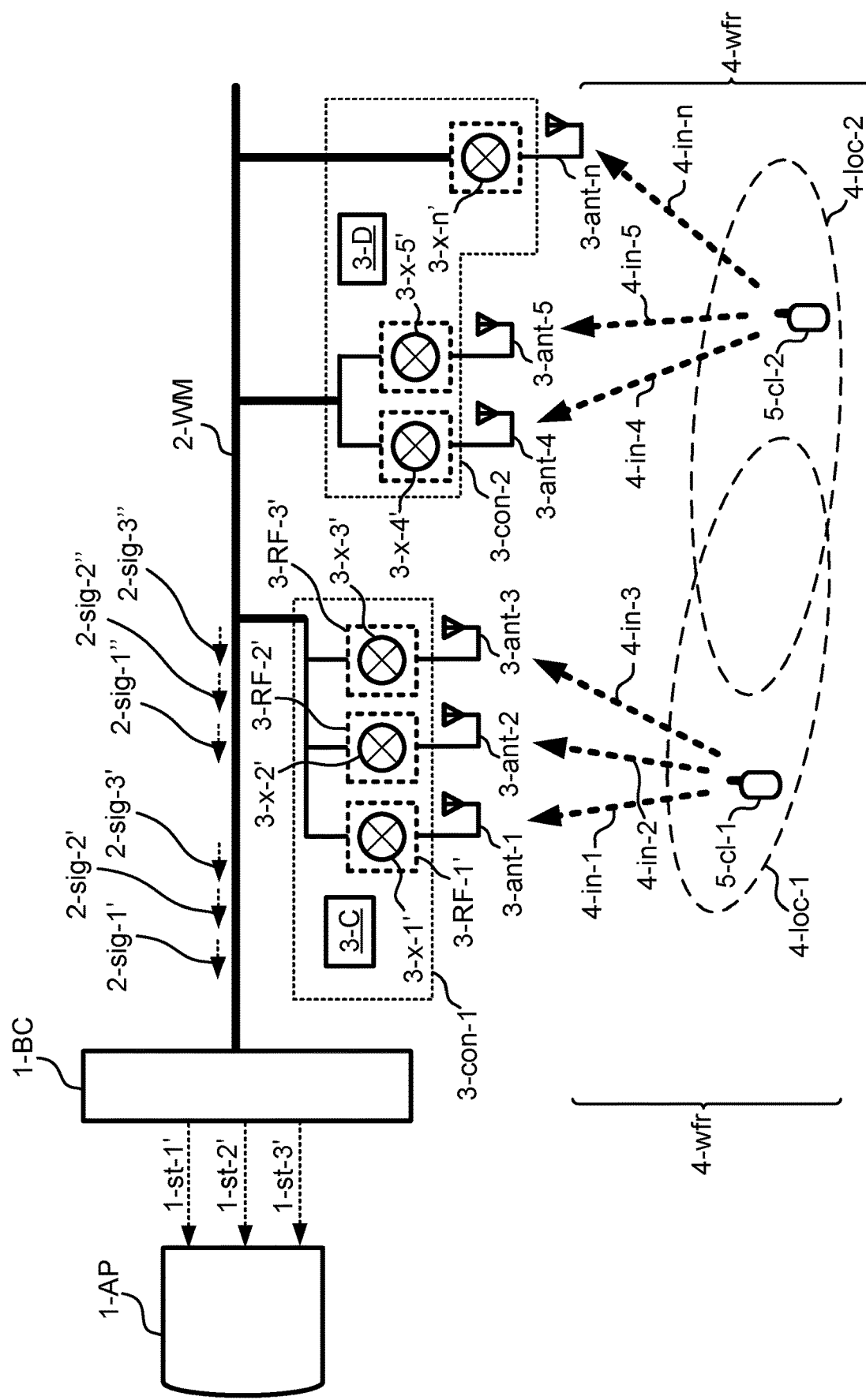
FIG. 3B illustrates one embodiment of a system operative to prevent a first wireless transmission from interfering with a second wireless transmission both transported over a wire-based medium.
Figure 9:
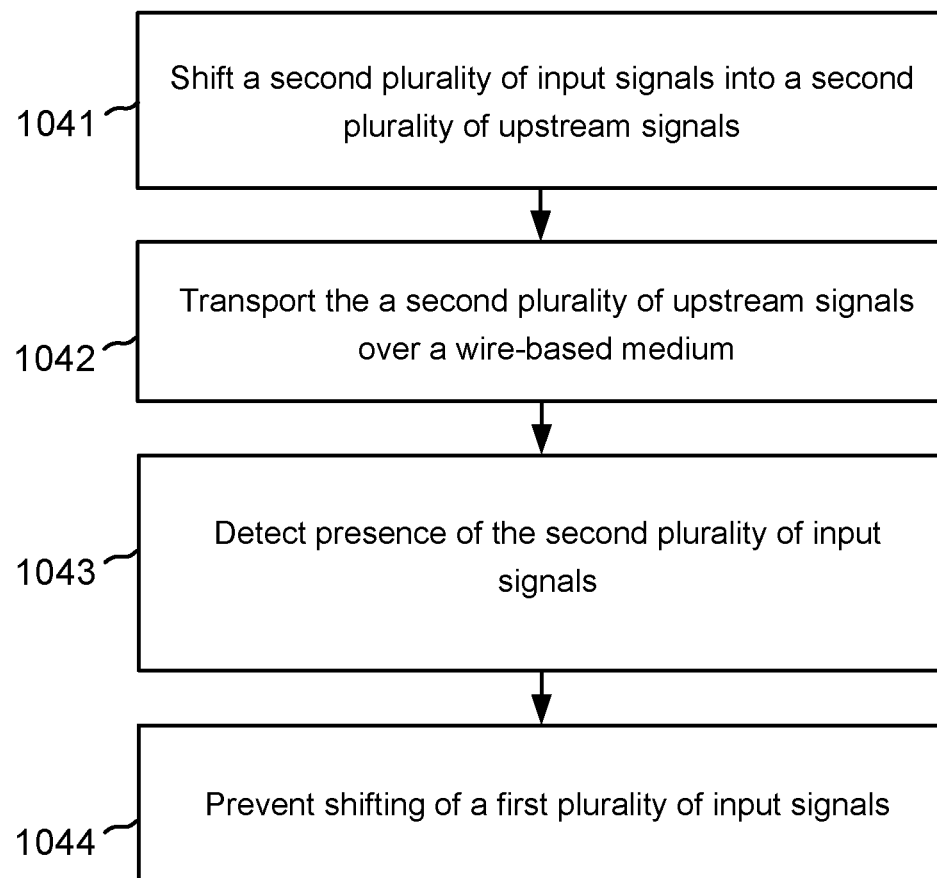
FIG. 9 illustrates one embodiment of a method for preventing a first wireless transmission from interfering with a second wireless transmission both transported over a wire-based medium.

The following paragraphs are associated with FIG. 3B, FIG. 9.

Figure 1B:
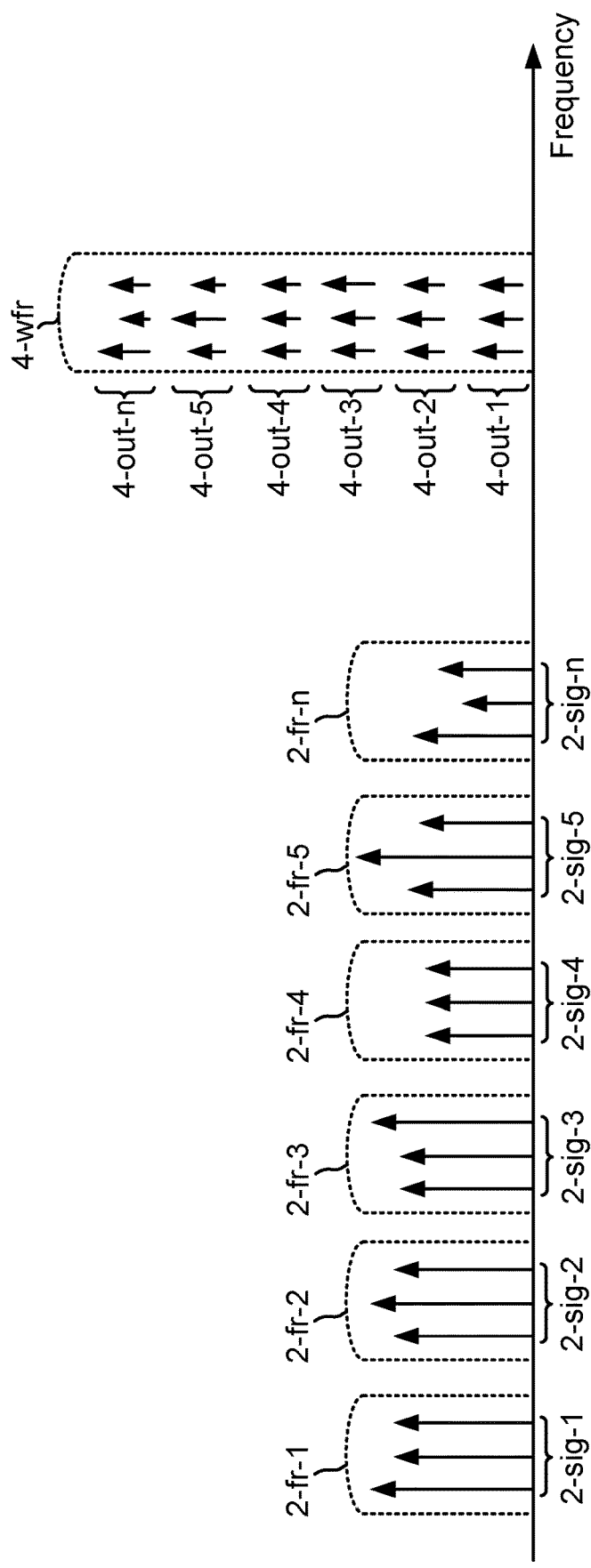
Figure 1C:
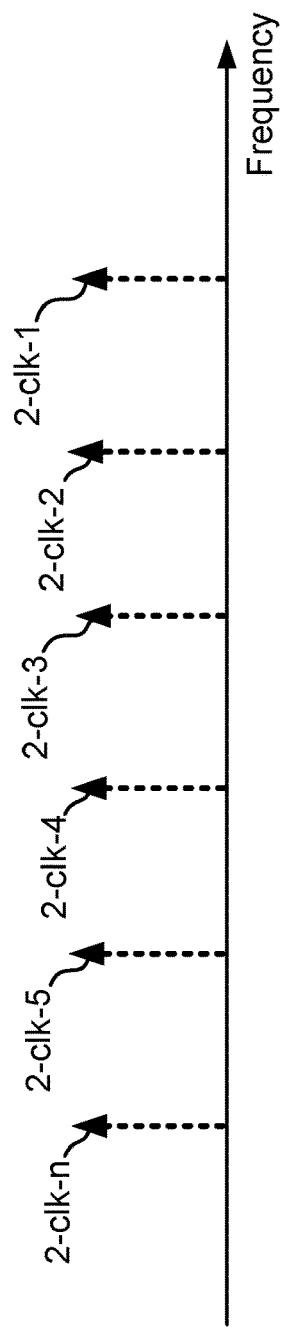

FIG. 9 illustrates one embodiment of a method for preventing a first wireless transmission from interfering with a second wireless transmission both transported over a wire-based medium. In step 1041, shifting, by a second plurality of mixers 3-$x$-4', 3-$x$-5', 3-$x$-n', respectively, a second plurality of input signals 4-in-4, 4-in-5, 4-in-n, each occupying a single wireless frequency range 4-wfr, respectively into a second plurality of upstream signals 2-sig-1''', 2-sig-2'', 2-sig-3'' occupying respectively a plurality of different frequency ranges 2-fr-1, 2-fr-2, 2-fr-3 (FIG. 1B), in which the second plurality of input signals 4-in-4, 4-in-5, 4-in-n are received wirelessly from a second client device 5-cl-2 respectively via a second plurality of antennas 3-ant-4, 3-ant-5, 3-ant-n. In step 1042, transporting the second plurality of upstream signals 2-sig-1''', 2-sig-2'', 2-sig-3'' via a wire-based medium 2-WM to a base converter 1-BC operative to convert the second plurality of upstream signals 2-sig-1'', 2-sig-2'', 2-sig-3'' respectively into a plurality of receive streams 1-st-1', 1-st-2', 1-st-3'. In step 1043, detecting, by a detector 3-D associated with the second plurality of mixers 3-$x$-4', 3-$x$-5', 3-$x$-n', a presence of the second plurality of input signals 4-in-4, 4-in-5, 4-in-n. In step 1044, preventing, by a controller 3-C associated with a first plurality of mixers 3-$x$-1', 3-$x$-2', 3-$x$-3', based on said detection, from shifting, by the first plurality of mixers 3-$x$-1', 3-$x$-2', 3-$x$-3', respectively, a first plurality of input signals 4-in-1, 4-in-2, 4-in-3, each occupying the single wireless frequency range 4-wfr, respectively into a first plurality of upstream signals 2-sig-1', 2-sig-2', 2-sig-3' occupying respectively the plurality of different frequency ranges 2-fr-1, 2-fr-2, 2-fr-3 (FIG. 1B), in which the first plurality of input signals 4-in-1, 4-in-2, 4-in-3 are received wirelessly from a first client device 5-cl-1 respectively via a first plurality of antennas 3-ant-1, 3-ant-2, 3-ant-3, thereby, as a result of said prevention, avoiding a presence of the first plurality of upstream signals 2-sig-1', 2-sig-2', 2-sig-3' in the wire-based medium 2-WM, which would otherwise interfere with the second plurality of upstream signals 2-sig-1'', 2-sig-2'', 2-sig-3'' in the wire-based medium 2-WM, as both pluralities of upstream signals share the plurality of different frequency ranges 2-fr-1, 2-fr-2, 2-fr-3, thereby, as a result of said avoidance, allowing an access point 1-AP to successfully decode the plurality of receive streams 1-st-1', 1-st-2', 1-st-3'.

In one embodiment, the first client device 5-cl-1 and the second client device 5-cl-2 are wifi client devices operating in conjunction with a carrier-sense-multiple-access (CSMA) mechanism; and the first client device 5-cl-1 is located in a first location 4-loc-1 and the second client device 5-cl-2 is located in a second location 4-loc-2, such that as a result of the different locations 4-loc-1, 4-loc-2, the second plurality of upstream signals 2-sig-1'', 2-sig-2'', 2-sig-3'' are not received by the first client device 5-cl-1, thereby adversely affecting the CSMA mechanism in the first client device 5-cl-1 and causing said reception of the first plurality of input signals 4-in-1, 4-in-2, 4-in-3 from the first client device.

In one embodiment, the CSMA mechanism is associated with a wireless communication standard in unlicensed band, such as IEEE 802.11, in which the upstream signals 2-sig-1'', 2-sig-2'', 2-sig-3'' that are not received by the first client device 5-cl-1 are associated with the second client device 5-cl-2 being a hidden station relative to the first client device.

In one embodiment, the wire-based medium 2-WM is a coaxial cable deployed in-house; and the first location 4-loc-1 is a first room in-house, and the second location 4-loc-2 is a second room in-house, thereby causing said second client device 5-cl-2 being a hidden station relative to the first client device 4-loc-2.

One embodiment is a system 1-AP, 1-BC, 2-WM, 3-$x$-1', 3-$x$-2', 3-$x$-3', 3-$x$-4', 3-$x$-5', 3-$x$-n', 3-ant-1, 3-ant-2, 3-ant-3, 3-ant-4, 3-ant-5, 3-ant-n, 3-C, 3-D, configured to prevent a first wireless transmission from interfering with a second wireless transmission both transported over a wire-based medium, for example as illustrated in FIG. 3B.

Figure 4A:
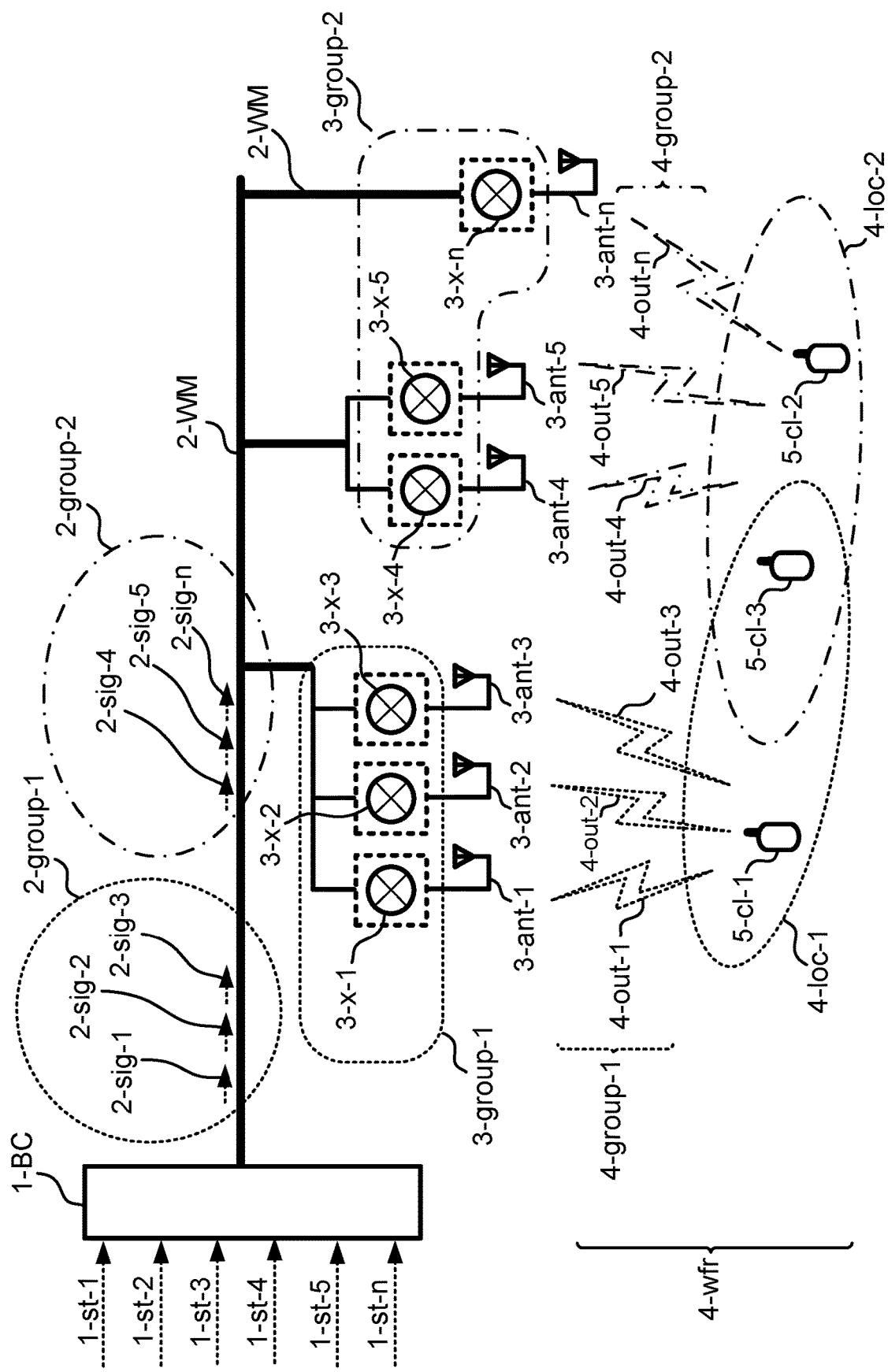
FIG. 4A illustrates one embodiment of a system operative to cover wirelessly multiple spatial locations via a wire-based medium using grouping of streams associated with spatial multiplexing.
Figure 10:
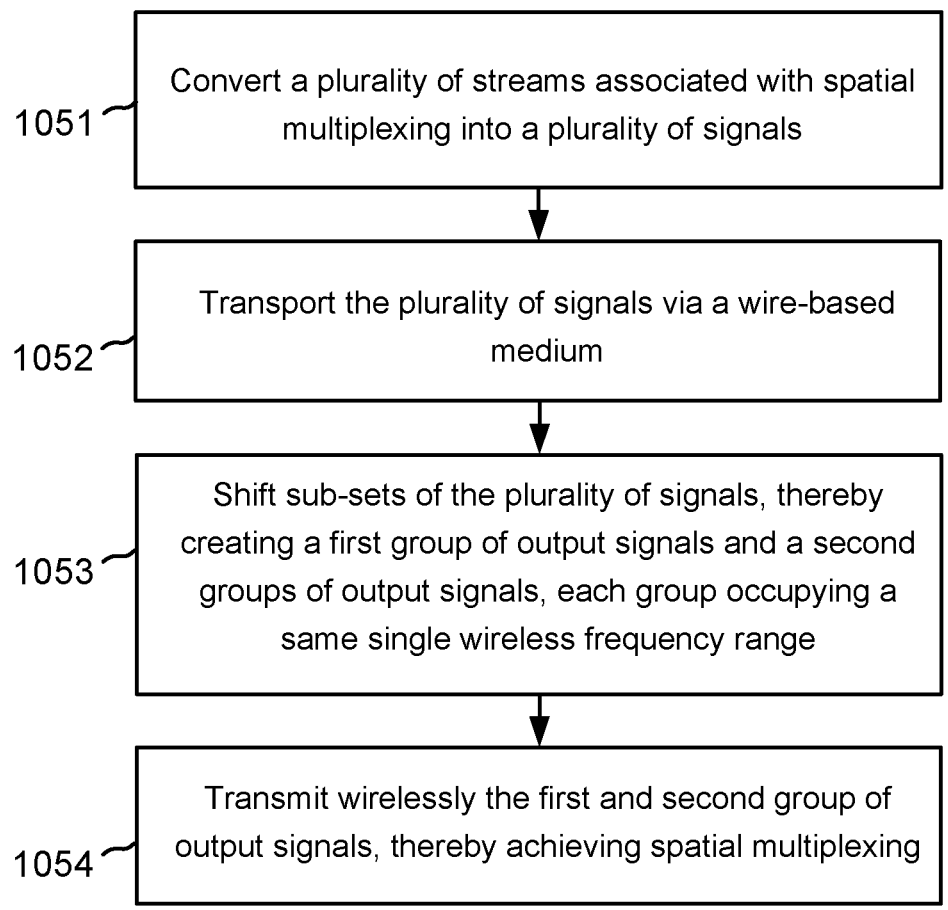
FIG. 10 illustrates one embodiment of a method for covering wirelessly multiple spatial locations via a wire-based medium using grouping of streams associated with spatial multiplexing.

The following paragraphs are associated with FIG. 4A, FIG. 10.

FIG. 10 illustrates one embodiment of a method for covering wirelessly multiple spatial locations via a wire-based medium using grouping of streams associated with spatial multiplexing. In step 1051, converting, by a base converter 1-BC, a plurality of streams 1-st-1, 1-st-2, 1-st-3, 1-st-4, 1-st-5, 1-st-n respectively into a plurality of signals 2-sig-1, 2-sig-2, 2-sig-3, 2-sig-4, 2-sig-5, 2-sig-n occupying respectively a plurality of different frequency ranges 2-fr-1, 2-fr-2, 2-fr-3, 2-fr-4, 2-fr-5, 2-fr-n, in which the plurality of streams are associated with spatial multiplexing. In step 1052, transporting, by the base converter 1-BC, a first sub-set 2-sig-1, 2-sig-2, 2-sig-3 (2-group-1) of the plurality of signals via a wire-based medium 2-WM respectively to a first group of mixers 3-$x$-1, 3-$x$-2, 3-$x$-3 (3-group-1), and a second sub-set 2-sig-4, 2-sig-5, 2-sig-n (2-group-2) of the plurality of signals via the wire-based medium 2-WM respectively to a second group of mixers 3-$x$-4, 3-$x$-5, 3-$x$-n (3-group-2). In step 1053, shifting, by each of the first group of mixers 3-$x$-1, 3-$x$-2, 3-$x$-3 (3-group-1), the respective one of the signals from the respective frequency range to a single wireless frequency range 4-wfr (i.e., 3-$x$-1 is shifting 2-sig-1 from 2-fr-1 to 4-wfr, 3-$x$-2 is shifting 2-sig-2 from 2-fr-2 to 4-wfr, and 3-$x$-3 is shifting 2-sig-3 from 2-fr-3 to 4-wfr), thereby creating, respectively, a first group of output signals 4-out-1, 4-out-2, 4-out-3 (4-group-1) each occupying the single wireless frequency range 4-wfr and corresponding to the respective stream (i.e. 4-out-1 corresponding to 1-st-1, 4-out-2 corresponding to 1-st-2, and 4-out-3 corresponding to 1-st-3), and shifting, by each of the second group of mixers 3-$x$-4, 3-$x$-5, 3-$x$-n (3-group-2), the respective one of the signals from the respective frequency range to the single wireless frequency range 4-wfr (i.e., 3-x-4 is shifting 2-sig-4 from 4-fr-1 to 4-wfr, 3-x-5 is shifting 2-sig-5 from 2-fr-5 to 4-wfr, and 3-x-n is shifting 2-sig-n from 2-fr-n to 4-wfr), thereby creating, respectively, a second group of output signals 4-out-4, 4-out-5, 4-out-n (4-group-2) each occupying the single wireless frequency range 4-wfr and corresponding to the respective stream (i.e. 4-out-4 corresponding to 1-st-5, 4-out-5 corresponding to 1-st-5, and 4-out-n corresponding to 1-st-n). In step 1054, transmitting wirelessly the first group of output signals 4-out-1, 4-out-2, 4-out-3 (4-group-1) via a first group of antennas 3-ant-1, 3-ant-2, 3-ant-3 thereby achieving spatial multiplexing in conjunction with the first group of output signals 4-group-1 all occupying the single wireless frequency range 4-wfr, and transmitting wirelessly the second group of output signals 4-out-4, 4-out-5, 4-out-n (4-group-2) via a second group of antennas 3-ant-4, 3-ant-5, 3-ant-n thereby achieving spatial multiplexing in conjunction with the second group of output signals 4-group-2 all occupying the single wireless frequency range 4-wfr, wherein the first group of output signals 4-group-1 transmitted wirelessly are associated with a first spatial location 4-loc-1 and the second group of output signals 4-group-2 transmitted wirelessly are associated with a second spatial location 4-loc-2.

In one embodiment, a first client device 5-cl-1 associated with the first spatial location 4-loc-1 decodes at least a first number of data streams associated with the spatial multiplexing in conjunction with the first group of output signals 4-group-1; and a second client device 5-cl-3 associated with both the first spatial location 4-loc-1 and the second spatial location 4-loc-2 decodes a second number of data streams associated with the spatial multiplexing in conjunction with the first group of output signals 4-group-1 and the second group of output signals 4-group-2, in which the second number is greater than the first number, thereby facilitating higher data rates for the second client device 5-cl-3 as compared to the first client device 5-cl-1.

In one embodiment, a first client device 5-cl-1 associated with the first spatial location 4-loc-1 decodes data streams associated with the spatial multiplexing in conjunction with the first group of output signals 4-group-1; and a second client device 5-cl-2 associated with the second spatial location 4-loc-2 decodes data streams associated with the spatial multiplexing in conjunction with the second group of output signals 4-group-2, for example as illustrated in FIG. 4A.

The following paragraphs are associated with FIG. 4A, FIG. 4B, FIG. 4C, FIG. 4D.

In one embodiment, the wire-based medium 2-WM has a transfer function 2-TF-1, 2-TF-2, in conjunction with the plurality of signals 2-sig-1, 2-sig-2, 2-sig-3, 2-sig-4, 2-sig-5, 2-sig-n and the respective plurality of different frequency ranges 2-fr-1, 2-fr-2, 2-fr-3, 2-fr-4, 2-fr-5, 2-fr-n, that varies along different locations along the wire-based medium 2-WM, such that the wire-based medium has a first transfer function 2-TF-1 in conjunction with a first location 2-loc-1 along the wire-based medium, and a second transfer function 2-TF-2 in conjunction with a second location 2-loc-2 along the wire-based medium; the first location 2-loc-1 along the wire-based medium 2-WM is associated with the first group of mixers 3-x-1, 3-x-2, 3-x-3 (3-group-1), and the second location 2-loc-2 along the wire-based medium is associated with the second group of mixers 3-x-4, 3-x-5, 3-x-n (3-group-2); and the first transfer function 2-TF-1 has a first fading 2-fd-1 located within the frequency range 2-fr-3 associated with one of the signals 2-sig-3 transported to the first group of mixers 3-x-1, 3-x-2, 3-x-3 (3-group-1), such as to adversely affect the signal 2-sig-3 and the respective output signal 4-out-3, in which the method for covering wirelessly multiple spatial locations via a wire-based medium using grouping of streams associated with spatial multiplexing further comprises:

detecting, by an access point 1-AP (not illustrated in FIG. 4A) generating said plurality of streams 1-st-1, 1-st-2, 1-st-3, 1-st-4, 1-st-5, 1-st-n, a sub-optimal communication condition in conjunction with a first client device 5-cl-1 receiving the output signal 4-out-3 affected by the first fading 2-fd-1; and changing, by the access point 1-AP, in conjunction with the base converter 1-BC and the appropriate mixer 3-x-3 in the first group of mixers 3-group-1, the frequency range 2-fr-3 associated with the signal 2-sig-3 adversely affected by the first fading 2-fd-1, to a different frequency range 2-fr-5, such that the signal 2-sig-3 adversely affected by the first fading 2-fd-1 is now associated with the different frequency range 2-fr-5 (this new association is depicted in FIG. 4D), and is therefore no longer adversely affected by the first fading 2-fd-1, thereby resolving the sub-optimal communication condition in conjunction with a first client device 5-cl-1.

One embodiment further comprises: using the frequency range 2-fr-3 previously associated with the signal 2-sig-3 that was adversely affected by the first fading 2-fd-1 for the transporting of one of the signals 2-sig-5 to the second group of mixers 3-group-2, in which the frequency range 2-fr-3 previously associated with the signal 2-sig-3 that was adversely affected by the first fading 2-fd-1 is clear from fading in conjunction with the second transfer function 2-TF-2 associated with the second location 2-loc-2 along the wire-based medium and associated with the second group of mixers 3-group-2.

One embodiment is a system 1-BC, 2-WM, 3-x-1, 3-x-2, 3-x-3, 3-x-4, 3-x-5, 3-x-n, 3-ant-1, 3-ant-2, 3-ant-3, 3-ant-4, 3-ant-5, 3-ant-n, configured to cover wirelessly multiple spatial locations via a wire-based medium using grouping of streams associated with spatial multiplexing, for example as illustrated in FIG. 4A.

Figure 5:
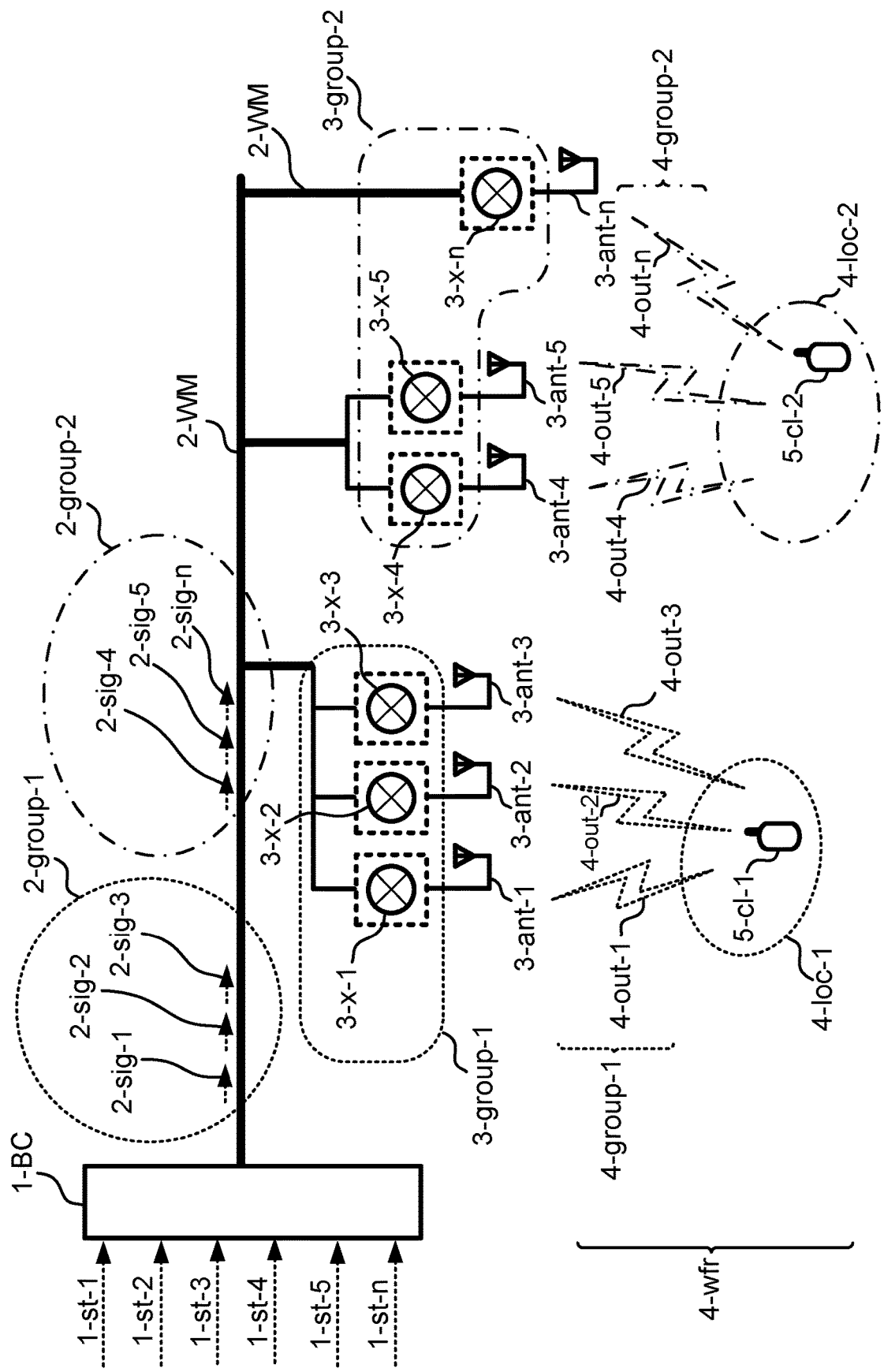
FIG. 5 illustrates one embodiment of a system operative to achieve spatial-division-multiple-access via a wire-based medium by grouping of streams in conjunction with a plurality of spatial locations.
Figure 11:
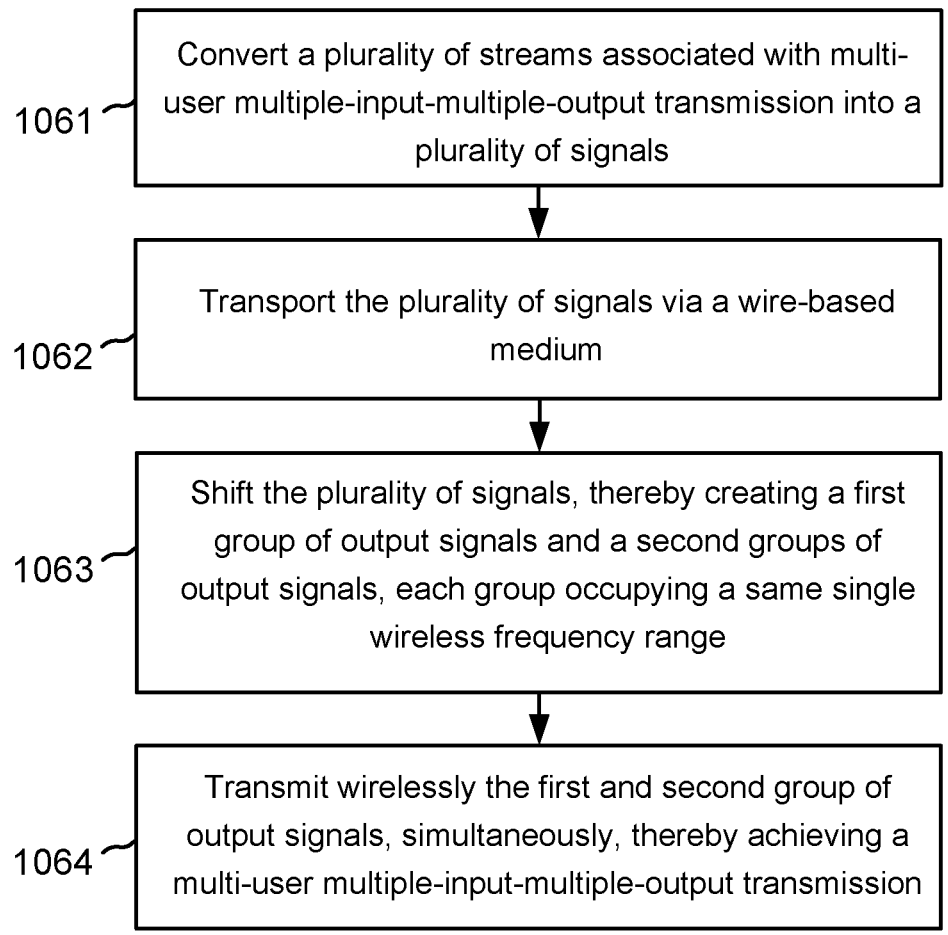
FIG. 11 illustrates one embodiment of a method for achieving spatial-division-multiple-access via a wire-based medium by grouping of streams in conjunction with a plurality of spatial locations.

The following paragraphs are associated with FIG. 5, FIG. 11.

FIG. 11 illustrates one embodiment of a method for achieving spatial-division-multiple-access via a wire-based medium by grouping of streams in conjunction with a plurality of spatial locations. In step 1061, converting, by a base converter 1-BC, a plurality of streams 1-st-1, 1-st-2, 1-st-3, 1-st-4, 1-st-5, 1-st-n respectively into a plurality of signals 2-sig-1, 2-sig-2, 2-sig-3, 2-sig-4, 2-sig-5, 2-sig-n occupying respectively a plurality of different frequency ranges 2-fr-1, 2-fr-2, 2-fr-3, 2-fr-4, 2-fr-5, 2-fr-n, in which the plurality of streams are associated with a multi-user multiple-input-multiple-output transmission. In step 1062, transporting, by the base converter 1-BC, a first sub-set 2-sig-1, 2-sig-2, 2-sig-3 (2-group-1) of the plurality of signals via a wire-based medium 2-WM respectively to a first group of mixers 3-x-1, 3-x-2, 3-x-3 (3-group-1), and a second sub-set 2-sig-4, 2-sig-5, 2-sig-n (2-group-2) of the plurality of signals via the wire-based medium 2-WM respectively to a second group of mixers 3-x-4, 3-x-5, 3-x-n (3-group-2). In step 1063, shifting, by each of the first group of mixers 3-x-1, 3-x-2, 3-x-3 (3-group-1), the respective one of the signals from the respective frequency range to a single wireless frequency range 4-wfr (i.e., 3-x-1 is shifting 2-sig-1 from 2-fr-1 to 4-wfr, 3-x-2 is shifting 2-sig-2 from 2-fr-2 to 4-wfr, and 3-x-3 is shifting 2-sig-3 from 2-fr-3 to 4-wfr), thereby creating, respectively, a first group of output signals 4-out-1, 4-out-2, 4-out-3 (4-group-1) each occupying the single wireless frequency range 4-wfr and corresponding to the respective stream (i.e. 4-out-1 corresponding to 1-st-1, 4-out-2 corresponding to 1-st-2, and 4-out-3 corresponding to 1-st-3), and shifting, by each of the second group of mixers 3-x-4, 3-x-5, 3-x-n (3-group-2), the respective one of the signals from the respective frequency range to the single wireless frequency range 4-wfr (i.e., 3-x-4 is shifting 2-sig-4 from 2-fr-4 to 4-wfr, 3-x-5 is shifting 2-sig-5 from 2-fr-5 to 4-wfr, and 3-x-n is shifting 2-sig-n from 2-fr-n to 4-wfr), thereby creating, respectively, a second group of output signals 4-out-4, 4-out-5, 4-out-n (4-group-2) each occupying the single wireless frequency range 4-wfr and corresponding to the respective stream (i.e. 4-out-4 corresponding to 1-st-5, 4-out-5 corresponding to 1-st-5, and 4-out-n corresponding to 1-st-n). In step 1064, transmitting, as a first transmission, wirelessly the first group of output signals 4-group-1 via a first group of antennas 3-ant-1, 3-ant-2, 3-ant-3 thereby achieving spatial multiplexing in conjunction with the first group of output signals 4-group-1 all occupying the single wireless frequency range 4-wfr, and transmitting, as a second transmission, wirelessly the second group of output signals 4-group-2 via a second group of antennas 3-ant-4, 3-ant-5, 3-ant-n thereby achieving spatial multiplexing in conjunction with the second group 4-group-2 of output signals all occupying the single wireless frequency range 4-wfr, and thereby facilitating a multi-user multiple-input-multiple-output transmission, in which the two transmissions are done simultaneously or concurrently over the single wireless frequency range 4-wfr, such that a first client device 5-cl-1 receives the first transmission simultaneously or substantially simultaneously to a second client device 5-cl-2 receiving the second transmission.

In one embodiment, the first group of output signals 4-group-1 transmitted wirelessly is associated with a first spatial location 4-loc-1 also associated with the first client 5-cl-1, and the second group of output signals 4-group-2 transmitted wirelessly is associated with a second spatial location 4-loc-2 also associated with the second client device 5-cl-2, such that the first group of output signals 4-group-1 is received in the second spatial location 4-loc-2 by the second client device 5-cl-2 at a power level that is at least 10 (ten) decibel below a power level at which the second group of output signals 4-group-2 is received in the second spatial location 4-loc-2 by the second client device 5-cl-2; and the second group of output signals 4-group-2 is received in the first spatial location 4-loc-1 by the first client device 5-cl-1 at a power level that is at least 10 (ten) decibel below a power level at which the first group of output signals 4-group-1 is received in the first spatial location 4-loc-1 by the first client device 5-cl-1, thereby further facilitating the multi-user multiple-input-multiple-output transmission without a need to perform a sounding procedure.

In one embodiment, the multi-user multiple-input-multiple-output transmission is achieved in conjunction with a sounding procedure done with the first client device 5-cl-1 and the second client device 5-cl-2, such that the second transmission does not interfere with the first transmission and vice versa.

In one embodiment, the multi-user multiple-input-multiple-output transmission is associated with IEEE 802.11 ac.

One embodiment is a system 1-BC, 2-WM, 3-x-1, 3-x-2, 3-x-3, 3-x-4, 3-x-5, 3-x-n, 3-ant-1, 3-ant-2, 3-ant-3, 3-ant-4, 3-ant-5, 3-ant-n, configured to achieve spatial-division-multiple-access via a wire-based medium by grouping of streams in conjunction with a plurality of spatial locations, for example as illustrated in FIG. 5.

Figure 6A:
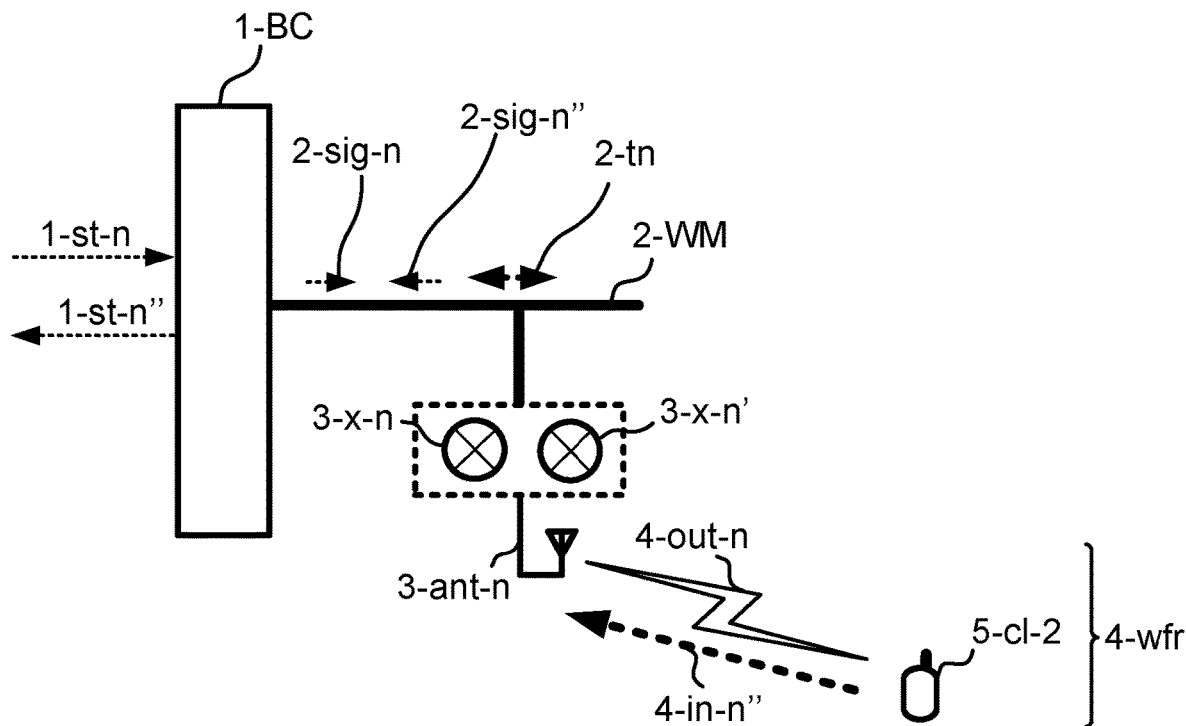
FIG. 6A illustrates one embodiment of a system operative to use wireless frame aggregation to mitigate wire-based interferences.
Figure 6B:
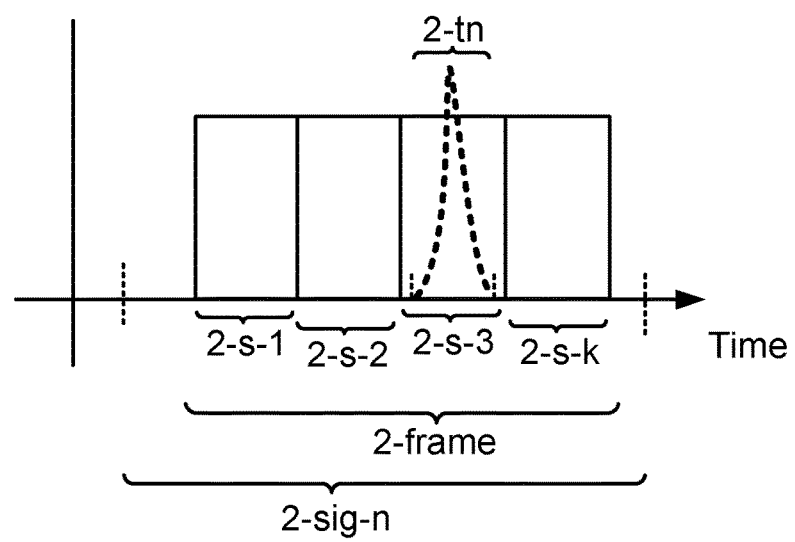
FIG. 6B illustrates one embodiment of a transient interference appearing in an aggregated data frame and in conjunction with the system operative to use wireless frame aggregation to mitigate wire-based interferences.
Figure 12:
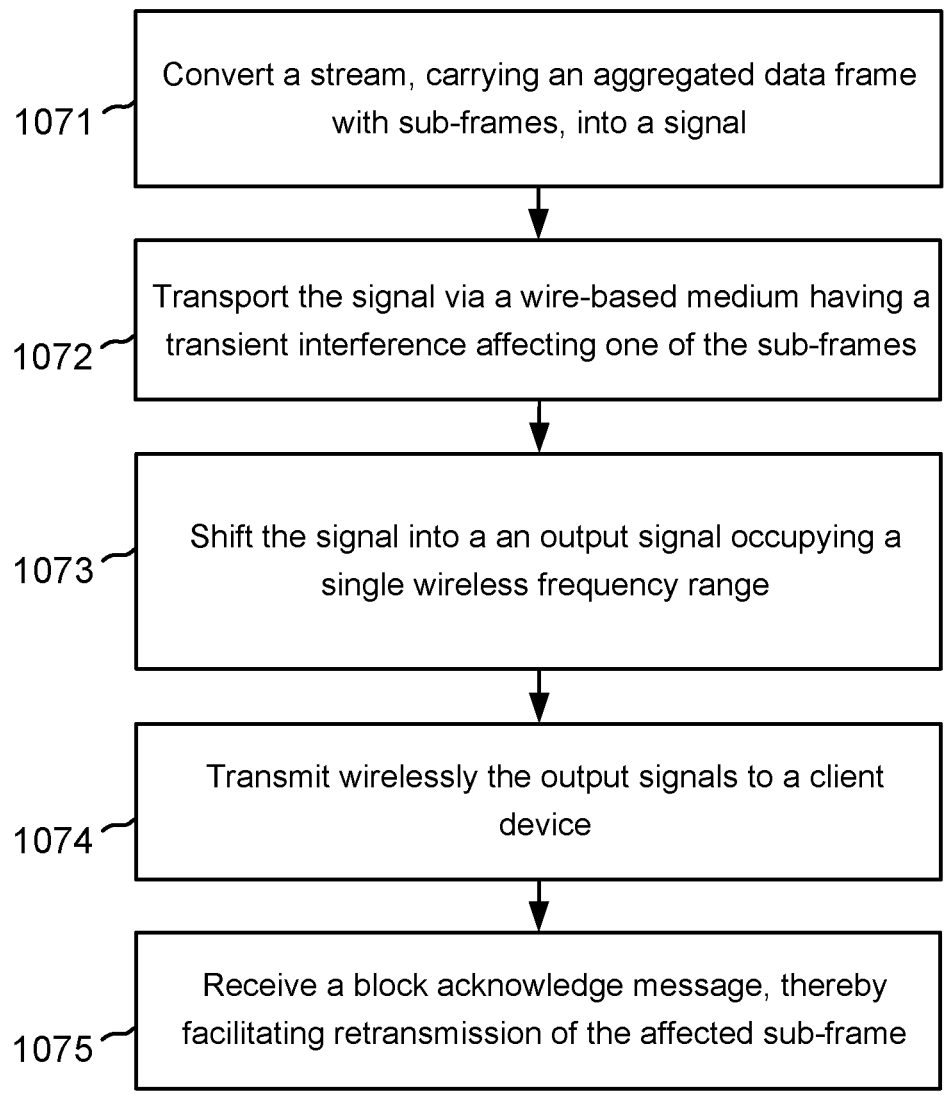
FIG. 12 illustrates one embodiment of a method for using wireless frame aggregation to mitigate wire-based interferences.

The following paragraphs are associated with FIG. 6A, FIG. 6B, FIG. 12.

FIG. 12 illustrates one embodiment of a method for using wireless frame aggregation to mitigate wire-based interferences. In step 1071, converting, by a base converter 1-BC, at least one stream 1-st-n respectively into at least one signal 2-sig-n occupying respectively at least one frequency range 2-fr-n, in which the stream is conveying an aggregated data frame 2-frame comprising a plurality of sub-frames 2-s-1, 2-s-2, 2-s-3, 2-s-k. In step 1072, transporting, by the base converter 1-BC, the signal 2-sig-n via a wire-based medium 2-WM respectively to at least one mixer 3-x-n, in which a transient interference 2-tn associated with the wire-based medium 2-WM affects at least one sub-frame 2-s-3 in the aggregated data frame 2-frame conveyed by the signal 2-sig-n, but not all of the sub-frames in the aggregated data frame. In step 1073, shifting, by the mixer 3-x-n, the signal 2-sig-n from the respective frequency 2-fr-n range to a single wireless frequency range 4-wfr, thereby creating, respectively, at least one output signal 4-out-n occupying the single wireless frequency range 4-wfr and corresponding to the respective stream 1-st-n, in which the sub-frame 2-s-3 affected by the transient interference 2-tn is present in the output signal 4-out-n. In step 1074, transmitting wirelessly the output signal 4-out-n, respectively via at least one antenna 3-ant-n to a client device 5-cl-2. In step 1075, receiving 1-st-n'', 2-sig-n'', from the client device 5-cl-2, a block acknowledge message 4-in-n'' comprising an indication of which of the sub-frames 2-s-3 were affected by the transient interference 2-tn, thereby facilitating retransmission of the affected sub-frames 2-s-3.

In one embodiment, the wire-based medium 2-WM is a coaxial cable deployed in-house.

In one embodiment, the frequency 2-fr-1 is located below 1.5 GHz, at a frequency zone that is, at least momentarily, not occupied by in-house coaxial signals such as DOCSIS signals, MoCA signals, and cable TV signals.

In one embodiment, the transient interference 2-tn is associated with ingress noise occurring in conjunction with the coaxial cable deployed in-house.

In some embodiments, in-house can include a house, a building, or other structure that can include one or more rooms.

In one embodiment, the frame aggregation and block acknowledge are associated with IEEE 802.11n or IEEE 802.11ac.

One embodiment is a system 1-AP, 1-BC, 2-WM, 3-x-n, 3-x-n', 3-ant-n, configured to use wireless frame aggregation to mitigate wire-based interferences.

The following paragraphs are associated with FIG. 1A, FIG. 1B, FIG. 1C, FIG. 13.

Figure 13:
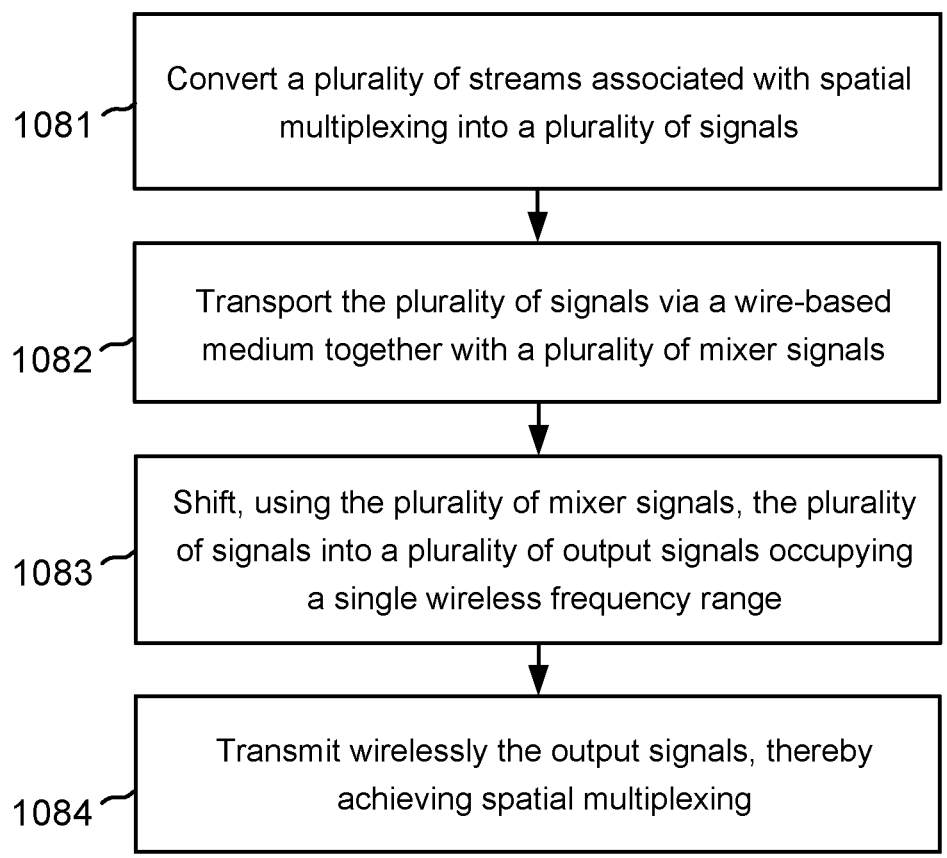
FIG. 13 illustrates one embodiment of a method for transporting a plurality of streams associated with spatial multiplexing over a wire-based medium together with corresponding mixer signals.

FIG. 13 illustrates one embodiment of a method for transporting a plurality of streams associated with spatial multiplexing over a wire-based medium together with corresponding mixer signals. In step 1081, converting, by a base converter 1-BC, a plurality of streams 1-st-1, 1-st-2, 1-st-3, 1-st-4, 1-st-5, 1-st-n respectively into a plurality of signals 2-sig-1, 2-sig-2, 2-sig-3, 2-sig-4, 2-sig-5, 2-sig-n occupying respectively a plurality of different frequency ranges 2-fr-1, 2-fr-2, 2-fr-3, 2-fr-4, 2-fr-5, 2-fr-n, in which the plurality of streams are associated with spatial multiplexing. In step 1082, transporting, by the base converter 1-BC, the plurality of signals 2-sig-1, 2-sig-2, 2-sig-3, 2-sig-4, 2-sig-5, 2-sig-n together with a plurality of mixer signals 2-clk-1, 2-clk-2, 2-clk-3, 2-clk-4, 2-clk-5, 2-clk-n (see FIG. 1C), associated respectively with the plurality of signals, via a wire-based medium 2-WM respectively to a plurality of mixers 3-x-1, 3-x-2, 3-x-3, 3-x-4, 3-x-5, 3-x-n. In step 1083, shifting, by each of the of mixers 3-x-1, 3-x-2, 3-x-3, 3-x-4, 3-x-5, 3-x-n, using the respective mixer signal 2-clk-1, 2-clk-2, 2-clk-3, 2-clk-4, 2-clk-5, 2-clk-n, the respective one of the signals from the respective frequency range to a single wireless frequency range 4-wfr (i.e., 3-x-1 is shifting 2-sig-1 from 2-fr-1 to 4-wfr using 2-clk-1 as an input clock to 3-x-1, 3-x-2 is shifting 2-sig-2 from 2-fr-2 to 4-wfr using 2-clk-2 as an input clock to 3-x-2, etc.), thereby creating, respectively, a plurality of output signals 4-out-1, 4-out-2, 4-out-3, 4-out4, 4-out-5, 4-out-n each occupying the single wireless frequency range 4-wfr and corresponding to the respective stream. In step 1084, transmitting wirelessly the plurality of output signals 4-out-1, 4-out-2, 4-out-3, 4-out4, 4-out-5, 4-out-n via a plurality of antennas 3-ant-1, 3-ant-2, 3-ant-3, 3-ant-4, 3-ant-5, 3-ant-n, thereby achieving spatial multiplexing in conjunction with the plurality of output signals 4-out-1, 4-out-2, 4-out-3, 4-out4, 4-out-5, 4-out-n all occupying the single wireless frequency range 4-wfr.

In one embodiment, the plurality of signals 2-sig-1, 2-sig-2, 2-sig-3, 2-sig-4, 2-sig-5, 2-sig-n and the plurality of output signals 4-out-1, 4-out-2, 4-out-3, 4-out4, 4-out-5, 4-out-n are OFDM or OFDMA signals associated with a standard selected from a group consisting of (i) wifi, (ii) wimax, and (iii) LTE.

In one embodiment, the wire-based medium 2-WM is a coaxial cable deployed in-house. In some embodiments, in-house can include a house, a building, or other structure that can include one or more rooms.

In one embodiment, the plurality of different frequency ranges 2-fr-1, 2-fr-2, 2-fr-3, 2-fr-4, 2-fr-5, 2-fr-n are located below 1.5 GHz, at frequency zones that are, at least momentarily, not occupied by in-house coaxial signals such as DOCSIS signals, MoCA signals, and cable TV signals.

In one embodiment, the wire-based medium 2-WM is selected from a group consisting of: (i) a coaxial cable, (ii) a twisted-pair cable, (iii) category-5 cable, and (iv) any cable capable of facilitating propagation of electromagnetic signals.

One embodiment is a system 1-BC, 2-WM, 3-x-1, 3-x-2, 3-x-3, 3-x-4, 3-x-5, 3-x-n, 3-ant-1, 3-ant-2, 3-ant-3, 3-ant-4, 3-ant-5, 3-ant-n, configured to transport a plurality of streams associated with spatial multiplexing over a wire-based medium together with corresponding mixer signals.

Figure 14A:
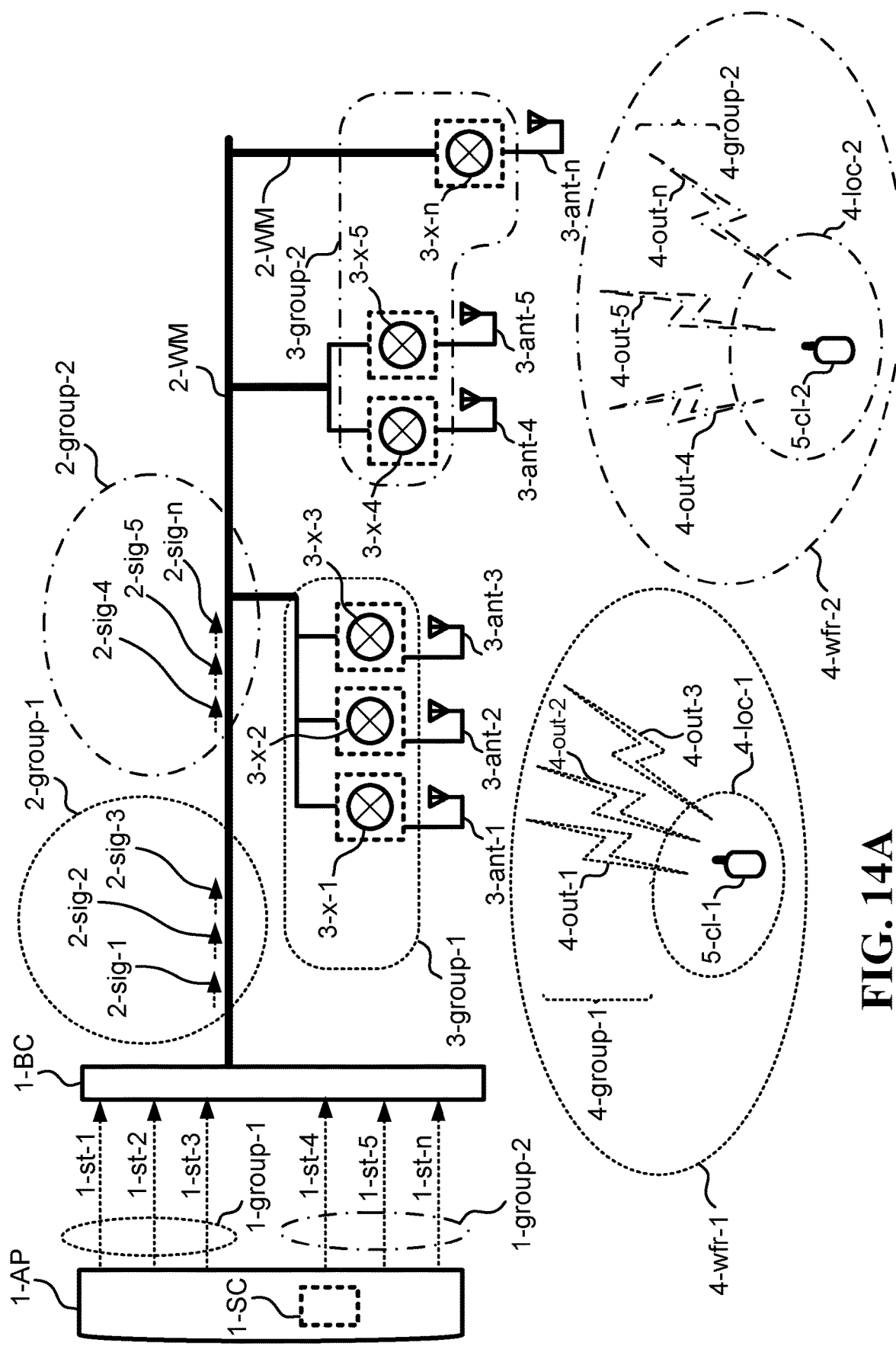
FIG. 14A illustrates one embodiment of a system operative to generate simultaneously two multiple-input-multiple-output (MIMO) transmissions using two separate wireless frequency ranges.
Figure 14B:
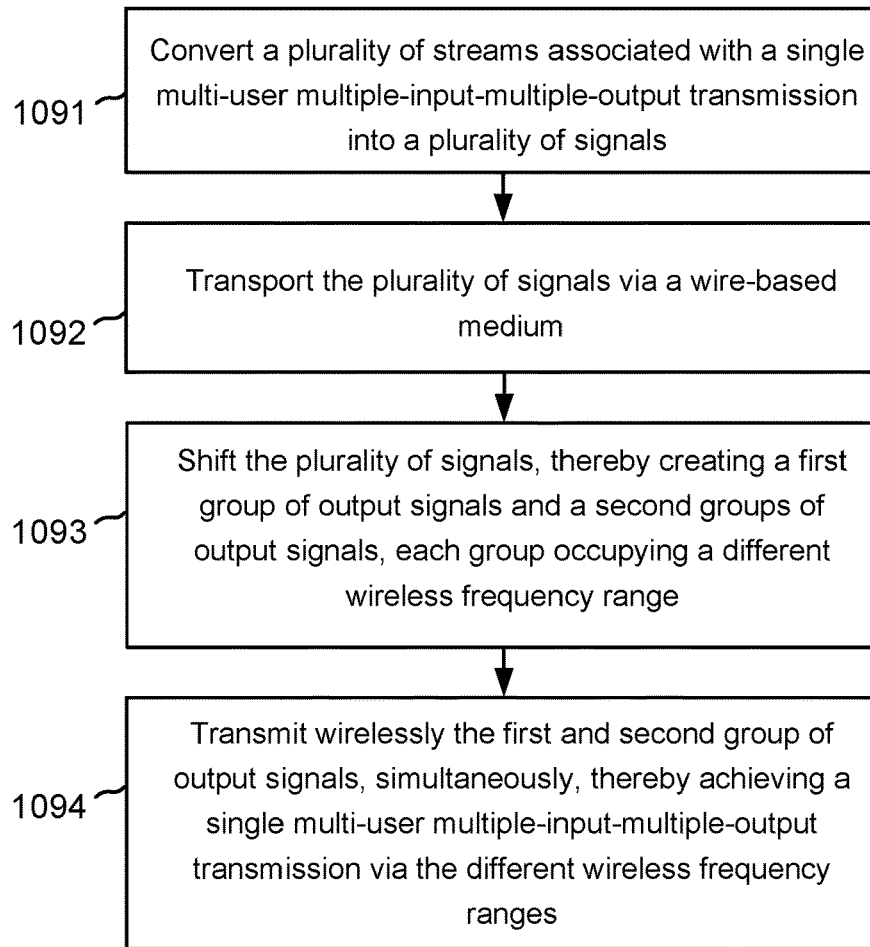
FIG. 14B illustrates one embodiment of a method for generating simultaneously two multiple-input-multiple-output (MIMO) transmissions using two separate wireless frequency ranges.
Figure 14C:
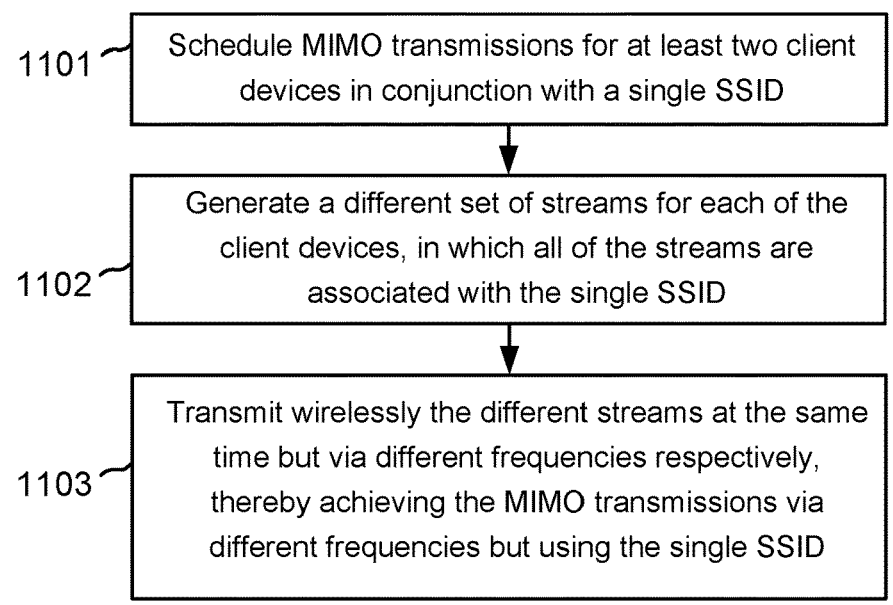
FIG. 14C illustrates one embodiment of a method for generating simultaneously two multiple-input-multiple-output (MIMO) transmissions associated with a single service-set-identifier (SSID) but using two separate wireless frequency ranges.

The following paragraphs are associated with FIG. 14A, FIG. 14B, and FIG. 14C.

FIG. 14A illustrates one embodiment of a system operative to generate simultaneously two multiple-input-multiple-output (MIMO) transmissions using two separate wireless frequency ranges. The system includes an access point 1-AP comprising a single scheduling component 1-SC, in which the single scheduling component is configured to schedule at least a first MIMO transmission and a second MIMO transmission to occur simultaneously over a predetermined time period, and in which the access point is configured to generate, based on said schedule, during the predetermined time period, a first set 1-group-1 of streams 1-st-1, 1-st-2, 1-st-3 associated with the first MIMO transmission and a second set 1-group-2 of streams 1-st-4, 1-st-5, 1-st-n associated with the second MIMO transmission. The system further includes a first group 3-group-1 of mixers 3-x-1, 3-x-2, 3-x-3 associated with a first group of antennas 3-ant-1, 3-ant-2, 3-ant-3 and a second group 3-group-2 of mixers 3-x-4, 3-x-5, 3-x-n associated with a second group of antennas 3-ant-4, 3-ant-5, 3-ant-n.

In one embodiment, the first group 3-group-1 of mixers 3-x-1, 3-x-2, 3-x-3 is configured to transmit, via the first group of antennas ant-1, 3-ant-2, 3-ant-3, at a first wireless frequency range 4-wfr-1 and during the predetermined time period, a first group 4-group-1 of output signals 4-out-1, 4-out-2, 4-out-3 associated respectively with the first set 1-group-1 of streams 1-st-1, 1-st-2, 1-st-3, thereby achieving the first MIMO transmission in conjunction with the first wireless frequency range 4-wfr-1, and the second group 3-group-2 of mixers 3-x-4, 3-x-5, 3-x-n is configured to transmit, via the second group of antennas 3-ant-4, 3-ant-5, 3-ant-n, at a second wireless frequency range 4-wfr-2 and during the same predetermined time period, a second group 4-group-2 of output signals 4-out-4, 4-out-5, 4-out-n associated respectively with the second set 1-group-2 of streams 1-st-4, 1-st-5, 1-st-n, thereby achieving the second MIMO transmission in conjunction with the second wireless frequency range 4-wfr-2.

In one embodiment, the first wireless frequency range 4-wfr-1 and the second wireless frequency range 4-wfr-2 are two separate wireless frequency ranges that prevent, at least partially, electromagnetic interferences between the first MIMO transmission and second MIMO transmission all occurring simultaneously.

In one embodiment, the system further includes: a wire-based medium 2-WM, and a base converter 1-BC. The base converter 1-BC is configured to: convert the first set 1-group-1 of streams 1-st-1, 1-st-2, 1-st-3 into a first plurality 2-group-1 of signals 2-sig-1, 2-sig-2, 2-sig-3 occupying respectively a first plurality of different frequency ranges, and convert the second set 1-group-2 of streams 1-st-4, 1-st-5, 1-st-n into a second plurality 2-group-2 of signals 2-sig-4, 2-sig-5, 2-sig-n occupying respectively a second plurality of different frequency ranges that are different than the first plurality of different frequency ranges. The base converter 1-BC is further configured to: transport the first plurality of signals 2-sig-1, 2-sig-2, 2-sig-3 via the wire-based medium 2-WM to the first group of mixers 3-x-1, 3-x-2, 3-x-3, and transport the second plurality of signals 2-sig-4, 2-sig-5, 2-sig-n via the wire-based medium 2-WM to the second group of mixers 3-x-4, 3-x-5, 3-x-n. Each mixer 3-x-1, 3-x-2, 3-x-3 of the first group 3-group-1 of mixers is configured to: shift one 2-sig-1, 2-sig-2, 2-sig-3 of the first plurality 2-group-1 of signals from the respective frequency range to the first wireless frequency range 4-wfr-1, thereby facilitating said generation of the first group 4-group-1 of output signals 4-out-1, 4-out-2, 4-out-3 each occupying the first wireless frequency range 4-wfr-1, and each mixer 3-x-4, 3-x-5, 3-x-n of the second group 3-group-2 of mixers is configured to: shift one 2-sig-4, 2-sig-5, 2-sig-n of the second plurality 2-group-2 of signals from the respective frequency range to the second wireless frequency range 4-wfr-2, thereby facilitating said generation of the second group 4-group-2 of output signals 4-out-4, 4-out-5, 4-out-n each occupying the second wireless frequency range 4-wfr-2.

In one embodiment, the wire-based medium 2-WM is selected from a group consisting of: (i) a coax cable, (ii) a twisted-pair cable, (iii) category-5 cable, and (iv) any cable capable of facilitating propagation of electromagnetic signals.

In one embodiment, the wire-based medium 2-WM is placed in-house, the first group 3-group-1 of mixers 3-x-1, 3-x-2, 3-x-3 is placed in a first room 4-loc-1 in-house, such that the first MIMO transmission is situated in the first room and directed to a first client device 5-cl-1 located in the first room, and the second group 3-group-2 of mixers 3-x-4, 3-x-5, 3-x-n is placed in a second room 4-loc-2 in-house, such that the second MIMO transmission is situated in the second room and directed to a second client device 5-cl-2 located in the second room. In some embodiments, in-house can include a house, a building, or other structure that can include one or more rooms.

In one embodiment, the first wireless frequency range 4-wfr-1 and the second wireless frequency range 4-wfr-2 are two separate wireless frequency ranges that prevent, at least partially, electromagnetic interferences between the first MIMO transmission and second MIMO transmission all occurring simultaneously, in which said prevention is further facilitated by said location of the first client device 5-cl-1 and the first group 3-group-1 of mixers 3-x-1, 3-x-2, 3-x-3 in the first room 4-loc-1, and said location of the second client device 5-cl-2 and the second group 3-group-2 of mixers 3-x-4, 3-x-5, 3-x-n in the second room 4-loc-2.

In one embodiment, the access point 1-AP is a wifi access point supporting at least partly a standard associated with IEEE 802.11, such as IEEE 802.11n or IEEE 802.11 ac, in which said scheduling of the first MIMO transmission and the second MIMO transmission is part of the standard in conjunction with a single multi-user multiple-input-multiple-output (MU-MIMO) transmission technique.

In one embodiment, said scheduling and generation of the first MIMO transmission and the second MIMO transmission are accomplished in the wifi access point 1-AP in conjunction with the single MU-MIMO transmission, in which the wifi access point is unaware of the first and second different frequency ranges 4-wfr-1, 4-wfr-2 which are not part of said standard when appearing together in a single MU-MIMO transmission, and which are introduced independently by the base converter.

In one embodiment, the access point 1-AP is an LTE access point or an LTE base-station supporting at least partly a standard associated with LTE, in which said scheduling of the first MIMO transmission and the second MIMO transmission is part of the standard.

FIG. 14B illustrates one embodiment of a method for generating simultaneously two multiple-input-multiple-output (MIMO) transmissions using two separate wireless frequency ranges. In step 1091, converting, by a base converter 1-BC, a plurality of streams 1-st-1, 1-st-2, 1-st-3, 1-st-4, 1-st-5, 1-st-n respectively into a plurality of signals 2-sig-1, 2-sig-2, 2-sig-3, 2-sig-4, 2-sig-5, 2-sig-n occupying respectively a plurality of different frequency ranges, in which the plurality of streams are associated with a single multi-user multiple-input-multiple-output (MU-MIMO) transmission operative to convey, simultaneously, at least two separate MIMO transmissions respectively to at least two separate client devices 5-cl-1, 5-cl-2. In step 1092, transporting, by the base converter 1-BC, a first sub-set 2-group-1 of the plurality of signals via a wire-based medium 2-WM respectively to a first group 3-group-1 of mixers 3-x-1, 3-x-2, 3-x-3, and a second sub-set 2-group-2 of the plurality of signals via the wire-based medium 2-WM respectively to a second group 3-group-2 of mixers 3-x-4, 3-x-5, 3-x-n. In step 1093, shifting, by each mixer 3-x-1, 3-x-2, 3-x-3 of the first group of mixers 3-group-1, the respective one of the signals 2-sig-1, 2-sig-2, 2-sig-3 from the respective frequency range to a first wireless frequency range 4-wfr-1, thereby creating, respectively, a first group 4-group-1 of output signals 4-out-1, 4-out-2, 4-out-3 each occupying the first wireless frequency range 4-wfr-1 and corresponding to the respective stream 1-st-1, 1-st-2, 1-st-3, and shifting, by each mixer 3-x-4, 3-x-5, 3-x-n of the second group of mixers 3-group-2, the respective one of the signals 2-sig-4, 2-sig-5, 2-sig-n from the respective frequency range to a second wireless frequency range 4-wfr-2, thereby creating, respectively, a second group 4-group-2 of output signals 4-out-4, 4-out-5, 4-out-n each occupying the second wireless frequency range 4-wfr-2 and corresponding to the respective stream 1-st-4, 1-st-5, 1-st-n. In step 1094, transmitting wirelessly, as a first MIMO transmission, the first group 4-group-1 of output signals 4-out-1, 4-out-2, 4-out-3 via a first group of antennas 3-ant-1, 3-ant-2, 3-ant-3 thereby achieving spatial multiplexing in conjunction with the first group 4-group-1 of output signals 4-out-1, 4-out-2, 4-out-3 all occupying the first wireless frequency range 4-wfr-1, and transmitting wirelessly, as a second MIMO transmission, the second group 4-group-2 of output signals 4-out-4, 4-out-5, 4-out-n via a second group of antennas 3-ant-4, 3-ant-5, 3-ant-n thereby achieving spatial multiplexing in conjunction with the second group 4-group-2 of output signals 4-out-4, 4-out-5, 4-out-n all occupying the second wireless frequency range 4-wfr-2, and thereby facilitating the single MU-MIMO transmission, in which the two MIMO transmissions are done simultaneously over, respectively, the first and second frequency ranges 4-wfr-1, 4-wfr-2, such that a first client device 5-cl-1 receives the first MIMO transmission simultaneously with a second client device 5-cl-2 receiving the second MIMO transmission.

In one embodiment, the plurality of streams 1-st-1, 1-st-2, 1-st-3, 1-st-4, 1-st-5, 1-st-n comprises: (i) a first sub-set 1-group-1 of the plurality of streams associated with the first subset 2-group-1 of the plurality of signals and the first MIMO transmission, and (ii) a second subset 1-group-2 of the plurality of streams associated with the second subset 2-group-2 of the plurality of signals and the second MIMO transmission, and further comprising: scheduling, by a single scheduling component 1-SC of an access point 1-AP, the first and second MIMO transmissions to occur simultaneously during a certain transmission period, and producing by the access point 1-AP, according to said scheduling, the first MIMO transmission together with the second MIMO transmission in conjunction with the certain transmission period, by generating, respectively, the first sub-set 1-group-1 and second sub-set 1-group-2 of the plurality of streams in conjunction with the certain transmission period.

In one embodiment, the first sub-set 1-group-1 of the plurality of streams is generated so as to achieve said spatial multiplexing in conjunction with the first client device 5-cl-1 using a MU-MIMO technique, and the second sub-set 1-group-2 of the plurality of streams is generated so as to achieve said spatial multiplexing in conjunction with the second client device 5-cl-2 using the MU-MIMO technique.

In one embodiment, the access point 1-AP, the single MU-MIMO transmission, and the scheduling component 1-SC, are all associated with a space-division multiple access (SDMA) transmission scheme, in which the first and second MIMO transmissions are indented, by the access point, to happen via one single wireless frequency range, but in which the base converter 1-BC in conjunction with the first 3-group-1 and second 3-group-2 groups of mixers, together cause the first transmission to happen in a different wireless frequency range 4-wfr-1 than the wireless frequency range 4-wfr-2 of the second transmission, thereby enabling a better transmission performance in conjunction with the single MU-MIMO transmission.

In one embodiment, as a result of said causing the first MIMO transmission to happen in a different wireless frequency range 4-wfr-1 than the wireless frequency range 4-wfr-2 of the second MIMO transmission, the SDMA transmission scheme is used without a sounding procedure, and thereby further enabling a better transmission performance in conjunction with the MU-MIMO transmission.

FIG. 14C illustrates one embodiment of method for generating simultaneously two multiple-input-multiple-output (MIMO) transmissions associated with a single service-set-identifier (SSID) but using two separate wireless frequency ranges. In step 1101, scheduling, by a single scheduling component 1-SC (FIG. 14A) belonging to an access point 1-AP, at least a first MIMO transmission intended for a first client device 5-cl-1 and a second MIMO transmission intended to a second client device 5-cl-2, to occur simultaneously over a predetermined time period and in conjunction with a single SSID. In step 1102, generating, by the access point 1-AP (FIG. 14A), based on said schedule, during the predetermined time period, a first set 1-group-1 of streams 1-st-1, 1-st-2, 1-st-3 associated with the first MIMO transmission and a second set 1-group-2 of streams 1-st-4, 1-st-5, 1-st-n associated with the second MIMO transmission, in which all of said streams 1-st-1, 1-st-2, 1-st-3, 1-st-4, 1-st-5, 1-st-n are associated with said single SSID. In step 1103, transmitting, by a first group 3-group-1 (FIG. 14A) of mixers 3-$x$-1, 3-$x$-2, 3-$x$-3, via a first group of antennas 3-ant-1, 3-ant-2, 3-ant-3, at a first wireless frequency range 4-wfr-1 and during the predetermined time period, a first group 4-group-1 of output signals 4-out-1, 4-out-2, 4-out-3 associated respectively with the first set 1-group-1 of streams 1-st-1, 1-st-2, 1-st-3, thereby achieving the first MIMO transmission in conjunction with the first wireless frequency range 4-wfr-1 and said single SSID, and transmitting, by a second group 3-group-2 (FIG. 14A) of mixers 3-$x$-4, 3-$x$-5, 3-$x$-$n$, via a second group of antennas 3-ant-4, 3-ant-5, 3-ant-n, at a second wireless frequency range 4-wfr-2 and during the predetermined time period, a second group 4-group-2 of output signals 4-out-4, 4-out-5, 4-out-n associated respectively with the second set 1-group-2 of streams 1-st-4, 1-st-5, 1-st-n, thereby achieving the second MIMO transmission in conjunction with the second wireless frequency range 4-wfr-2 and said single SSID.

Figure 15A:
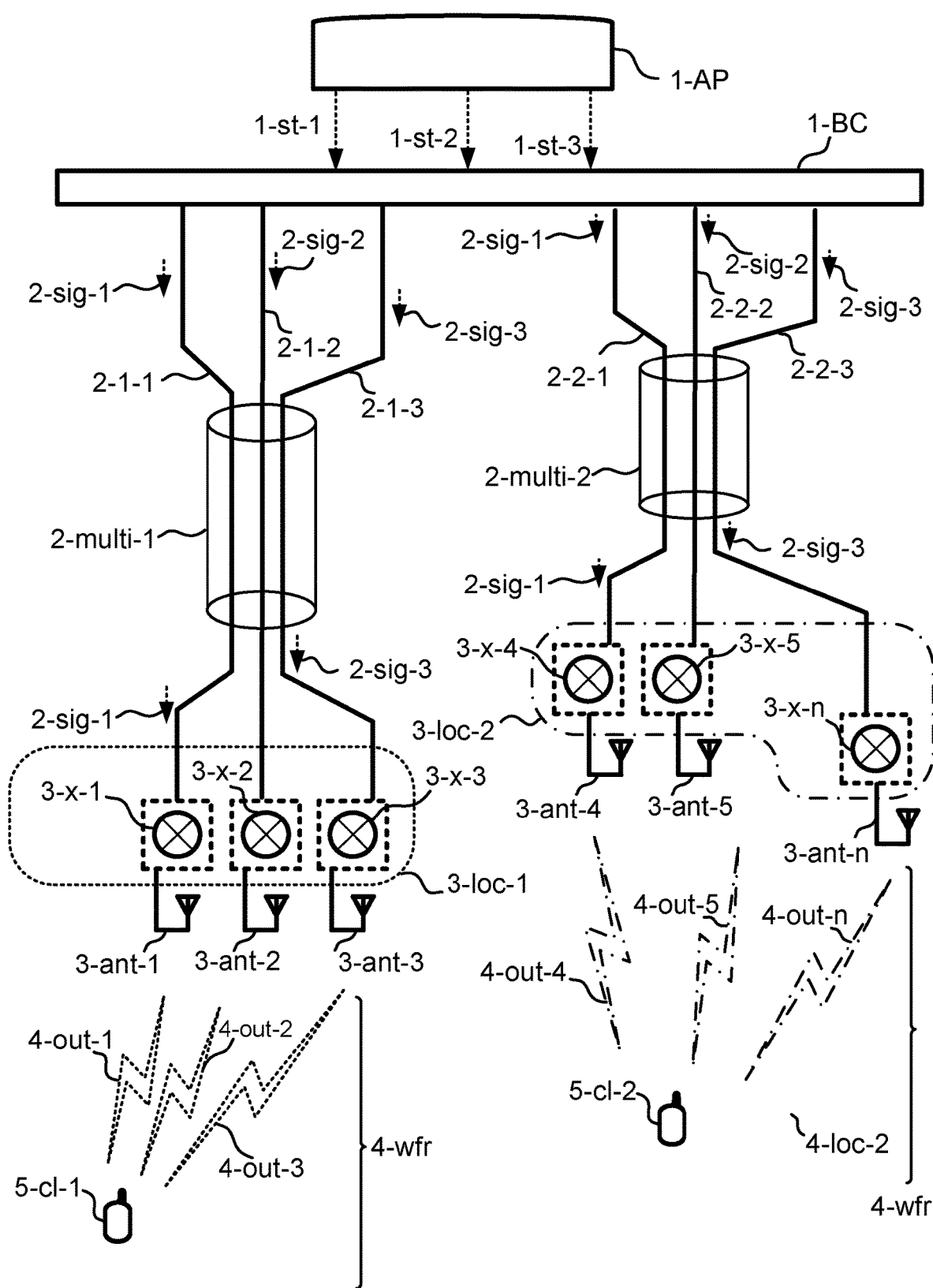
FIG. 15A illustrates one embodiment of a system operative to use spatial multiplexing in conjunction with a plurality of multi-conductor cables.
Figure 15B:
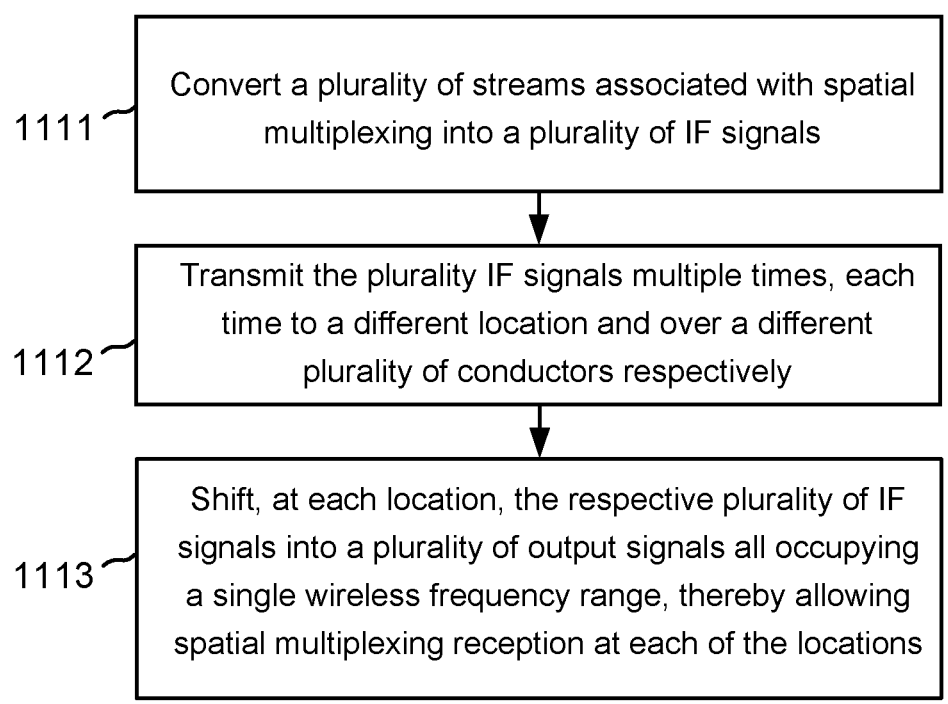
FIG. 15B illustrates one embodiment of a method for using spatial multiplexing in conjunction with a plurality of multi-conductor cables.

The following paragraphs are associated with FIGS. 15A and 15B.

FIG. 15A illustrates one embodiment of a system operative to use spatial multiplexing in conjunction with a plurality of multi-conductor cables. The system includes: an access point 1-AP operative to generate a plurality of streams 1-st-1, 1-st-2, 1-st-3 associated with spatial multiplexing, a base converter 1-BC operative to convert the plurality of streams 1-st-1, 1-st-2, 1-st-3 respectively into a plurality of intermediate frequency (IF) signals 2-sig-1, 2-sig-2, 2-sig-3, at least two multi-conductor cables 2-multi-1, 2-multi-2, in which each of the multi-conductor cables comprises a plurality of conductors (e.g., 2-multi-1 comprises of 2-1-1, 2-1-2, 2-1-3, and 2-multi-2 comprises of 2-2-1, 2-2-2, 2-2-3), and at least two pluralities of mixers (e.g., a first plurality 3-$x$-1, 3-$x$-2, 3-$x$-3 and a second plurality 3-$x$-4, 3-$x$-5, 3-$x$-$n$) associated respectively with the at least two multi-conductor cables 2-multi-1, 2-multi-2, in which each plurality of mixers is associated respectively with a plurality of antennas and is located at a specific location (e.g., 3-$x$-1, 3-$x$-2, 3-$x$-3 associated respectively with 3-ant-1, 3-ant-2, 3-ant-3 and located at 3-loc-1; and 3-$x$-4, 3-$x$-5, 3-$x$-$n$ associated respectively with 3-ant-4, 3-ant-5, 3-ant-n and located at 3-loc-2).

In one embodiment, each of the multi-conductor cables is configured to transport the plurality of IF signals, via the respective plurality of conductors, to the respective plurality of mixers (e.g., 2-multi-1 transports 2-sig-1, 2-sig-2, 2-sig-3 respectively via 2-1-1, 2-1-2, 2-1-3 respectively to 3-$x$-1, 3-$x$-2, 3-$x$-3; and 2-multi-2 transports 2-sig-1, 2-sig-2, 2-sig-3 respectively via 2-2-1, 2-2-2, 2-2-3 respectively to 3-$x$-4, 3-$x$-5, 3-$x$-$n$), and each of the plurality of mixers is configure to shift the plurality of IF signals respectively into a plurality of output signals, and transmit the plurality of output signals via the respective plurality of antennas to a respective client device, in which the respective client device is operative to utilize said spatial multiplexing in conjunction with reception of the respective plurality of output signals (e.g., 3-$x$-1, 3-$x$-2, 3-$x$-3 respectively shift 2-sig-1, 2-sig-2, 2-sig-3 into respectively 4-out-1, 4-out-2, 4-out-3 that are transmitted respectively via 3-ant-1, 3-ant-2, 3-ant-3 to be utilized by client device 5-cl-1; and 3-$x$-4, 3-$x$-5, 3-$x$-$n$ respectively shift 2-sig-1, 2-sig-2, 2-sig-3 into respectively 4-out-4, 4-out-5, 4-out-n that are transmitted respectively via 3-ant-4, 3-ant-5, 3-ant-n to be utilized by client device 5-cl-2).

In one embodiment, the plurality of streams 1-st-1, 1-st-2, 1-st-3 are input to the base converter 1-BC in a radio frequency form at frequency bands above 1.5 GHz, such as a 1.8 GHz band, a 1.9 GHz band, a 2.0 GHz band, a 2.3 GHz band, a 2.4 GHz band, a 2.5 GHz band, or a 5 GHz band, and said conversion of the plurality of streams 1-st-1, 1-st-2, 1-st-3 respectively into the plurality of IF signals 2-sig-1, 2-sig-2, 2-sig-3 is performed respectively by a plurality of mixers 1-xs in the base converter 1-BC operating as down-converters.

In one embodiment, the plurality of streams 1-st-1, 1-st-2, 1-st-3 are input to the base converter 1-BC in a digital form, and said conversion of the plurality of streams 1-st-1, 1-st-2, 1-st-3 respectively into the plurality of IF signals 2-sig-1, 2-sig-2, 2-sig-3 is a modulation process, such as OFDM modulation process.

In one embodiment, the plurality of streams 1-st-1, 1-st-2, 1-st-3 are input to the base converter 1-BC in a base-band form, and said conversion of the plurality of streams 1-st-1, 1-st-2, 1-st-3 respectively into the plurality of IF signals 2-sig-1, 2-sig-2, 2-sig-3 is performed respectively by a plurality of mixers 1-xs in the base converter 1-BC operating as up-converters.

FIG. 15B illustrates one embodiment of a method for using spatial multiplexing in conjunction with a plurality of multi-conductor cables. In step 1111, converting a plurality of streams 1-st-1, 1-st-2, 1-st-3 associated with spatial multiplexing into a plurality of intermediary frequency (IF) signals 2-sig-1, 2-sig-2, 2-sig-3. In step 1112, transmitting the plurality of IF signals 2-sig-1, 2-sig-2, 2-sig-3 at least twice: a first time 2-sig-1, 2-sig-2, 2-sig-3 respectively over a plurality of conductors 2-1-1, 2-1-2, 2-1-3 belonging to a first multi-conductor cable 2-multi-1 reaching a first location 3-loc-1, and a second time 2-sig-1, 2-sig-2, 2-sig-3 respectively over a plurality of conductors 2-2-1, 2-2-2, 2-2-3 belonging to a second multi-conductor cable 2-multi-2 reaching a second location 3-loc-2. In step 1113, shifting, at the first location 3-loc-1, the plurality of IF signals 2-sig-1, 2-sig-2, 2-sig-3 respectively into a first plurality of output signals 4-out-1, 4-out-2, 4-out-3 each occupying a single wireless frequency range 4-wfr, and transmitting the first plurality of output signals 4-out-1, 4-out-2, 4-out-3 respectively over a first plurality of antennas 3-ant-1, 3-ant-2, 3-ant-3, thereby allowing a first client device 5-cl-1 associated with the first location to utilize said spatial multiplexing in conjunction with the first plurality of output signals 4-out-1, 4-out-2, 4-out-3, and shifting, at the second location 3-loc-2, the plurality of IF signals 2-sig-1, 2-sig-2, 2-sig-3 respectively into a second plurality of output signals 4-out-4, 4-out-5, 4-out-n each occupying the single wireless frequency range 4-wfr, and transmitting the second plurality of output signals 4-out-4, 4-out-5, 4-out-n respectively over a second plurality of antennas 3-ant-4, 3-ant-5, 3-ant-n, thereby allowing a second client device 5-cl-2 associated with the second location to utilize said spatial multiplexing in conjunction with the second plurality of output signals 4-out-4, 4-out-5, 4-out-n.

In one embodiment, the first and second multi-conductor cables 2-multi-1, 2-multi-2 are multi-paired cables.

In one embodiment, the multi-paired cables 2-multi-1, 2-multi-2 are category 5 cables (CAT5).

In one embodiment, the plurality of streams 1-st-1, 1-st-2, 1-st-3 are formed together from a plurality of independent data streams 1-ds-1, 1-ds-2 as part of a conversion process associated with the spatial multiplexing, in which said utilization by the first client device 5-cl-1 comprises the first client device decoding the plurality of independent data streams 1-ds-1, 1-ds-2 from the first plurality of output signals 4-out-1, 4-out-2, 4-out-3 associated with the plurality of streams 1-st-1, 1-st-2, 1-st-3.

In one embodiment, said utilization by the second client device 5-cl-2 comprises the second client device decoding the plurality of independent data streams 1-ds-1, 1-ds-2 from the second plurality of output signals 4-out-4, 4-out-5, 4-out-n associated with the plurality of streams 1-st-1, 1-st-2, 1-st-3.

In one embodiment, said formation of the plurality of streams 1-st-1, 1-st-2, 1-st-3 comprises generating each of the streams from a linear combination of at least two of the independent data streams 1-ds-1, 1-ds-2, in accordance with said spatial multiplexing.

In one embodiment, the plurality of streams 1-st-1, 1-st-2, 1-st-3 are generated by an access point 1-AP.

In one embodiment, the access point 1-AP is a wifi access point supporting at least partly a standard associated with IEEE 802.11, such as IEEE 802.11n or IEEE 802.11 ac, in which the spatial multiplexing in conjunction with plurality of streams 1-st-1, 1-st-2, 1-st-3 is part of the standard.

In one embodiment, each of the plurality of IF signals has a bandwidth that is either 20 MHz, 40 MHz, 80 MHz, or 160 MHz.

In one embodiment, each of the plurality of IF signals has a center frequency located below 1 GHz.

In one embodiment, the single wireless frequency range is located in either a 2.4 GHz band or a 5 GHz band.

In one embodiment, the access point 1-AP is a LTE access point or a LTE base-station supporting at least partly a standard associated with LTE, in which the spatial multiplexing in conjunction with plurality of streams 1-st-1, 1-st-2, 1-st-3 is part of the standard.

In one embodiment, the first location 3-loc-1 is associated with a first room.

In one embodiment, the second location 3-loc-2 is associated with a second room.

In one embodiment, the first client device 5-cl-1 is located in the first room and the second client device 5-cl-2 is located in the second room, in which the first client device 5-cl-1 is unable to utilize the second plurality of output signals 4-out-4, 4-out-5, 4-out-n being too weak to be decoded in the first room, and the second client 5-cl-2 device is unable to utilize the first plurality of output signals 4-out-1, 4-out-2, 4-out-3 being too weak to be decoded in the second room.

Figure 16A:
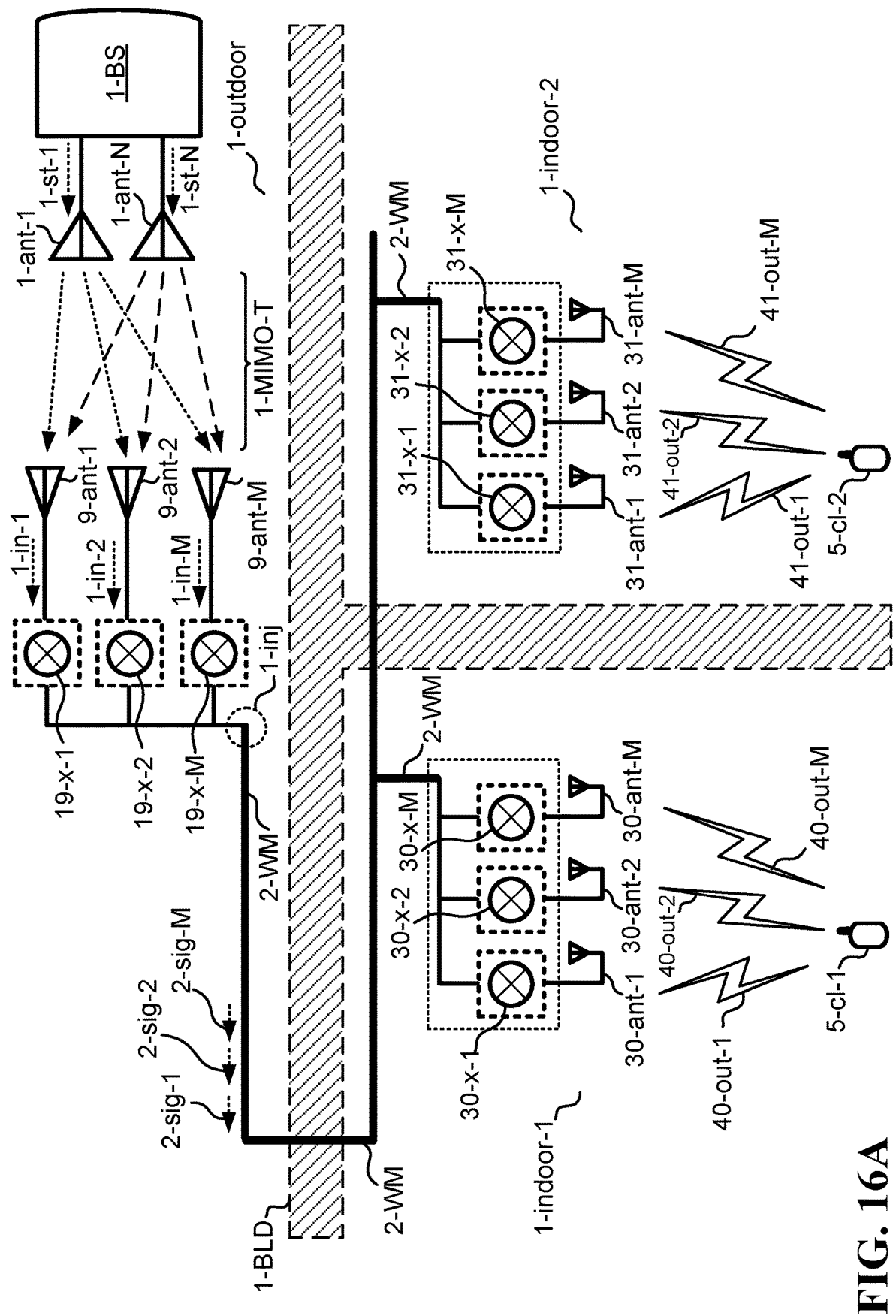
FIG. 16A illustrates one embodiment of a system operative to duplicated indoor several times a plurality of streams associated with spatial multiplexing and obtained outdoor.
Figure 16B:
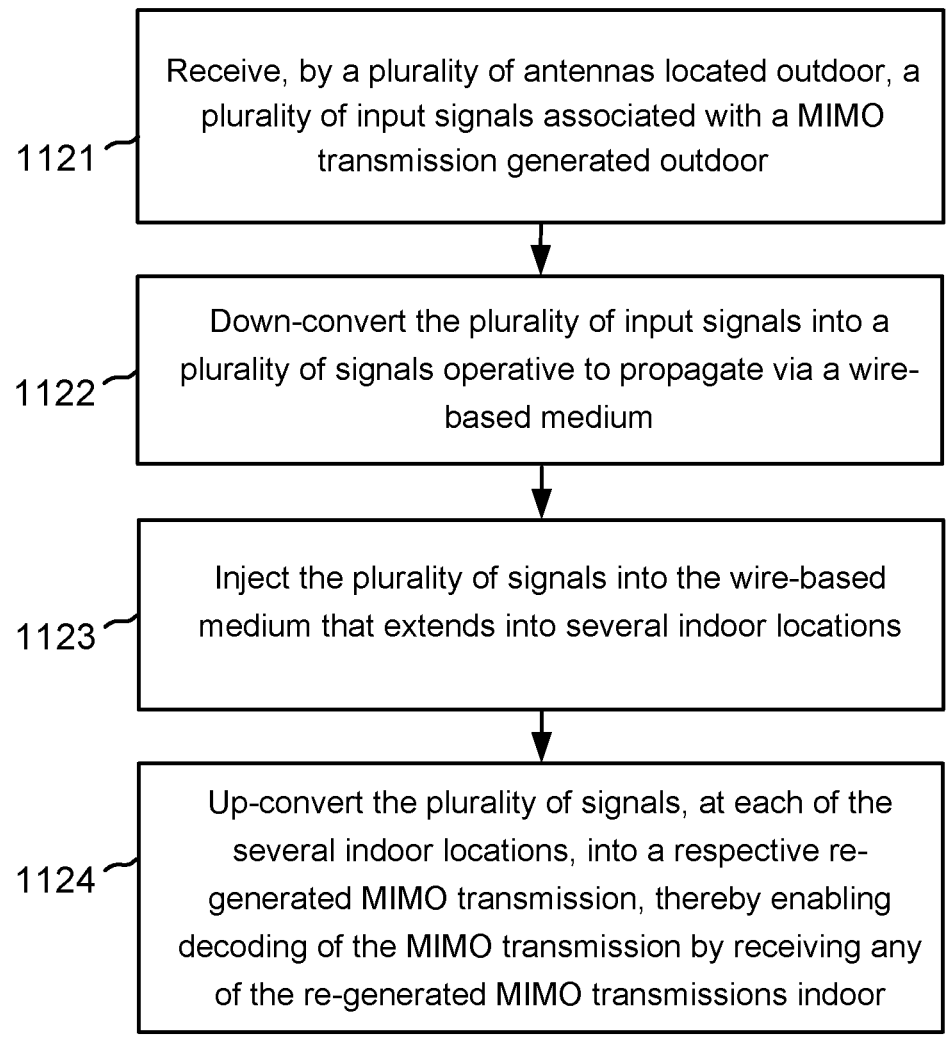
FIG. 16B illustrates one embodiment of a method for propagating multiple-input-multiple-output (MIMO) signals from an outdoor environment to an indoor environment.

The following paragraphs are associated with FIGS. 16A and 16B.

FIG. 16A illustrates one embodiment of a system operative to duplicated indoor, several times, a plurality of streams associated with spatial multiplexing, in which the plurality of streams are obtained outdoor. The system includes: at least N outdoor converters 19-x-1, 19-x-2, 19-x-M (e.g., 3 converters are illustrated, in which N=2) associated respectively with at least N outdoor antennas 9-ant-1, 9-ant-2, 9-ant-M, in which the outdoor converters and the associated outdoor antennas are located outside 1-outdoor a building 1-BLD. The system further includes several pluralities of at least N indoor converters in each plurality, in which each of the pluralities of indoor converters is located in a different room 1-indoor-1, 1-indoor-2 inside the building 1-BLD and is associated respectively with a plurality of indoor antennas (e.g., plurality 30-x-1, 30-x-2, 30-x-M located in room 1-indoor-1 and associated with plurality 30-ant-1, 30-ant-2, 30-ant-M respectively, and plurality 31-x-1, 31-x-2, 31-x-M located in room 1-indoor-2 and associated with plurality 31-ant-1, 31-ant-2, 31-ant-M respectively). The system further comprises a wire-based medium 2-WM extending from outside 1-outdoor the building 1-BLD and into each of the different rooms indoor-1, 1-indoor-2 inside the building, in which the outdoor converters and the several pluralities of indoor converters are all connected electronically to the wire-based medium 2-WM.

In one embodiment, the at least N outdoor antennas 9-ant-1, 9-ant-2, 9-ant-M are configured to receive respectively at least N input signals 1-in-1, 1-in-2, 1-in-M induced by a transmission of a wireless frame, in which the wireless frame is a multiple-input-multiple-output (MIMO) transmission 1-MIMO-T generated by an outdoor base-station 1-BS using exactly N streams 1-st-1, 1-st-N (e.g., N=2) associated with spatial multiplexing, and in which the MIMO transmission 1-MIMO-T, together with the associated input signals received 1-in-1, 1-in-2, 1-in-M, all occupy a single first wireless frequency range.

In one embodiment, the at least N outdoor converters 19-x-1, 19-x-2, 19-x-M are configured to convert respectively the at least N input signals 1-in-1, 1-in-2, 1-in-M into a representation thereof 2-sig-1, 2-sig-2, 2-sig-M that is communicable over the wire-based medium 2-WM.

In one embodiment, the system is configured to communicate the representation 2-sig-1, 2-sig-2, 2-sig-M of the input signals 1-in-1, 1-in-2, 1-in-M over the wire-based medium 2-WM to each of the pluralities of indoor converters (e.g., to plurality 30-x-1, 30-x-2, 30-x-M, and to plurality 31-x-1, 31-x-2, 31-x-M), and each of the pluralities of indoor converters is configured to receive via the wire-based medium said representation (e.g., 30-x-1, 30-x-2, 30-x-M receives 2-sig-1, 2-sig-2, 2-sig-M respectively, and 31-x-1, 31-x-2, 31-x-M receives 2-sig-1, 2-sig-2, 2-sig-M respectively), and to re-generate, in the respective room 1-indoor-1, 1-indoor-2, from said representation 2-sig-1, 2-sig-2, 2-sig-M, a copy of the at least N input signals 1-in-1, 1-in-2, 1-in-M, thereby re-generating several copies of the at least N input signals in a form of several copies of at least N output signals respectively (e.g., a first copy in a form of output signals 40-out-1, 40-out-2, 40-out-M, and a second copy in a form of output signals 41-out-1, 41-out-2, 41-out-M), in which each copy of the at least N output signals is transmitted in the respective room 1-indoor-1, 1-indoor-2 via the respective indoor antennas (e.g., 40-out-1, 40-out-2, 40-out-M via 30-ant-1, 30-ant-2, 30-ant-M respectively, and 41-out-1, 41-out-2, 41-out-M via 31-ant-1, 31-ant-2, 31-ant-M respectively) using a single second wireless frequency range, thereby enabling decoding of the wireless frame in conjunction with the exactly N streams 1-st-1, 1-st-N by a MIMO-enabled client device 5-cl-1, 5-cl-2 located in any of the rooms 1-indoor-1, 1-indoor-2 and having wireless access to at least one of said copies of the output signals.

In one embodiment, all of the outdoor converters 19-x-1, 19-x-2, 19-x-M are outdoor mixers, all of the indoor converters 30-x-1, 30-x-2, 30-x-M, 31-x-1, 31-x-2, 31-x-M are indoor mixers, and said conversion is a frequency down-conversion, in which the representation 2-sig-1, 2-sig-2, 2-sig-M are signals having a lower frequency than the single first wireless frequency, and said re-generation is a frequency up-conversion.

In one embodiment, all of the outdoor converters 19-x-1, 19-x-2, 19-x-M are analog-to-digital converters, all of the indoor converters 30-x-1, 30-x-2, 30-x-M, 31-x-1, 31-x-2, 31-x-M are digital-to-analog converters, and said conversion is a signal sampling, in which the representation 2-sig-1, 2-sig-2, 2-sig-M are digital samples, and said re-generation is a signal reconstruction.

FIG. 16B illustrates one embodiment of a method for propagating multiple-input-multiple-output (MIMO) signals from an outdoor environment to an indoor environment. In step 1121, receiving, by a plurality of outdoor antennas 9-ant-1, 9-ant-2, 9-ant-M located outdoor 1-outdoor, respectively, a plurality of input signals 1-in-1, 1-in-2, 1-in-M induced by a transmission of a wireless frame, in which the wireless frame is a multiple-input-multiple-output (MIMO) transmission 1-MIMO-T generated by an outdoor base-station 1-BS using a plurality of streams 1-st-1, 1-st-N associated with spatial multiplexing, and in which the MIMO transmission 1-MIMO-T, together with the associated plurality of input signals received 1-in-1, 1-in-2, 1-in-M, all occupy a single first wireless frequency range. In step 1122, down-converting, using a plurality of outdoor converters 19-x-1, 19-x-2, 19-x-M associated respectively with the plurality of outdoor antennas 9-ant-1, 9-ant-2, 9-ant-M, the plurality of input signals 1-in-1, 1-in-2, 1-in-M respectively into a plurality of signals 2-sig-1, 2-sig-2, 2-sig-M occupying a plurality of different frequency ranges, in which each of the different frequency ranges is lower in frequency than the single wireless frequency range. In step 1123, injecting, by the plurality of outdoor converters 19-x-1, 19-x-2, 19-x-M, at an outdoor injection point 1-inj, respectively, the plurality of signals 2-sig-1, 2-sig-2, 2-sig-M into a wire-based medium 2-WM extending from the outdoor injection point 1-inj into several indoor locations 1-indoor-1, 1-indoor-2, thereby resulting in a propagation of the plurality of signals 2-sig-1, 2-sig-2, 2-sig-M from the outdoor injection point 1-inj into each of said several indoor locations 1-indoor-1, 1-indoor-2. In step 1124, up-converting, at each of the several indoor locations 1-indoor-1, 1-indoor-2, the plurality of signals 2-sig-1, 2-sig-2, 2-sig-M respectively into a plurality of output signals (e.g., respectively into 40-out-1, 40-out-2, 40-out-M at indoor location 1-indoor-1, and respectively into 41-out-1, 41-out-2, 41-out-M at indoor location 1-indoor-2), in which each of the up-conversions is done using a different plurality of indoor converters located at one of the several indoor locations and connected electronically to the wire-based medium (e.g., the up-conversion into 40-out-1, 40-out-2, 40-out-M is done respectively by 30-x-1, 30-x-2, 30-x-M, and the up-conversion into 41-out-1, 41-out-2, 41-out-M is done respectively by 31-x-1, 31-x-2, 31-x-M), so as to wirelessly generate, respectively via several pluralities of indoor antennas (e.g., plurality 30-ant-1, 30-ant-2, 30-ant-M, and plurality 31-ant-1, 31-ant-2, 31-ant-M), several pluralities of the output signals (e.g., plurality 40-out-1, 40-out-2, 40-out-M, and plurality 41-out-1, 41-out-2, 41-out-M) respectively at the several indoor locations 1-indoor-1, 1-indoor-2, in which the several pluralities of output signals all occupy a single second wireless frequency range, thereby re-generating the MIMO transmission 1-MIMO-T several times at the several indoor locations 1-indoor-1, 1-indoor-2 respectively, and enabling decoding of the wireless frame by a MIMO-enabled client device 5-cl-1, 5-cl-2 having access to any one of the several pluralities of output signals.

In one embodiment, the plurality of streams 1-st-1, 1-st-N include exactly N streams (e.g., N=2 is illustrated as a non-limiting example) as set by the outdoor base station 1-BS, the plurality of outdoor converters 19-x-1, 19-x-2, 19-x-M comprises at least N converters (e.g., 3 converters are illustrated as a non-limiting example, but since N=2 in this example, there must me a minimum of two converters, but there could also be any number of converters above two), the plurality of signals 2-sig-1, 2-sig-2, 2-sig-M comprises at least N signals (e.g., 3 signals are illustrated as a non-limiting example, but since N=2 in this example, there must be a minimum of two signals, but there could also be any number of signals above two), each of the several pluralities of indoor converters (e.g., plurality 30-x-1, 30-x-2, 30-x-M, and plurality 31-x-1, 31-x-2, 31-x-M) comprises at least N converters, and each of the several pluralities of output signals (e.g., plurality 40-out-1, 40-out-2, 40-out-M, and plurality 41-out-1, 41-out-2, 41-out-M) comprises at least N output signals, thereby facilitating said decoding of the wireless frame that was constructed using the N streams 1-st-1, 1-st-N.

In one embodiment, the plurality of outdoor antennas 9-ant-1, 9-ant-2, 9-ant-M and outdoor converters 19-x-1, 19-x-2, 19-x-M are located on a roof of a building 1-BLD, and each of the several pluralities of indoor converters is located in a different room 1-indoor-1, 1-indoor-2 in the building (e.g., plurality 30-x-1, 30-x-2, 30-x-M located in room 1-indoor-1, and plurality 31-x-1, 31-x-2, 31-x-M located in room 1-indoor-2), so as to enable decoding of the wireless frame by a MIMO-enabled client device 5-cl-1, 5-cl-2 located in any of the rooms 1-indoor-1, 1-indoor-2.

In one embodiment, the wire-based medium 2-WM is a coaxial cable.

In one embodiment, the coaxial cable is a cable used to facilitate reception of direct-broadcast satellite television, and the plurality of outdoor converters 19-x-1, 19-x-2, 19-x-M and outdoor antennas 9-ant-1, 9-ant-2, 9-ant-M are co-located with a satellite dish on a roof.

In one embodiment, the wireless frame is associated with 4G (fourth-generation) long-term evolution (LTE) wireless standard.

In one embodiment, the wireless frame is associated with 5G (fifth-generation) wireless standard.

In one embodiment, the single first wireless frequency range is a frequency range located in a frequency band selected from a group of bands consisting of: (i) 3.4-3.6 GHz, (ii) 4.5-6 GHz, (iii) 27.5-29.5 GHz, and (iv) 60-70 GHz.

In one embodiment, the single second wireless frequency range is a frequency range located in a frequency band selected from a group of bands consisting of: (i) 3.4-3.6 GHz, (ii) 4.5-6 GHz, (iii) 27.5-29.5 GHz, and (iv) 60-70 GHz.

In one embodiment, each of the different frequency ranges of the signals are contained below 1.5 GHz, and therefore propagate successfully over the wire-based medium.

Figure 17A:
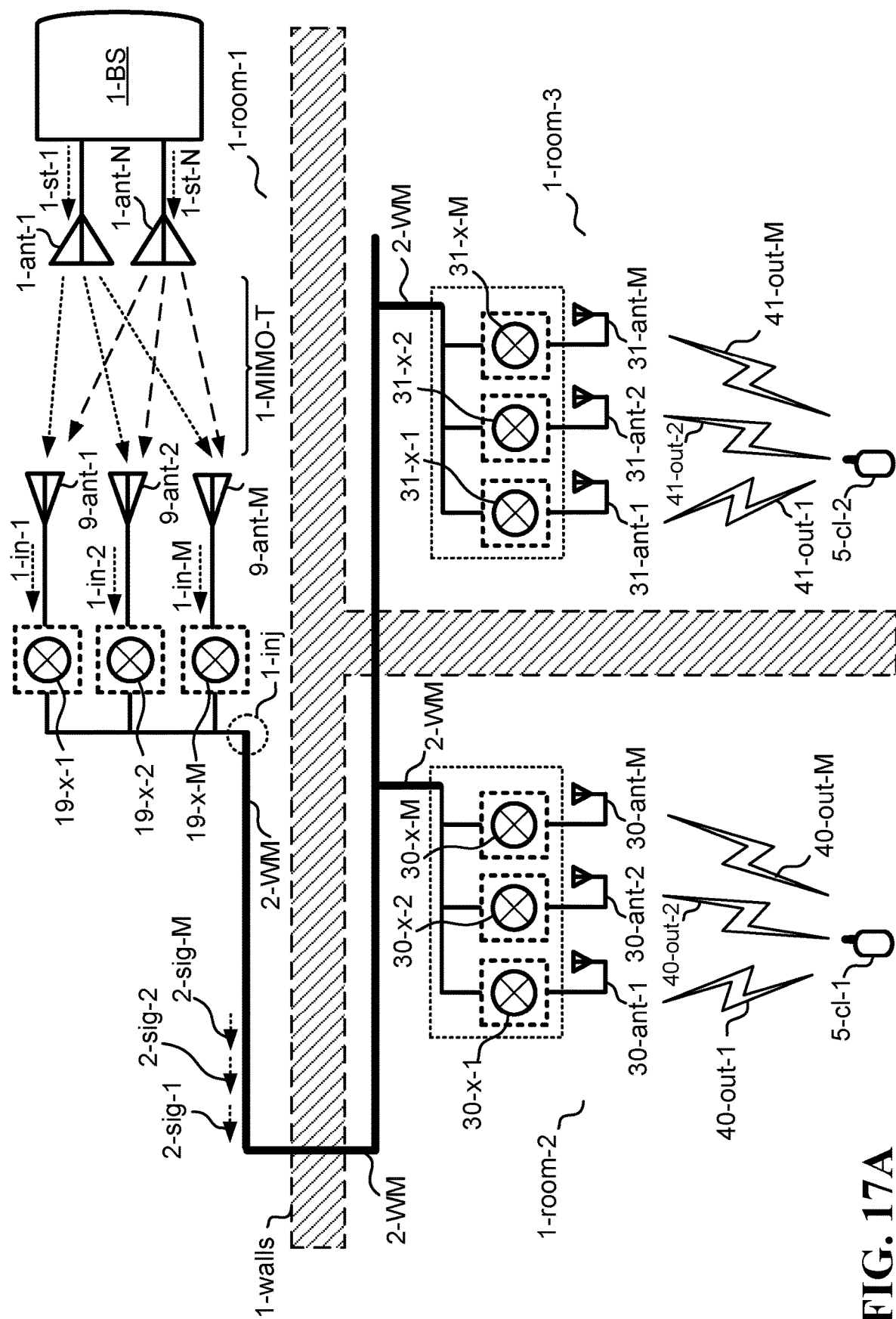
FIG. 17A illustrates one embodiment of a system operative to duplicated indoor several times a plurality of streams associated with spatial multiplexing and obtained in a specific room.
Figure 17B:
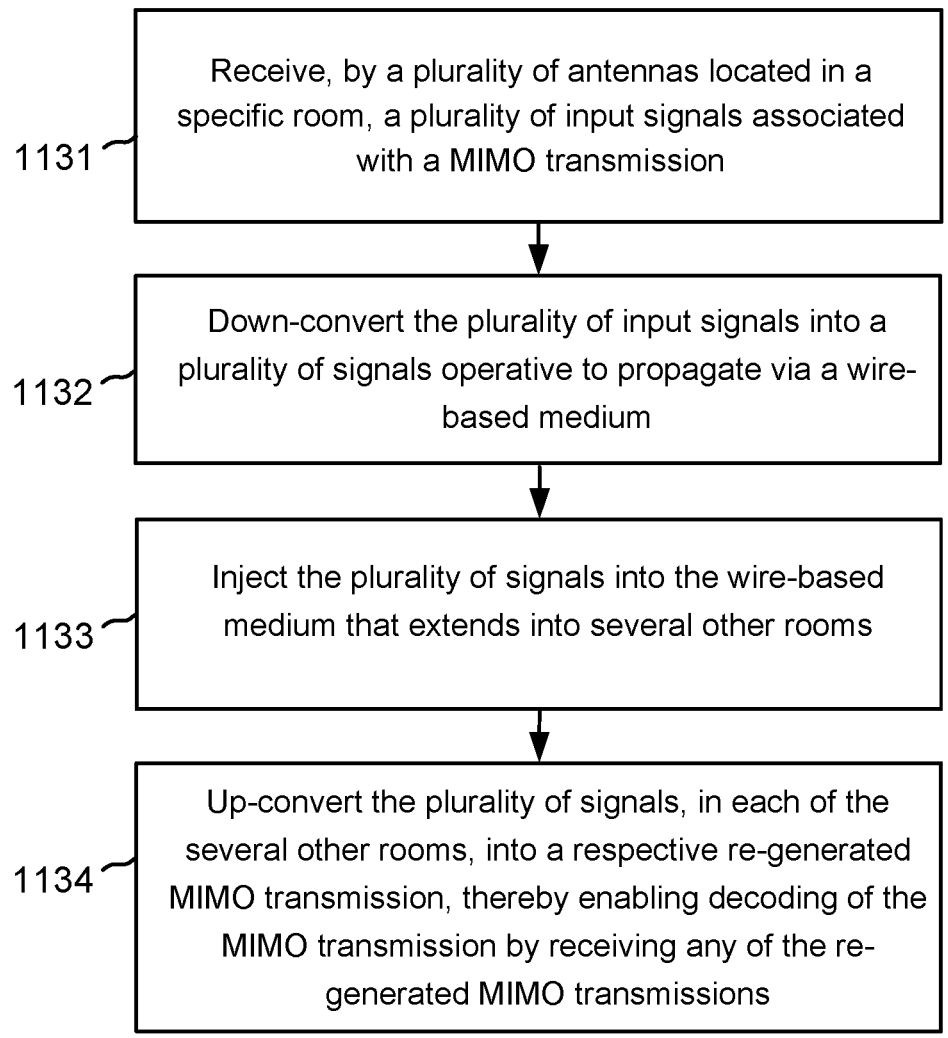
FIG. 17B illustrates one embodiment of a method for propagating multiple-input-multiple-output (MIMO) signals between rooms.

The following paragraphs are associated with FIGS. 17A and 17B.

FIG. 17A illustrates one embodiment of a system operative to duplicated indoor several times a plurality of streams associated with spatial multiplexing and obtained in a specific room. The system includes at least N receiving converters 19-x-1, 19-x-2, 19-x-M (e.g., 3 converters are illustrated, in which N=2) associated respectively with at least N receiving antennas 9-ant-1, 9-ant-2, 9-ant-M, in which the receiving converters and the associated receiving antennas are located in a specific room 1-room-1. The system further includes several pluralities of at least N indoor converters in each plurality, in which each of the pluralities of indoor converters is located in a different room 1-room-2, 1-room-3 and is associated respectively with a plurality of indoor antennas (e.g., plurality 30-x-1, 30-x-2, 30-x-M located in room 1-room-2 and associated with plurality 30-ant-1, 30-ant-2, 30-ant-M respectively, and plurality 31-x-1, 31-x-2, 31-x-M located in room 1-room-3 and associated with plurality 31-ant-1, 31-ant-2, 31-ant-M respectively). The system further includes a wire-based medium 2-WM extending from the first room 1-room-1 and into each of the different rooms 1-room-2, 1-room-3, in which the receiving converters and the several pluralities of indoor converters are all connected electronically to the wire-based medium 2-WM.

In one embodiment, the at least N receiving antennas 9-ant-1, 9-ant-2, 9-ant-M are configured to receive respectively at least N input signals 1-in-1, 1-in-2, 1-in-M induced by a transmission of a wireless frame, in which the wireless frame is a multiple-input-multiple-output (MIMO) transmission 1-MIMO-T generated by a base-station 1-BS using exactly N streams 1-st-1, 1-st-N (e.g., N=2) associated with spatial multiplexing, and in which the MIMO transmission 1-MIMO-T, together with the associated input signals received 1-in-1, 1-in-2, 1-in-M, all occupy a single first wireless frequency range. The at least N receiving converters 19-x-1, 19-x-2, 19-x-M are configured to convert respectively the at least N input signals 1-in-1, 1-in-2, 1-in-M into a representation thereof 2-sig-1, 2-sig-2, 2-sig-M that is communicable over the wire-based medium 2-WM. The system is configured to communicate the representation 2-sig-1, 2-sig-2, 2-sig-M of the input signals 1-in-1, 1-in-2, 1-in-M over the wire-based medium 2-WM to each of the pluralities of indoor converters (e.g., to plurality 30-x-1, 30-x-2, 30-x-M, and to plurality 31-x-1, 31-x-2, 31-x-M). Each of the pluralities of indoor converters is configured to receive via the wire-based medium said representation (e.g., 30-x-1, 30-x-2, 30-x-M receives 2-sig-1, 2-sig-2, 2-sig-M respectively, and 31-x-1, 31-x-2, 31-x-M receives 2-sig-1, 2-sig-2, 2-sig-M respectively), and to re-generate, in the respective room 1-room-2, 1-room-3, from said representation 2-sig-1, 2-sig-2, 2-sig-M, a copy of the at least N input signals 1-in-1, 1-in-2, 1-in-M, thereby re-generating several copies of the at least N input signals in a form of several copies of at least N output signals respectively (e.g., a first copy in a form of output signals 40-out-1, 40-out-2, 40-out-M, and a second copy in a form of output signals 41-out-1, 41-out-2, 41-out-M), in which each copy of the at least N output signals is transmitted in the respective room 1-room-2, 1-room-3 via the respective indoor antennas (e.g., 40-out-1, 40-out-2, 40-out-M via 30-ant-1, 30-ant-2, 30-ant-M respectively, and 41-out-1, 41-out-2, 41-out-M via 31-ant-1, 31-ant-2, 31-ant-M respectively) using a single second wireless frequency range, thereby enabling decoding of the wireless frame in conjunction with the exactly N streams 1-st-1, 1-st-N by a MIMO-enabled client device 5-cl-1, 5-cl-2 located in any of the rooms 1-room-2, 1-room-3 and having wireless access to at least one of said copies of the output signals.

In one embodiment, all of the receiving converters 19-x-1, 19-x-2, 19-x-M are receiving mixers, all of the indoor converters 30-x-1, 30-x-2, 30-x-M, 31-x-1, 31-x-2, 31-x-M are indoor mixers, said conversion is a frequency down-conversion, in which the representation 2-sig-1, 2-sig-2, 2-sig-M are signals having a lower frequency than the single first wireless frequency, and said re-generation is a frequency up-conversion.

In one embodiment, all of the receiving converters 19-x-1, 19-x-2, 19-x-M are analog-to-digital converters, all of the indoor converters 30-x-1, 30-x-2, 30-x-M, 31-x-1, 31-x-2, 31-x-M are digital-to-analog converters, said conversion is a signal sampling, in which the representation 2-sig-1, 2-sig-2, 2-sig-M are digital samples, and said re-generation is a signal reconstruction.

In one embodiment, the base station 1-BS is located in the specific room 1-room-1.

In one embodiment, the base station 1-BS is located outdoors.

FIG. 17B illustrates one embodiment of a method for propagating multiple-input-multiple-output (MIMO) signals between rooms. In step 1131, receiving, by a plurality of receiving antennas 9-ant-1, 9-ant-2, 9-ant-M located in a specific room 1-room-1, respectively, a plurality of input signals 1-in-1, 1-in-2, 1-in-M induced by a transmission of a wireless frame, in which the wireless frame is a multiple-input-multiple-output (MIMO) transmission 1-MIMO-T generated by a base-station 1-BS using a plurality of streams 1-st-1, 1-st-N associated with spatial multiplexing, and in which the MIMO transmission 1-MIMO-T, together with the associated plurality of input signals received 1-in-1, 1-in-2, 1-in-M, all occupy a single first wireless frequency range. In step 1132, down-converting, using a plurality of receiving converters 19-x-1, 19-x-2, 19-x-M associated respectively with the plurality of receiving antennas 9-ant-1, 9-ant-2, 9-ant-M, the plurality of input signals 1-in-1, 1-in-2, 1-in-M respectively into a plurality of signals 2-sig-1, 2-sig-2, 2-sig-M occupying a plurality of different frequency ranges, in which each of the different frequency ranges is lower in frequency than the single wireless frequency range. In step 1133, injecting, by the plurality of receiving converters 19-x-1, 19-x-2, 19-x-M, at an injection point 1-inj located in the first room 1-room-1, respectively, the plurality of signals 2-sig-1, 2-sig-2, 2-sig-M into a wire-based medium 2-WM extending from the injection point 1-inj into several different rooms 1-room-2, 1-room-3, thereby resulting in a propagation of the plurality of signals 2-sig-1, 2-sig-2, 2-sig-M from the injection point 1-inj into each of said several different rooms 1-room-2, 1-room-3. In step 1134, up-converting, in each of the several different rooms 1-room-2, 1-room-3, the plurality of signals 2-sig-1, 2-sig-2, 2-sig-M respectively into a plurality of output signals (e.g., respectively into 40-out-1, 40-out-2, 40-out-M in room 1-room-2, and respectively into 41-out-1, 41-out-2, 41-out-M in room 1-room-3), in which each of the up-conversions is done using a different plurality of indoor converters located in one of the several different rooms and connected electronically to the wire-based medium (e.g., the up-conversion into 40-out-1, 40-out-2, 40-out-M is done respectively by 30-x-1, 30-x-2, 30-x-M, and the up-conversion into 41-out-1, 41-out-2, 41-out-M is done respectively by 31-x-1, 31-x-2, 31-x-M), so as to wirelessly generate, respectively via several pluralities of indoor antennas (e.g., plurality 30-ant-1, 30-ant-2, 30-ant-M, and plurality 31-ant- 1, 31-ant-2, 31-ant-M), several pluralities of the output signals (e.g., plurality 40-out-1, 40-out-2, 40-out-M, and plurality 41-out-1, 41-out-2, 41-out-M) respectively in the several different rooms 1-room-2, 1-room-3, in which the several pluralities of output signals all occupy a single second wireless frequency range, thereby re-generating the MIMO transmission 1-MIMO-T several times in the several different rooms 1-room-2, 1-room-3 respectively, and enabling decoding of the wireless frame by a MIMO-enabled client device 5-cl-1, 5-cl-2 having access to any one of the several pluralities of output signals.

In one embodiment, the plurality of streams 1-st-1, 1-st-N include exactly N streams (e.g., N=2 is illustrated as a non-limiting example) as set by the base station 1-BS. The plurality of receiving converters 19-$x$-1, 19-$x$-2, 19-$x$-M comprises at least N converters (e.g., 3 converters are illustrated as a non-limiting example, but since N=2 in this example, there must me a minimum of two converters, but there could also be any number of converters above two). The plurality of signals 2-sig-1, 2-sig-2, 2-sig-M comprises at least N signals (e.g., 3 signals are illustrated as a non-limiting example, but since N=2 in this example, there must be a minimum of two signals, but there could also be any number of signals above two). Each of the several pluralities of indoor converters (e.g., plurality 30-$x$-1, 30-$x$-2, 30-$x$-M, and plurality 31-$x$-1, 31-$x$-2, 31-$x$-M) comprises at least N converters, and each of the several pluralities of output signals (e.g., plurality 40-out-1, 40-out-2, 40-out-M, and plurality 41-out-1, 41-out-2, 41-out-M) comprises at least N output signals, thereby facilitating said decoding of the wireless frame that was constructed using the N streams 1-st-1, 1-st-N.

In one embodiment, the wire-based medium 2-WM is a coaxial cable.

In one embodiment, the coaxial cable is a cable used to facilitate reception of direct-broadcast satellite television.

In one embodiment, the wireless frame is associated with 4G (fourth-generation) long-term evolution (LTE) wireless standard.

In one embodiment, the wireless frame is associated with 5G (fifth-generation) wireless standard.

In one embodiment, the single first wireless frequency range is a frequency range located in a frequency band selected from a group of bands consisting of: (i) 3.4-3.6 GHz, (ii) 4.5-6 GHz, (iii) 27.5-29.5 GHz, and (iv) 60-70 GHz.

In one embodiment, the single second wireless frequency range is a frequency range located in a frequency band selected from a group of bands consisting of: (i) 3.4-3.6 GHz, (ii) 4.5-6 GHz, (iii) 27.5-29.5 GHz, and (iv) 60-70 GHz.

In one embodiment, each of the different frequency ranges of the signals are contained below 1.5 GHz, and therefore propagate successfully over the wire-based medium.

In one embodiment, the base station 1-BS is located in the specific room 1-room-1, and the base station is a pico base station operative to provide wireless service indoor.

Figure 18C:
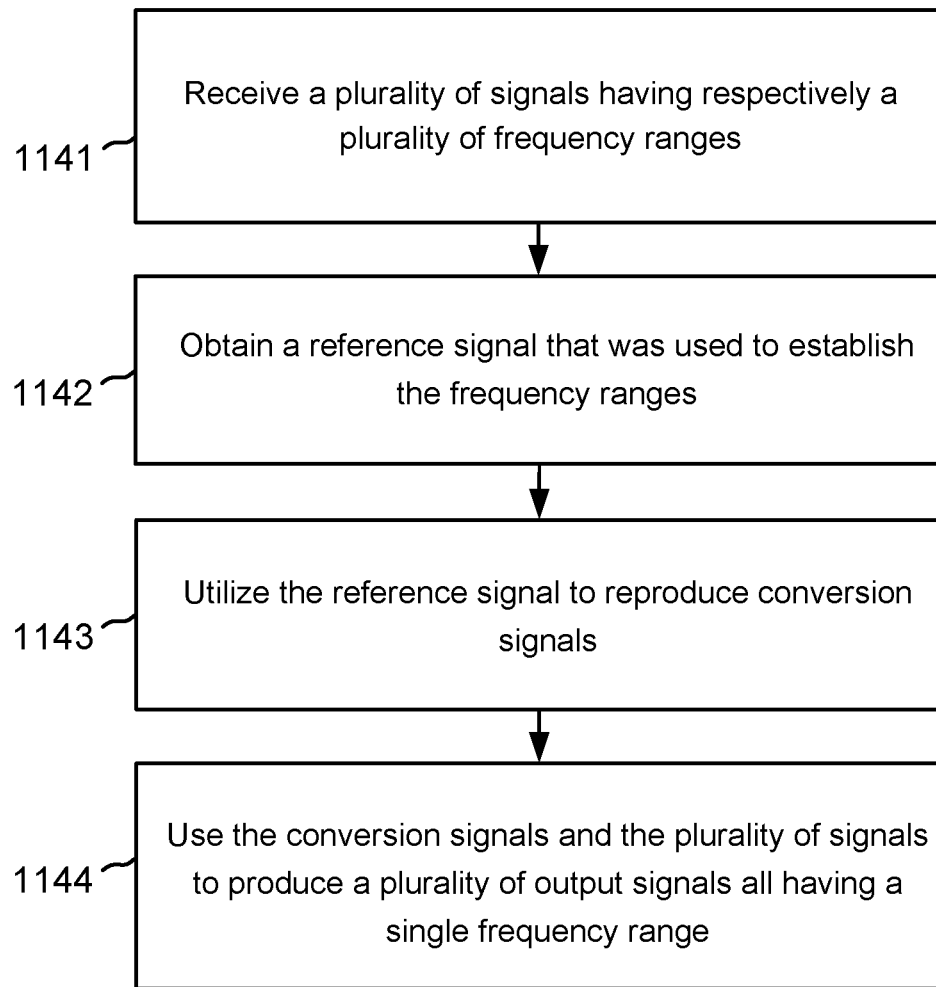
FIG. 18C illustrates one embodiment of a method for replicating an exact frequency match among a plurality of signals associated with spatial multiplexing.

The following paragraphs are associated with FIG. 18A, FIG. 18B, and FIG. 18C.

FIG. 18C illustrates one embodiment of a method for replicating an exact frequency match among a plurality of signals associated with spatial multiplexing. The method includes: In step 1141, receiving, in a converter 3-con-1 (FIG. 18A), a plurality of signals 2-sig-1, 2-sig-3 (FIG. 18A) occupying respectively a plurality of different frequency ranges 2-fr-1, 2-fr-3 (FIG. 18B), in which each of the signals 2-sig-1, 2-sig-3 is an orthogonal frequency division multiplexing (OFDM) signal comprising a plurality of sub-carriers (e.g., in FIG. 18B, signal 2-sig-1 comprises sub-carriers 2-sub-1, and signal 2-sig-3 comprises sub-carriers 2-sub-3), and in which the plurality of signals 2-sig-1, 2-sig-3 are associated respectively with a plurality of streams 1-st-1, 1-st-3 all occupying a single frequency range 4-wfr and generated in conjunction with spatial multiplexing. In step 1142, obtaining, in the converter 3-con-1, a reference signal 1-ref associated with a plurality of original conversion signals 1-cnv-1, 1-cnv-3, in which the original conversion signals were used originally outside the converter 3-con-1 to establish respectively said plurality of different frequency ranges 2-fr-1, 2-fr-3. In step 1143, utilizing the reference signal 1-ref, in the converter 3-con-1, to reproduce 3-synt the original plurality of conversion signals 1-cnv-1, 1-cnv-3 in a form of a respective plurality of replica conversion signals 3-cnv-1, 3-cnv-3. In step 1144, using, in the converter 3-conv-1, the plurality of replica conversion signals 3-cnv-1, 3-cnv-3 to respectively convert 3-$x$-1, 3-$x$-3 the plurality of signals 2-sig-1, 2-sig-3 into a plurality of output signals 4-out-1, 4-out-3 all occupying the single frequency range 4-wfr, thereby causing the plurality of sub-carriers of any of the output signals 4-out-1, 4-out-3 to now exactly match 9-match in frequency the respective plurality of sub-carriers of any of the other output signals (e.g., the frequency of sub-carrier 2-sub-1 of output signal 4-out-1 now exactly matches the frequency of sub-carrier 2-sub-3 of output signal 4-out-3), thereby now enabling wireless transmission and successful decoding of the plurality of output signals 4-out-1, 4-out-3, or a derivative hereof, in conjunction with the spatial multiplexing.

In one embodiment, said reception of the plurality of signals 2-sig-1, 2-sig-3 and the reference signal 1-ref is done via a wire-based medium 2-WM interconnecting the converter 3-con-1 with an access point 1-AP, in which the access point is the source of the plurality of signals 2-sig-1, 2-sig-3 and the reference signal 1-ref.

In one embodiment, the method further includes: converting 1-synt, by the access point 1-AP, the reference signal 1-ref into the plurality of original conversion signals 1-cnv-1, 1-cnv-3; using, by the access point 1-AP, the plurality of original conversion signals 1-cnv-1, 1-cnv-3 to convert 1-$x$-1, 1-$x$-3 the plurality of streams 1-st-1, 1-st-3 into the plurality of signals 2-sig-1, 2-sig-3, thereby constituting said establishing of the plurality of different frequency ranges 2-fr-1, 2-fr-3; and transmitting, by the access point 1-AP, the signals 2-sig-1, 2-sig-3 and the reference signal 1-ref, via the wire-based medium 2-WM, to the converter 3-con-1.

In one embodiment, said conversion 1-synt, by the access point 1-AP, of the reference signal 1-ref into the plurality original conversion signals 1-cnv-1, 1-cnv-3, is done by a first frequency synthesizer 1-synt using the reference signal 1-ref as an input to the first frequency synthesizer.

In one embodiment, said conversion 1-synt, by the access point 1-AP, of the plurality of streams 1-st-1, 1-st-3 into the plurality of signals 2-sig-1, 2-sig-3, is done with a plurality mixers 1-$x$-1, 1-$x$-3 respectively, using the plurality of original conversion signals 1-cnv-1, 1-cnv-3 as inputs to the plurality of mixers respectively.

In one embodiment: (i) said conversion 1-synt, by the access point 1-AP, of the reference signal 1-ref into the plurality of original conversion signals 1-cnv-1, 1-cnv-3, and (ii) said reproduction 3-synt of the plurality of replica conversion signals 3-cnv-1, 3-cnv-3 using the reference signal 1-ref in the converter 3-con-1, are essentially two identical processes utilizing the same reference signal 1-ref.

In one embodiment, said exact match 9-match is a match in which each of the sub-carriers (e.g., 2-sub-1) has the same frequency of the corresponding sub-carrier (e.g., 2-sub-3) to within an accuracy of better than 0.1 part-per-million (one tenth PPM), as a direct result of using said essentially two identical processes utilizing the same reference frequency 1-ref.

In one embodiment, said reproduction 3-synt of the plurality of replica conversion signals 3-cnv-1, 3-cnv-3, using the reference signal 1-ref in the converter 3-con-1, is done by a second frequency synthesizer 3-synt in the converter 3-con-1 using the reference signal 1-ref as an input to the second frequency synthesizer 3-synt.

In one embodiment, said conversion 3-x-1, 3-x-3, in the converter 3-con-1, of the plurality of signals 2-sig-1, 2-sig-3 into the plurality of output signals 4-out-1, 4-out-3 all occupying a single frequency range 4-wfr, is done respectively by a plurality of mixers 3-x-1, 3-x-3 in the converter 3-con-1 and using the plurality of replica conversion signals 3-cnv-1, 3-cnv-3 as an input to the plurality of mixers 3-x-1, 3-x-3 respectively.

In one embodiment, said exact match 9-match is a match in which each of the sub-carriers (e.g., 2-sub-1) has the same frequency of the corresponding sub-carrier (e.g., 2-sub-3) to within an accuracy of better than 1 part-per-million (one PPM).

In one embodiment, said exact match 9-match is a match in which each of the sub-carriers (e.g., 2-sub-1) has the same frequency of the corresponding sub-carrier (e.g., 2-sub-3) to within an accuracy of better than 0.1 part-per-million (one tenth PPM), as a direct result of said utilization of the reference signal 1-ref, in the converter 3-con-1, to reproduce 3-synt, 3-cnv-1, 3-cnv-3 the original plurality of conversion signals 1-cnv-1, 1-cnv-3.

In one embodiment, the single frequency range 4-wfr is a wireless frequency range (e.g., 2.4 GHz, or 3.5 GHz, or 5 GHz), in which the plurality of output signals 4-out-1, 4-out-3 are wireless output signals and are directly transmitted via a plurality of antennas 3-ant-1, 3-ant-3 respectively.

In one embodiment, the single frequency range 4-wfr is a base-band frequency range, in which the plurality of output signals 4-out-1, 4-out-3 are base-band output signals that are converted into a wireless frequency range and are then transmitted via a plurality of antennas respectively 3-ant-1, 3-ant-3.

Figure 19A:
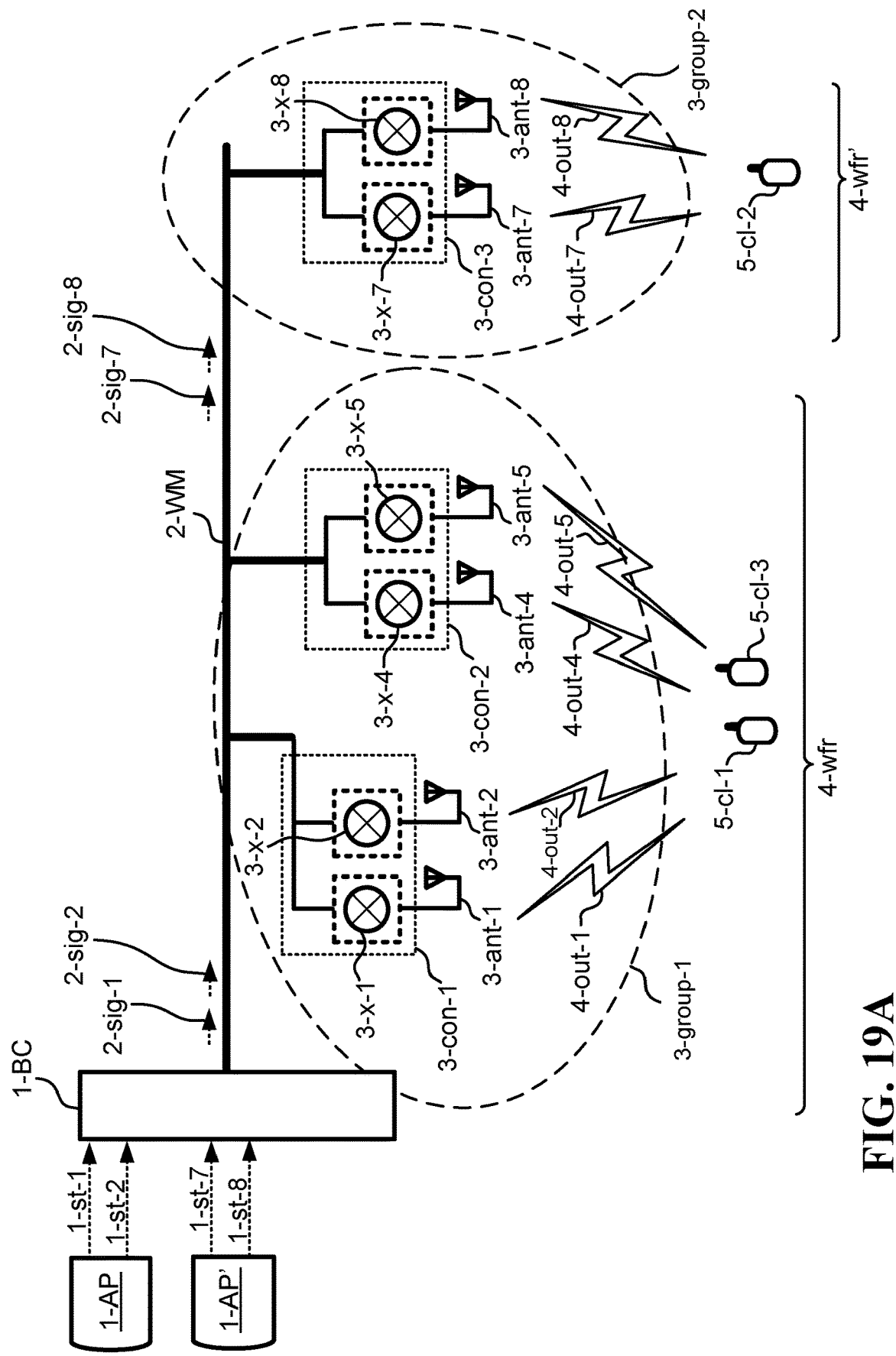
FIG. 19A illustrates one embodiment of a system operative to direct transmissions over a wire-based medium.
Figure 19B:
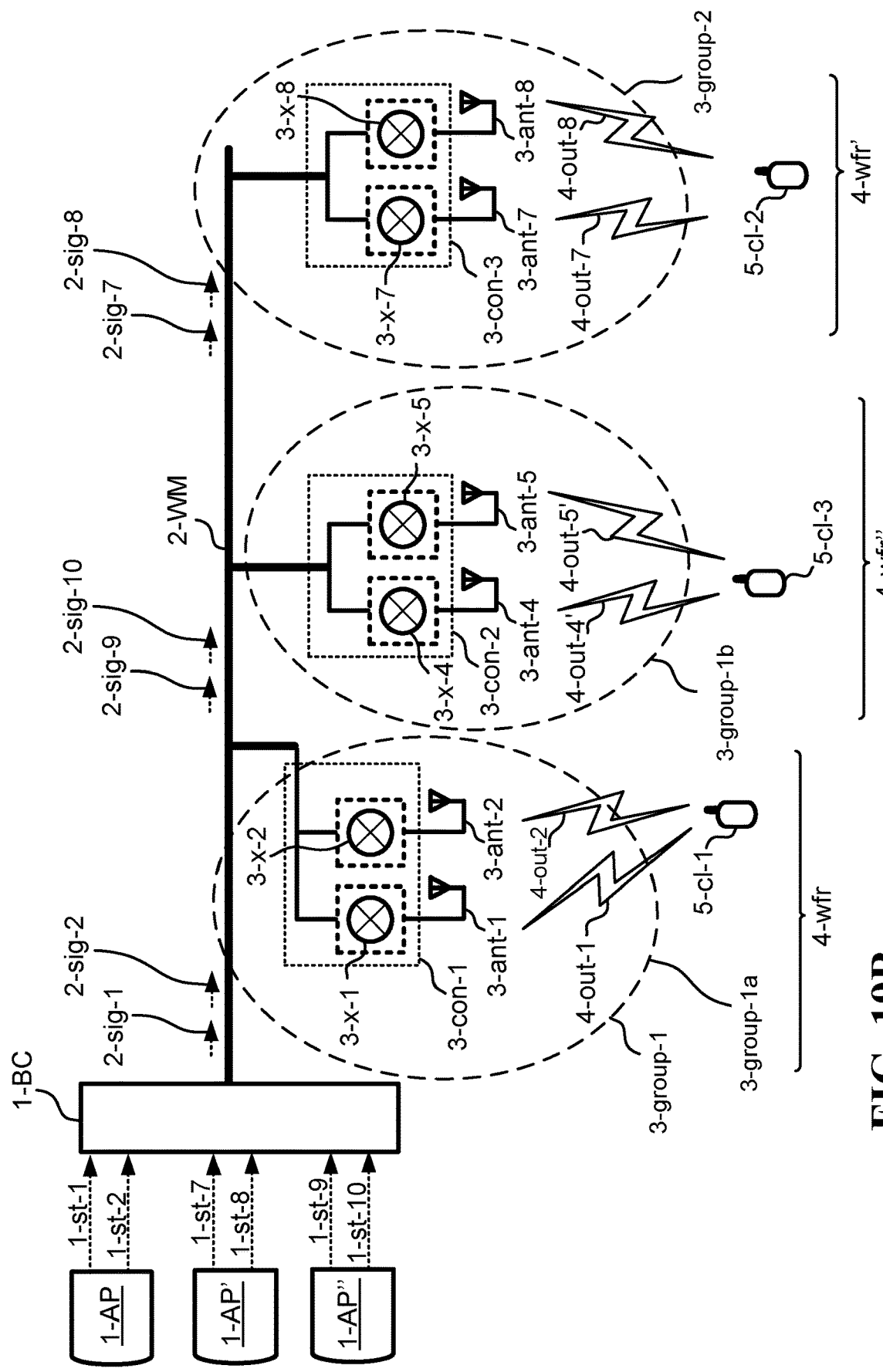
FIG. 19B illustrates one embodiment of a system operative to direct transmissions over a wire-based medium.
Figure 19C:
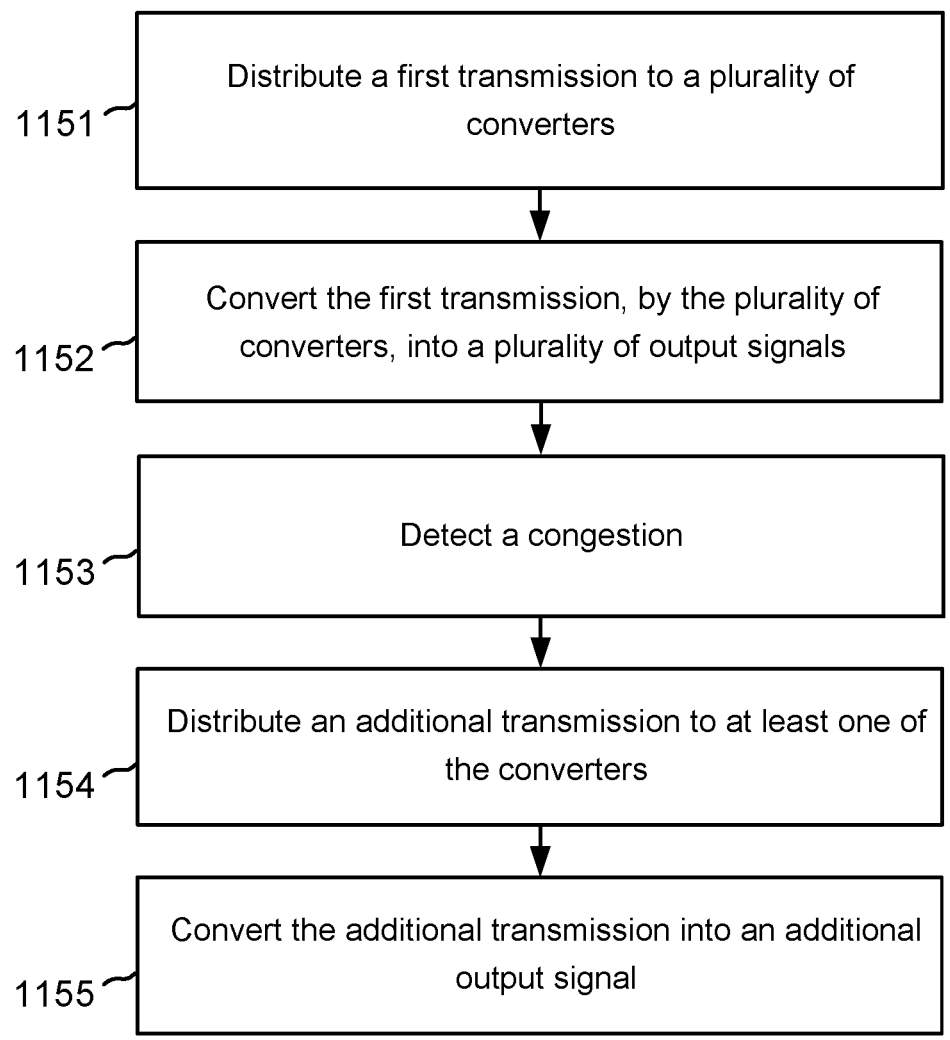
FIG. 19C illustrates one embodiment of a method for adapting a wireless communication system by reorganizing related transmissions over a wire-based medium.

The following paragraphs are associated with FIG. 19A, FIG. 19B, and FIG. 19C.

FIG. 19A and FIG. 19B illustrate a system operative to direct transmissions over a wire-based medium. The system includes: at least a first access point 1-AP operative to generate and receive transmissions in conjunction with wireless client devices; a plurality of converters 3-con-1, 3-con-2, 3-con 3 placed at a plurality of locations; and a wired-based medium 2-WM configured to connect electrically the first access point 1-AP with at least some or all of the plurality of converters 3-con-1, 3-con-2, 3-con 3.

In one embodiment, the system is configured to: group the plurality of converters 3-con-1, 3-con-2, 3-con-3 into at least two sub-groups 3-group-1, 3-group-2 (FIG. 19A) of the converters, in which each of the sub-groups comprises at least one of the converters (e.g., sub-group 3-group-1 contains the converters 3-con-1, 3-con-2, and sub-group 3-group-2 contains the converter 3-con-3); direct a first transmission, from the first access point 1-AP, via the wired-based medium 2-WM, in a form of at least a first signal 2-sig-1, 2-sig-2 (two signals are shown 2-sig-1, 2-sig-2, which are derived respectively from streams 1-st-1, 1-st-2 of the first transmission), so as to cause the first transmission to reach each of the converters in a first one of the sub-groups (e.g., 2-sig-1, 2-sig-2 reach converters 3-con-1, 3-con-2 of sub-group 3-group-1); receive the first transmission, by each of the converters 3-con-1, 3-con-2 in said first sub-group 3-group-1, via the wired-based medium 2-WM, in the form of the at least first signal 2-sig-1, 2-sig-2; and convert, by each of the converters 3-con-1, 3-con-2 in said first sub-group 3-group-1, the at least first signal 2-sig-1, 2-sig-2, thereby producing together a first wireless transmission 4-out-1, 4-out-2, 4-out-4, 4-out-5 to be received wirelessly by at least one wireless client device 5-cl-1, 5-cl-3 (FIG. 19A). For example, signal 2-sig-1 is converted by mixer 3-x-1 into output signal 4-out-1 and by mixer 3-x-4 into output signal 4-out-4, and signal 2-sig-2 is converted by mixer 3-x-2 into output signal 4-out-2 and by mixer 3-x-5 into output signal 4-out-5.

In one embodiment, the system further includes: a second access point 1-AP' (FIG. 19A), in which the wired-based medium 2-WM is configured to connect electrically the second access point 1-AP' with at least some or all of the plurality of converters 3-con-1, 3-con-2, 3-con 3; wherein the system is further configured to: direct a second transmission, from the second access point 1-AP', via the wired-based medium 2-WM, in a form of at least a second signal 2-sig-7, 2-sig-8 (two signals are shown 2-sig-7, 2-sig-8, which are derived respectively from streams 1-st-7, 1-st-8 of the second transmission), so as to cause the second transmission to reach each of the converters in a second one of the sub-groups (e.g., 2-sig-7, 2-sig-8 reach converter 3-con-3 of sub-group 3-group-2); receive the second transmission, by each of the converters 3-con-3 in said second sub-group 3-group-2, via the wired-based medium 2-WM, in the form of the at least second signal 2-sig-7, 2-sig-8; and convert, by each of the converters 3-con-3 in said second sub-group 3-group-2, the at least second signal 2-sig-7, 2-sig-8, into a second wireless transmission 4-out-7, 4-out-8 to be received wirelessly by at least one other wireless client device 5-cl-2. For example, signal 2-sig-7 is converted by mixer 3-x-7 into output signal 4-out-7, and signal 2-sig-8 is converted by mixer 3-x-8 into output signal 4-out-8.

In one embodiment, the first transmission is transmitted simultaneously with the second transmission.

In one embodiment, the first wireless transmission 4-out-1, 4-out-2, 4-out-4, 4-out-5 comprises a plurality of output signals 4-out-1, 4-out-2, 4-out-4, 4-out-5 transmitted wirelessly via a plurality of antennas respectively 3-ant-1, 3-ant-2, 3-ant-4, 3-ant-5, in which the plurality of output signals all occupy a single wireless frequency range 4-wfr (FIG. 19A).

In one embodiment, wherein the second wireless transmission 4-out-7, 4-out-8 comprises a plurality of output signals 4-out-7, 4-out-8 transmitted wirelessly via a plurality of antennas respectively 3-ant-7, 3-ant-8, in which the plurality of output signals all occupy a single different wireless frequency range 4-wfr' (FIG. 19A).

In one embodiment, the system further includes: an additional access point 1-AP" (FIG. 19B), in which the wired-based medium 2-WM is configured to connect electrically the additional access point 1-AP" with at least some or all of the plurality of converters 3-con-1, 3-con-2, 3-con 3; in which the system is further configured to: detect a congestion condition associated with the first transmission; group the converters 3-con-1, 3-con-2 in the first sub-group 3-group-1 (FIG. 19A) into at least two smaller groups 3-group-1a, 3-group-1b (FIG. 19B), in which each of the smaller groups comprises at least one of the converters from the first sub-group 3-group-1. For example, smaller group 3-group-1a comprises the converter 3-con-1, and smaller group 3-group-1b comprises the converter 3-con-2; direct the first transmission, from the first access point 1-AP, via the wired-based medium 2-WM, in the form of the at least first signal 2-sig-1, 2-sig-2, so as to cause the first transmission to reach each of the converters 3-con-1 in a first one of the smaller groups 3-group-1a; receive the first transmission, by each of the converters 3-con-1 in said first smaller group 3-group-1a, via the wired-based medium 2-WM, in the form of the at least first signal 2-sig-1, 2-sig-2; convert, by each of the converters 3-con-1 in said first smaller group 3-group-1a, the at least first signal 2-sig-1, 2-sig-2, into a first wireless transmission 4-out-1, 4-out-2 (FIG. 19B) to be received wirelessly by one of the client devices 5-cl-1 (FIG. 19B); direct an additional transmission, from the additional access point 1-AP''', via the wired-based medium 2-WM, in a form of at least an additional signal 2-sig-9, 2-sig-10 (two signals are shown 2-sig-9, 2-sig-10, which are derived respectively from streams 1-st-9, 1-st-10 of the additional transmission), so as to cause the additional transmission to reach each of the converters 3-con-2 in a second one of the smaller groups 3-group-1b; receive the additional transmission, by each of the converters 3-con-2 in said second smaller group 3-group1b, via the wired-based medium 2-WM, in the form of the at least additional signal 2-sig-9, 2-sig-10; and convert, by each of the converters 3-con-2 in said second smaller group 3-group-1b, the at least additional signal 2-sig-9, 2-sig-10, into an additional wireless transmission 4-out-4', 4-out-5' (FIG. 19B) to be received wirelessly by another of the client devices 5-cl-3, thereby increasing a rate at which data is received by the client devices 5-cl-1, 5-cl-3 (FIG. 19B) and consequently resolving said congestion condition.

In one embodiment, the additional wireless transmission 4-out-4', 4-out-5' (FIG. 19B) comprises a plurality of additional output signals 4-out-4', 4-out-5' (FIG. 19B) transmitted wirelessly via a plurality of antennas respectively 3-ant-4, 3-ant-5, in which the plurality of additional output signals all occupy a single wireless frequency range 4-wfr'' (FIG. 19B).

In one embodiment, the wire-based medium 2-WM is a coaxial cable; the at least a first signal 2-sig-1, 2-sig-2 comprises two signals 2-sig-1 and 2-sig-2; the two signals 2-sig-1 and 2-sig-2 occupy different frequencies while transported over the wire-based medium 2-WM; and said conversion changes the two signals 2-sig-1, 2-sig-2 respectively into a first output signal and a second output signal 4-out-1, 4-out-2 occupying a single wireless frequency range 4-wfr.

In one embodiment, the at least additional signal 2-sig-9, 2-sig-10 comprises two additional signals 2-sig-9 and 2-sig-10; the two additional signals 2-sig-9 and 2-sig-10 occupy different frequencies in respect to each other and in respect to the two signals 2-sig-1, 2-sig-2, while transported over the wire-based medium 2-WM; and said conversion changes the two additional signals 2-sig-9, 2-sig-10 respectively into a first additional output signal and a second additional output signal 4-out-4', 4-out-5' occupying a single different wireless frequency range 4-wfr''.

In one embodiment, the wire-based medium 2-WM comprises a plurality of multi-conductor cables (e.g., 2-multi-1, FIG. 15A) comprising a plurality of conductors (e.g., 2-1-1, FIG. 15A); the at least a first signal 2-sig-1, 2-sig-2 comprises two signals 2-sig-1 and 2-sig-2; and the two signals 2-sig-1, 2-sig-2 occupy different conductors (e.g., 2-sig-1 occupies 2-1-1, and 2-sig-2 occupies 2-1-2, FIG. 15A) when transported over the wire-based medium 2-WM, in accordance with some embodiments associated with FIG. 15A.

In one embodiment, the at least an additional signal 2-sig-9, 2-sig-10 comprises two additional signals 2-sig-9 and 2-sig-10; and the two additional signals 2-sig-9, 2-sig-10 occupy different conductors (e.g., 2-sig-9 occupies 2-2-1, and 2-sig-10 occupies 2-2-2, FIG. 15A) when transported over the wire-based medium 2-WM.

In one embodiment, the multi-conductor cables are multi-paired cables, such as category 5 cables (CAT5).

In one embodiment, the first sub-group 3-group-1 comprises at least a first converter and a second converter 3-con-1, 3-con-2 respectively; the at least first signal is at least two multiple-input-multiple-output (MIMO) signals 2-sig-1, 2-sig-2 derived respectively from at least two streams 1-st-1, 1-st-2 associated with spatial multiplexing; each of the first and second converters 3-con-1, 3-con-2 receives the at least two multiple-input-multiple-output (MIMO) signals 2-sig-1, 2-sig-2; and the first wireless transmission 4-out-1, 4-out-2, 4-out-4, 4-out-5 is a MIMO transmission comprising a first wireless transmission instance 4-out-1, 4-out-2 converted by the first converter 3-con-1 from the two MIMO signals 2-sig-1, 2-sig-2 and transmitted via antennas 3-ant-1, 3-ant-2 in the first sub-group 3-group-1, and a second wireless transmission instance 4-out-4, 4-out-5 converted by the second converter 3-con-2 from the same two MIMO signals 2-sig-1, 2-sig-2 and transmitted via antennas 3-ant-4, 3-ant-5 in the first sub-group 3-group-1.

In one embodiment, the first access point 1-AP is a wifi access point supporting at least partly a standard associated with IEEE 802.11, such as IEEE 802.11n or IEEE 802.11ac, in which said spatial multiplexing in conjunction with the two MIMO signals 2-sig-1, 2-sig-2 is part of said standard.

FIG. 19C illustrates one embodiment of a method for adapting a wireless communication system by reorganizing related transmissions over a wire-based medium. The method includes: In step 1151, distributing (FIG. 19A), to a plurality of converters 3-con-1, 3-con-2, via a wire-based medium 2-WM, a first transmission in a form of a first signal 2-sig-1, 2-sig-2. In step 1152, converting (FIG. 19A), by each of the plurality of converters 3-con-1, 3-con-2, the first signal 2-sig-1, 2-sig-2 into an output signal (e.g., 2-sig-1, 2-sig-2 is converted by 3-con-1 into 4-out-1, 4-out-2, and the same 2-sig-1, 2-sig-2 is converted by 3-con-2 into 4-out-4, 4-out-5), thereby producing respectively a plurality of output signals 4-out-1, 4-out-2, 4-out-4, 4-out-5 all occupying a single wireless frequency range 4-wfr. In step 1153, detecting a congestion condition associated with the first transmission. In step 1154, distributing (FIG. 19B), as a result of said detection, to at least one of the converters in the plurality (e.g., to converter 3-con-2), via the wire-based medium 2-WM, an additional transmission in a form of an additional signal 2-sig-9, 2-sig-10. In step 1155, converting (FIG. 19B), by said at least one of the converters 3-con-2, the additional signal 2-sig-9, 2-sig-10 into an additional output signal 4-out-4', 4-out-5' occupying a single different wireless frequency range 4-wfr'', thereby allowing the additional transmission to coexist with the first transmission, and consequently resolving said congestion condition detected.

The following paragraphs are associated with FIG. 20A, FIG. 20B, FIG. 20C, and FIG. 20D.

Figure 20A:
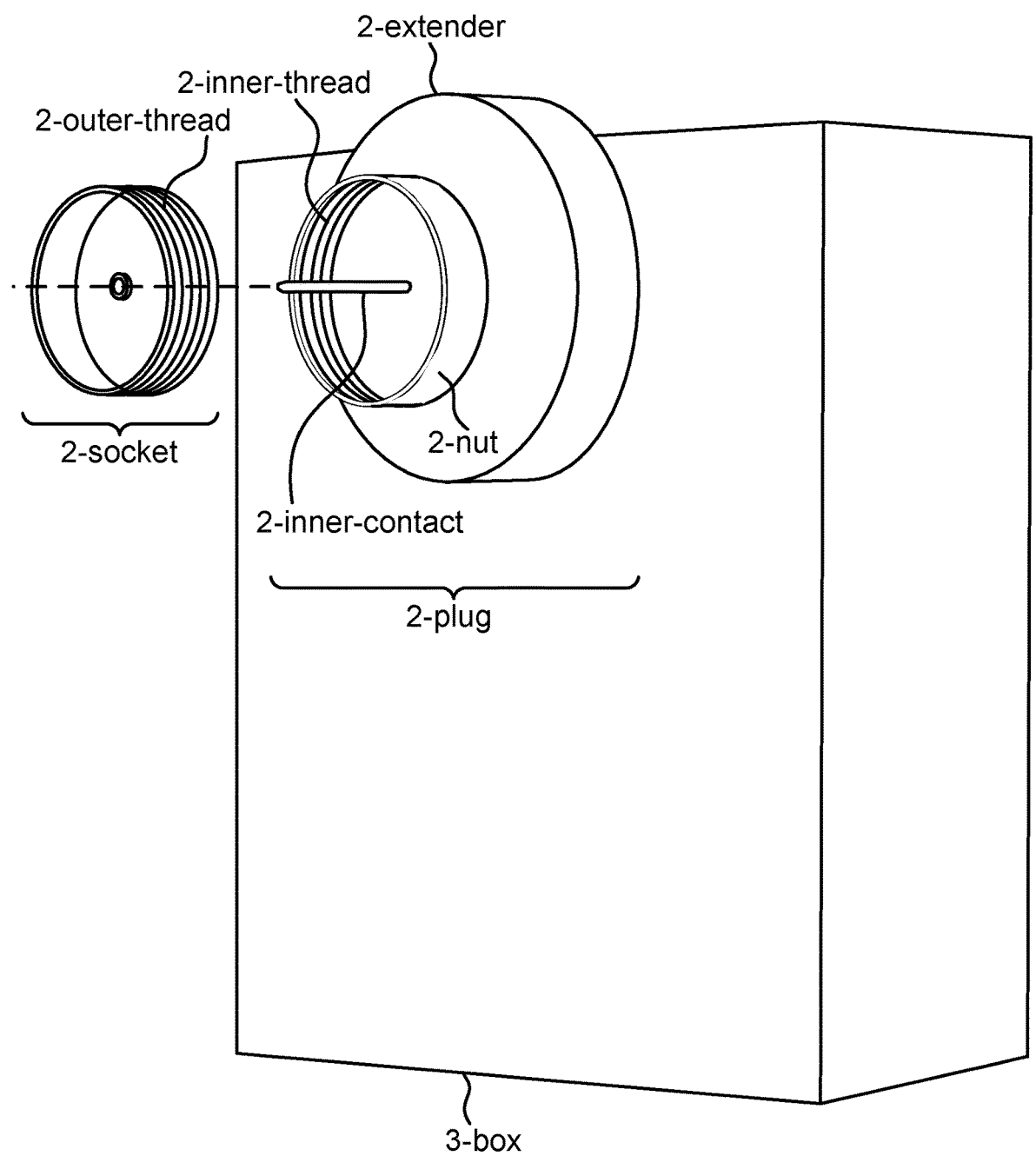
FIG. 20A illustrates one embodiment of a system operative to be easily fastened to a wall-mounted socket having an outer thread.
Figure 20B:
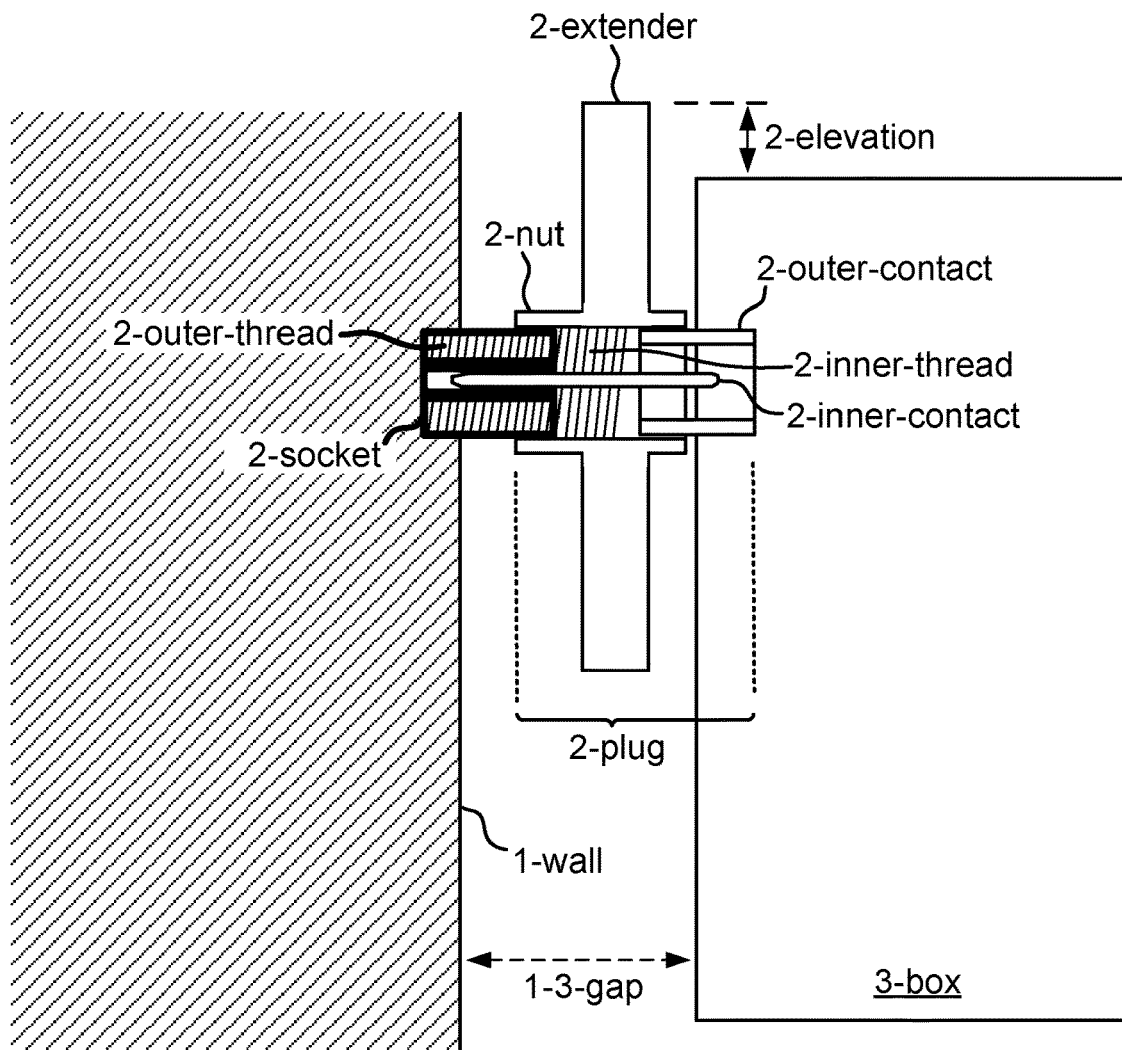
FIG. 20B illustrates one embodiment of a system operative to be easily fastened to a wall-mounted socket having an outer thread.
Figure 20C:
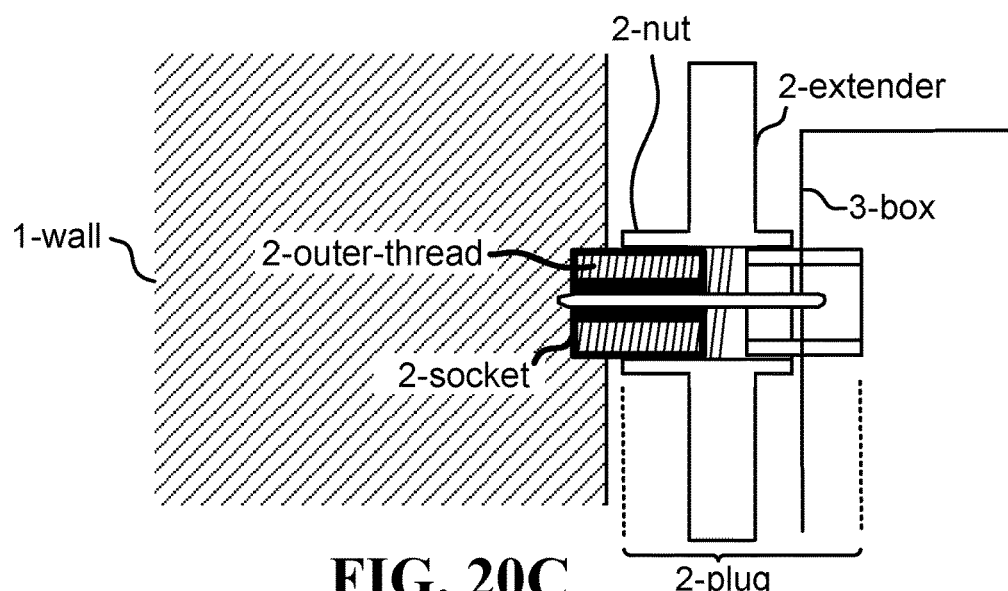
FIG. 20C illustrates one embodiment of a system operative to be easily fastened to a wall-mounted socket having an outer thread.

FIG. 20A, FIG. 20B, and FIG. 20C illustrates one embodiment of a system operative to be easily fastened to a wall-mounted socket having an outer thread. The system includes: a coaxial plug 2-plug comprising: (i) a rotating nut-like envelop 2-nut having an inner-thread 2-innerthread, (ii) an outer contact 2-outer-contact, (iii) an inner contact 2-inner-contact, and (iv) an extender 2-extender, in which the extender 2-extender surrounds the rotating nut-like envelop 2-nut and is mechanically fixed to the rotating nut-like envelop 2-nut, and the rotating nut-like envelop 2-nut is connected to the outer contact 2-outer-contact in such a way that allows the rotating nut-like envelop 2-nut to freely rotate about the outer contact 2-outer-contact; and a box 3-box operative to house electronic components, in which the outer contact 2-outer-contact is mechanically fixed to the box 3-box, either directly or indirectly.

In one embodiment, the box 3-box is operative to be placed in contact with a wall-mounted coaxial socket 2-socket having an outer thread 2-outer-tread, such that the rotating nut-like envelop 2-nut engulfs the wall-mounted coaxial socket 2-socket, and such that the rotating nut-like envelop 2-nut is now sandwiched between the box 3-box and a wall 1-wall on which the wall-mounted coaxial socket 2-socket is mounted; and the extender 2-extender is operative to allows a user to mechanically access the rotating nut-like envelop 2-nut, now sandwiched between the box 3-box and the wall 1-wall, thereby further allowing the user to rotate the rotating nut-like envelop 2-nut about the wall-mounted coaxial socket 2-socket using the extender 2-extender, and thereby fastening, in a screw-like rotation movement involving the outer thread 2-outer-tread engaging the inner thread 2-inner-thread, the rotating nut-like envelop 2-nut into the wall-mounted coaxial socket 2-socket, in which said screw-like action mechanically fastens the box 3-box to the wall-mounted coaxial socket 2-socket and the wall 1-wall, and consequently facilitates a stable electrical contact between the outer contact 2-outer-contact and the wall-mounted coaxial socket 2-socket, and between the inner contact 2-inner-contact and the wall-mounted coaxial socket 2-socket.

In one embodiment, the coaxial plug 2-plug is a F-Type coaxial plug; and the wall-mounted coaxial socket 2-socket is a F-type coaxial socket acting as a mating bolt for said rotating nut-like envelop 2-nut.

In one embodiment, the coaxial plug 2-plug is the only contact of the system with the wall-mounted coaxial socket 2-socket and the wall 1-wall, hereby placing the entire weight of the system on said coaxial plug 2-plug.

In one embodiment, the entire weight of the system is more than 100 (one hundred) grams.

In one embodiment, the entire weight of the system is more than 500 (five hundred) grams.

In one embodiment, said stable electrical contact allows for electrical signals (e.g., 2-sig-1, 2-sig-2, 2-sig-3, FIG. 1A) to propagate from a coaxial cable (e.g., 2-WM, FIG. 1A) embedded in the wall 1-wall to the electronic components (e.g., 3-x-1, 3-x-2, 3-x-3, FIG. 1A) located in the box 3-box and vice versa.

In one embodiment, said extender 2-extender is configured to act as a wrench operative to grip and apply a twisting torque on the rotating nut-like envelop 2-nut, thereby facilitating said screw-like rotation movement.

In one embodiment, the rotating nut-like envelop 2-nut, when sandwiched between the box 3-box and the wall 1-wall, is hidden from the user, and thereby necessitating the use of the extender 2-extender to achieve said screw-like rotation movement.

In one embodiment, the extender 2-extender is elevated 2-elevation (FIG. 20B) above the box 3-box, thereby allowing said gripping when the rotating nut-like envelop 2-nut is sandwiched between the box 3-box and the wall 1-wall.

Figure 20D:
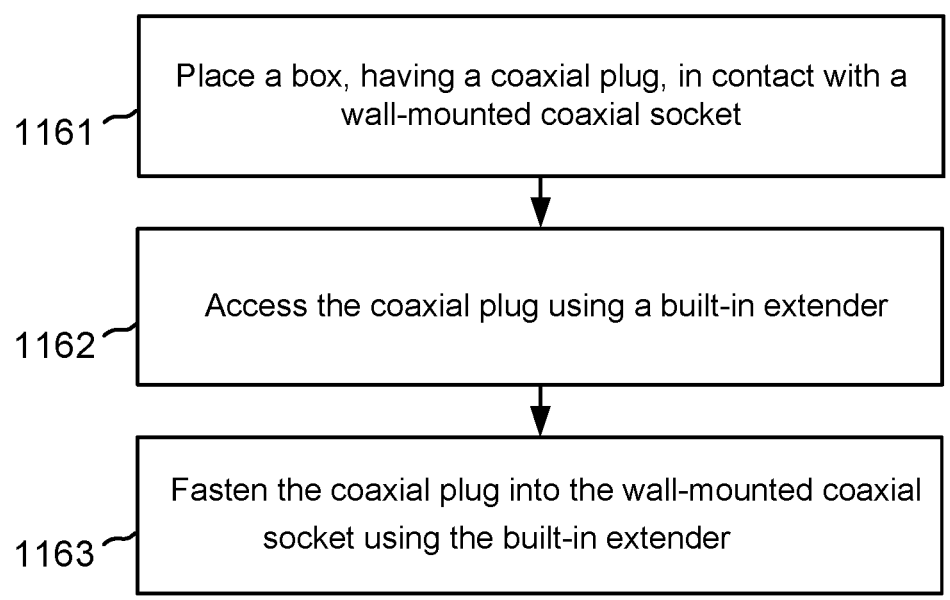
FIG. 20D illustrates one embodiment of a method for easily fastening a box to a wall-mounted socket.

FIG. 20D illustrates one embodiment of a method for easily fastening a box to a wall-mounted socket. The method includes: In step 1161, placing (FIG. 20B) a box 3-box, having a coaxial plug 2-plug, in contact with a wall-mounted coaxial socket 2-socket, so as to initially cause the coaxial plug 2-plug to engulf the wall-mounted coaxial socket 2-socket, thereby hiding said coaxial plug 2-plug between the box 3-box and a wall 1-wall on which the wall-mounted coaxial socket 2-socket is mounted. In step 1162, accessing the coaxial plug 2-plug, now hidden between the box 3-box and the wall 1-wall, using a built-in extender 2-extender. In step 1163, fastening (FIG. 20C) the coaxial plug 2-plug into the wall-mounted coaxial socket 2-socket using the built-in extender 2-extender as a wrench.

Figure 21A:
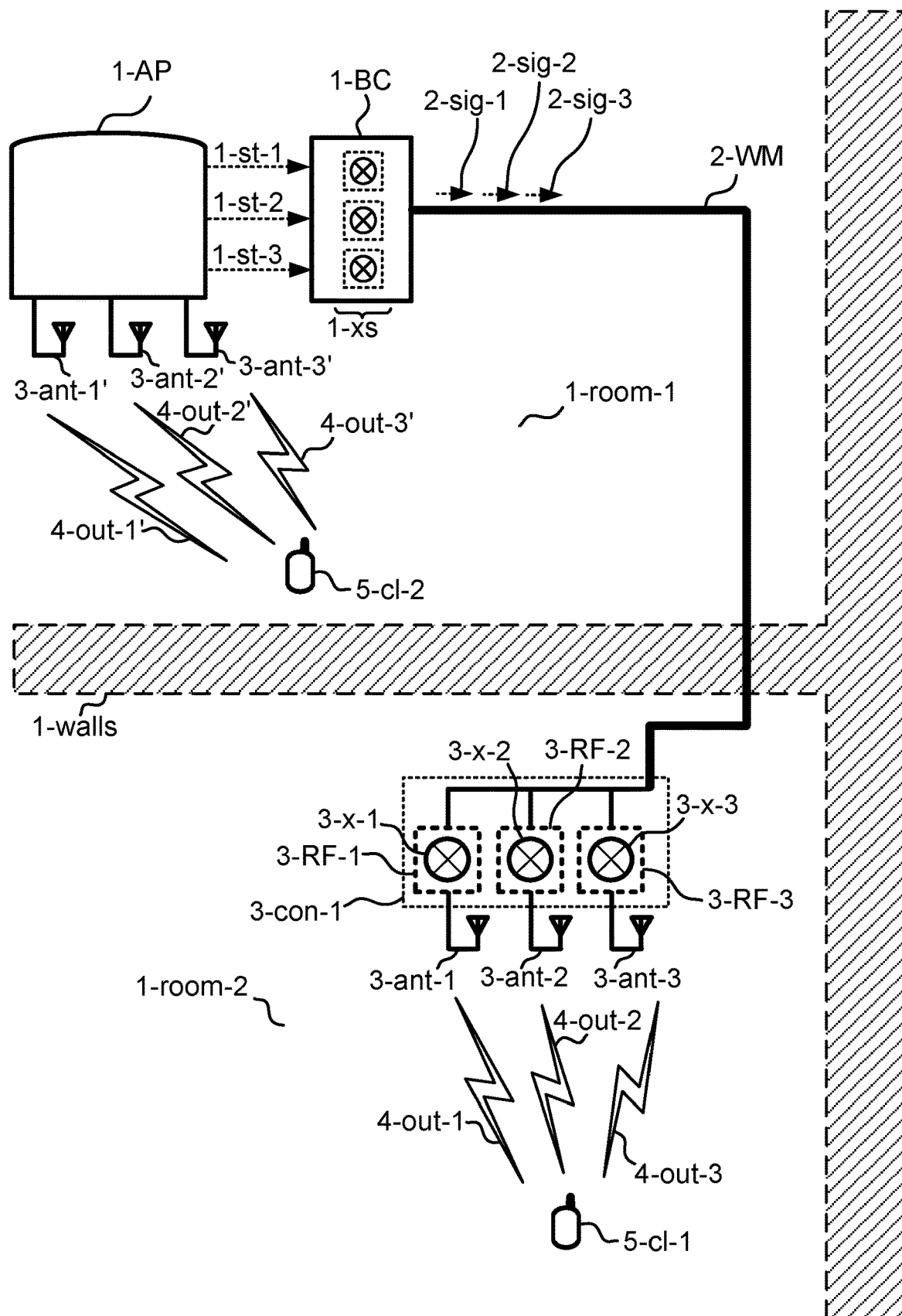
FIG. 21A illustrates one embodiment of a system operative to maximize data transmission rates in conjunction with a spatial-multiplexing transmission.
Figure 21B:
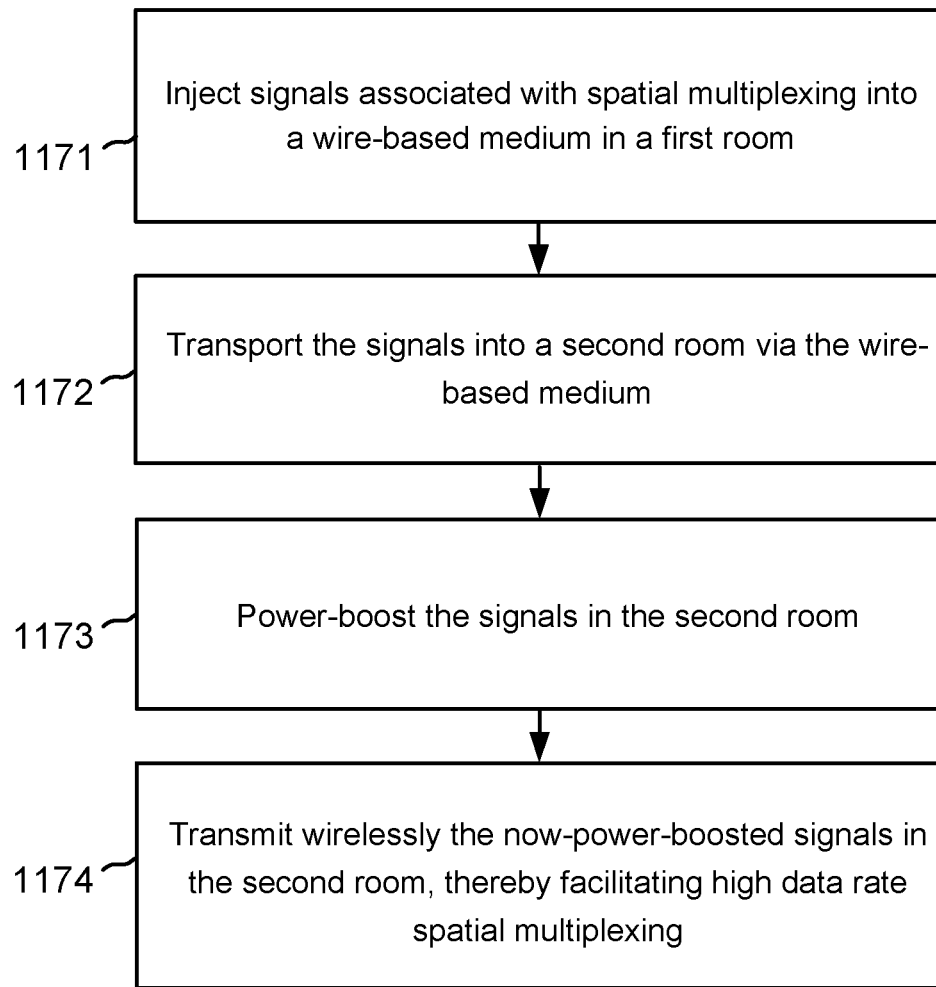
FIG. 21B illustrates one embodiment of a method for maximizing data transmission rates in conjunction with a spatial-multiplexing transmission.

The following paragraphs are associated with FIG. 21A and FIG. 21B.

One embodiment is a system operative to maximize data transmission rates in conjunction with a spatial-multiplexing transmission, comprising: an access point 1-AP (FIG. 21A) located in a first room 1-room-1 (FIG. 21A) and comprising a local plurality of antennas 3-ant-1', 3-ant-2', 3-ant-3' (FIG. 21A) located together with the access point 1-AP in the first room 1-room-1; a plurality of power boosters 3-RF-1, 3-RF-2. 3-RF-3 (FIG. 21A) located in a second room 1-room-2 (FIG. 21A) and associated with a peripheral plurality of antennas 3-ant-1, 3-ant-2, 3-ant-3 (FIG. 21A) located together with the plurality of power boosters 3-RF-1, 3-RF-2. 3-RF-3 in the second room 1-room-2; and a wire-based medium 2-WM (FIG. 21A) connecting the first room 1-room-1 and the second room 1-room-2.

In one embodiment, the access point 1-AP is configured to use the local plurality of antennas 3-ant-1', 3-ant-2', 3-ant-3' to transmit wirelessly 4-out-1', 4-out-2', 4-out-3' (FIG. 21A), in the first room 1-room-1, respectively, a plurality of spatially-multiplexed streams 1-st-1, 1-st-2, 1-st-3 (FIG. 21A), at a power level that is above a certain level per each of the streams, thereby allowing a receiving wireless device 5-cl-2 (FIG. 21A) located in the first room 1-room-1 to decode the plurality of spatially-multiplexed streams 1-st-1, 1-st-2, 1-st-3; the access point 1-AP is further configured to inject into the wire-based medium 2-WM, in the first room 1-room-1, a plurality of signals 2-sig-1, 2-sig-2, 2-sig-3 (FIG. 21A) derived respectively from the plurality spatially-multiplexed streams 1-st-1, 1-st-2, 1-st-3 (FIG. 21A); the wire-based medium 2-WM is configured to transport the plurality of signals 2-sig-1, 2-sig-2, 2-sig-3 to the second room 1-room-2; each of the plurality of power boosters 3-RF-1, 3-RF-2. 3-RF-3 is configured to power-boost, to a power level that is above the certain level, a respective one of the signals 2-sig-1, 2-sig-2, 2-sig-3 extracted from the wire-based medium 2-WM in the second room 1-room-2; and the plurality of peripheral antennas 3-ant-1, 3-ant-2, 3-ant-3 are configured to transmit wirelessly 4-out-1, 4-out-2, 4-out-3 (FIG. 21A), in the second room 1-room-2, respectively, the plurality of signals 2-sig-1, 2-sig-2, 2-sig-3, in which the plurality of signals 2-sig-1, 2-sig-2, 2-sig-3 are now power-boosted, thereby allowing another receiving wireless device 5-cl-1 located in the second room 1-room-2 to decode the same plurality of spatially-multiplexed streams 1-st-1, 1-st-2, 1-st-3.

In one embodiment, the certain level is +10 (plus ten) dBm. In one embodiment, the certain level is 0 (zero) dBm.

FIG. 21B illustrates one embodiment of a method for maximizing data transmission rates in conjunction with a spatial-multiplexing transmission. The method includes: In step 1171, injecting, in a first room 1-room-1 (FIG. 21A), a plurality of 64-QAM or higher modulation signals 2-sig-1, 2-sig-2, 2-sig-3 (FIG. 21A) associated with a spatial-multiplexing transmission 1-st-1, 1-st-2, 1-st-3 (FIG. 21A) into a wire-based medium 2-WM (FIG. 21A). In step 1172, transporting the plurality of signals 2-sig-1, 2-sig-2, 2-sig-3, via the wire-based medium 2-WM, to a second room 1-room-2 (FIG. 21A). In step 1173, power-boosting the plurality of signals 2-sig-1, 2-sig-2, 2-sig-3 in the second room 1-room-2 to a power level that is above a certain level per each of the signals. In step 1174, transmitting wirelessly 4-out-1, 4-out-2, 4-out-3 (FIG. 21A) the plurality of signals 2-sig-1, 2-sig-2, 2-sig-3, which are now power-boosted, into the second room 1-room-2, thereby allowing a receiving wireless device 5-cl-1 located in the second room 1-room-2 to receive the plurality of signals 2-sig-1, 2-sig-2, 2-sig-3 (via 4-out-1, 4-out-2, 4-out-3 respectively) at a combined power level that is above −50 (minus fifty) dBm, thereby allowing the receiving wireless device 5-cl-1 located in the second room 1-room-2 to decode the spatial-multiplexing transmission 1-st-1, 1-st-2, 1-st-3 at 64-QAM or higher modulation, thereby facilitating physical data transmission and decoding rates of above 60 (sixty) Mbps (mega-bits-per-second) per each of the signals 2-sig-1, 2-sig-2, 2-sig-3 per a signal bandwidth of 20 (twenty) MHz (megahertz).

In one embodiment, the certain level is +10 (plus ten) dBm. In one embodiment, wherein the certain level is 0 (zero) dBm.

One embodiment is a system operative to maximize data transmission rates in conjunction with a spatial-multiplexing transmission, comprising: an access point 1-AP (FIG. 21A) located in a first room 1-room-1 (FIG. 21A); a plurality of power boosters 3-RF-1, 3-RF-2. 3-RF-3 (FIG. 21A) located in a second room 1-room-2 (FIG. 21A); a plurality of antennas 3-ant-1, 3-ant-2, 3-ant-3 (FIG. 21A) associated respectively with the plurality of power boosters 3-RF-1, 3-RF-2. 3-RF-3; and a wire-based medium 2-WM (FIG. 21A) connecting the first room 1-room-1 and the second room 1-room-2.

In one embodiment, the access point 1-AP is configured to inject, in the first room 1-room-1, a plurality of 64-QAM or higher modulation signals 2-sig-1, 2-sig-2, 2-sig-3 (FIG. 21A) associated with a spatial-multiplexing transmission 1-st-1, 1-st-2, 1-st-3 (FIG. 21A) into the wire-based medium 2-WM; the wire-based medium 2-WM is configured to transport the plurality of signals 2-sig-1, 2-sig-2, 2-sig-3 to the second room 1-room-2; each of the plurality of power boosters 3-RF-1, 3-RF-2. 3-RF-3 is configured to power-boost, to a power level that is above a certain level, a respective one of the signals 2-sig-1, 2-sig-2, 2-sig-3 extracted from the wire-based medium 2-WM in the second room 1-room-2; and the plurality of antennas 3-ant-1, 3-ant-2, 3-ant-3 are configured to transmit wirelessly 4-out-1, 4-out-2, 4-out-3 (FIG. 21A), in the second room 1-room-2, respectively, the plurality of signals 2-sig-1, 2-sig-2, 2-sig-3, in which the plurality of signals 2-sig-1, 2-sig-2, 2-sig-3 are now power-boosted, thereby allowing a first receiving wireless device 5-cl-1 located in the second room 1-room-2 to decode the spatial-multiplexing transmission 1-st-1, 1-st-2, 1-st-3 at 64-QAM (e.g., 64-quadrature amplitude modulation) or higher modulation, thereby facilitating physical data transmission and decoding rates of above 60 (sixty) Mbps (mega-bits-per-second) per each of the signals 2-sig-1, 2-sig-2, 2-sig-3 per a signal bandwidth of 20 (twenty) MHz (megahertz).

In one embodiment, the spatial-multiplexing transmission 1-st-1, 1-st-2 is a WiFi multiple-input multiple-output (MIMO) 2×2 (two by two) transmission, in which the plurality of signals includes two signals 2-sig-1, 2-sig-2; the bandwidth of each of the signals 2-sig-1, 2-sig-2 is 20 (twenty) MHz (megahertz); and therefore the physical data transmission and decoding rates facilitated are above 120 (one hundred and twenty) Mbps (mega-bits-per-second).

In one embodiment, the spatial-multiplexing transmission 1-st-1, 1-st-2, 1-st-3 is a WiFi multiple-input multiple-output (MIMO) 3×3 (three by three) transmission, in which the plurality of signals includes three signals 2-sig-1, 2-sig-2, 2-sig-3; the bandwidth of each of the signals 2-sig-1, 2-sig-2, 2-sig-3 is 20 (twenty) MHz (megahertz); and therefore the physical data transmission and decoding rates facilitated are above 180 (one hundred and eighty) Mbps (mega-bits-per-second).

In one embodiment, the spatial-multiplexing transmission 1-st-1, 1-st-2, 1-st-3 (+a fourth stream not shown) is a WiFi multiple-input multiple-output (MIMO) 4×4 (four by four) transmission, in which the plurality of signals includes four signals 2-sig-1, 2-sig-2, 2-sig-3 (+a fourth signal not shown); the bandwidth of each of the signals 2-sig-1, 2-sig-2, 2-sig-3 (+a fourth signal not shown) is 20 (twenty) MHz (megahertz); and therefore the physical data transmission and decoding rates facilitated are above 240 (two hundred and forty) Mbps (mega-bits-per-second).

In one embodiment, the spatial-multiplexing transmission 1-st-1, 1-st-2 is a WiFi multiple-input multiple-output (MIMO) 2×2 (two by two) transmission, in which the plurality of signals includes two signals 2-sig-1, 2-sig-2; the bandwidth of each of the signals 2-sig-1, 2-sig-2 is 40 (forty) MHz (megahertz); and therefore the physical data transmission and decoding rates facilitated are above 240 (two hundred and forty) Mbps (mega-bits-per-second).

In one embodiment, the spatial-multiplexing transmission 1-st-1, 1-st-2, 1-st-3 is a WiFi multiple-input multiple-output (MIMO) 3×3 (three by three) transmission, in which the plurality of signals includes three signals 2-sig-1, 2-sig-2, 2-sig-3; the bandwidth of each of the signals 2-sig-1, 2-sig-2, 2-sig-3 is 40 (forty) MHz (megahertz); and therefore the physical data transmission and decoding rates facilitated are above 360 (three hundred and sixty) Mbps (mega-bits-per-second).

In one embodiment, the spatial-multiplexing transmission 1-st-1, 1-st-2, 1-st-3 (+a fourth stream not shown) is a WiFi multiple-input multiple-output (MIMO) 4×4 (four by four) transmission, in which the plurality of signals includes four signals 2-sig-1, 2-sig-2, 2-sig-3 (+a fourth signal not shown); the bandwidth of each of the signals 2-sig-1, 2-sig-2, 2-sig-3 (+a fourth signal not shown) is 40 (forty) MHz (megahertz); and therefore the physical data transmission and decoding rates facilitated are above 480 (four hundred and eighty) Mbps (mega-bits-per-second).

In one embodiment, the system further comprises: a second plurality of antennas 3-ant-1', 3-ant-2', 3-ant-3' (FIG. 21A) located together with the access point 1-AP in the first room 1-room-1; wherein: the access point 1-AP is further configured to use the second plurality of antennas 3-ant-1', 3-ant-2', 3-ant-3' to transmit wirelessly 4-out-1', 4-out-2', 4-out-3' (FIG. 21A), in the first room 1-room-1, respectively, the plurality of 64-QAM or higher modulation signals 2-sig-1, 2-sig-2, 2-sig-3 before being injected into the wire-based medium 2-WM, at a power level that is above +10 (plus ten) dBm per each of the signals, thereby allowing a second receiving wireless device 5-cl-2 (FIG. 21A) located in the first room 1-room-1 to decode the spatial-multiplexing transmission 1-st-1, 1-st-2, 1-st-3 at 64-QAM or higher modulation, thereby facilitating physical data transmission and decoding rates of above 60 (sixty) Mbps (mega-bitsper-second) per each of the signals 2-sig-1, 2-sig-2, 2-sig-3 per a signal bandwidth of 20 (twenty) MHz (megahertz).

In one embodiment, the first receiving wireless device 5-cl-1 located in the second room 1-room-2, and the second receiving wireless device 5-cl-2 located in the first room 1-room-1, are both configured to decode the spatial-multiplexing transmission 1-st-1, 1-st-2, 1-st-3 at 64-QAM or higher modulation, although being located in two different rooms. In one embodiment, the plurality of 64-QAM or higher modulation signals 2-sig-1, 2-sig-2, 2-sig-3 transmitted wirelessly 4-out-1', 4-out-2', 4-out-3' in the first room 1-room-1 are attenuated more than 80 (eighty) dB before reaching the first receiving wireless device 5-cl-1 in the second room 1-room-2, and therefore cannot be decoded by the first receiving wireless device 5-cl-1.

In one embodiment, the certain level is +10 (plus ten) dBm. In one embodiment, the certain level is 0 (zero) dBm.

Figure 22A:
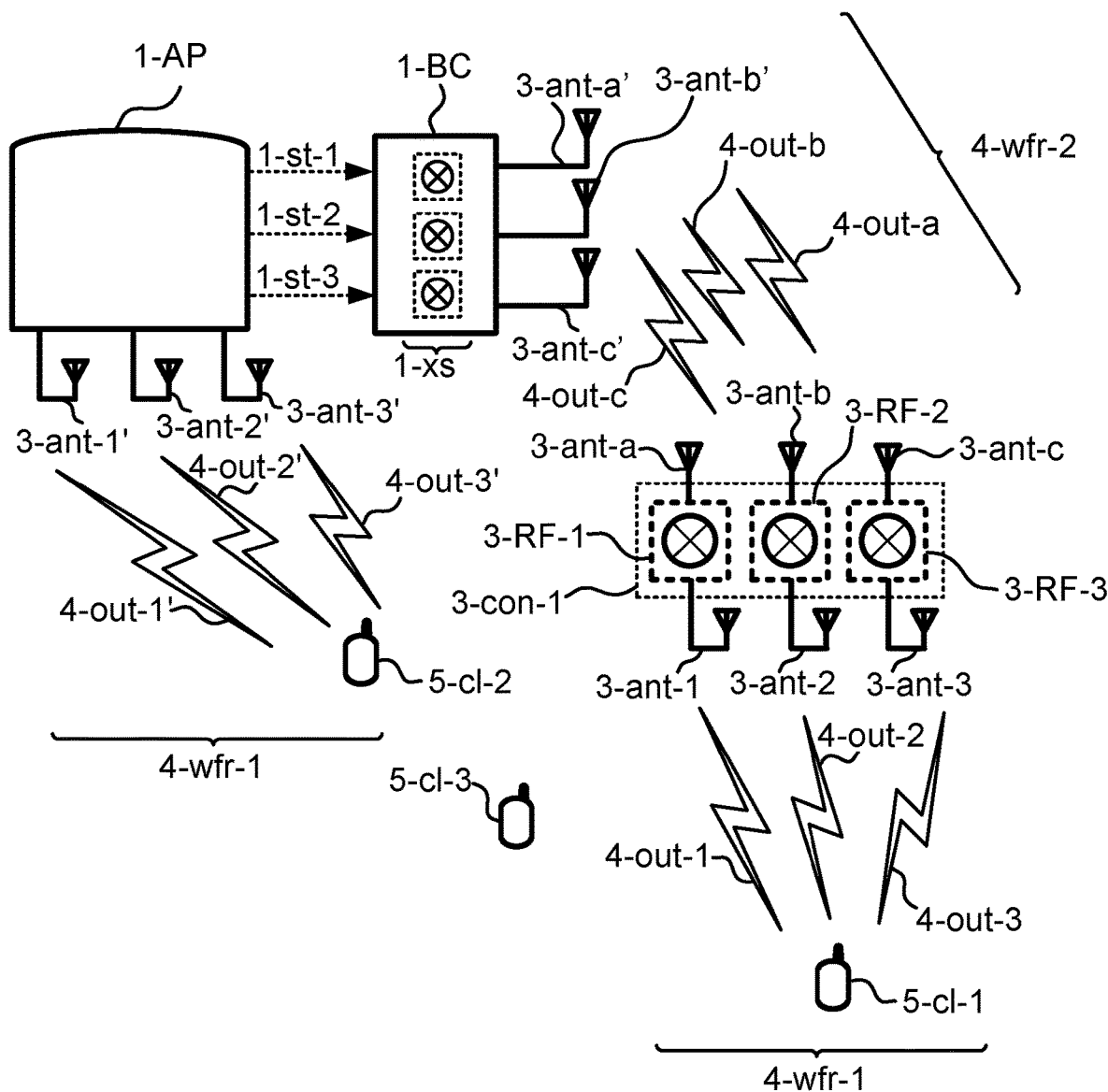
FIG. 22A illustrates one embodiment of a system operative to utilize a dedicated frequency range in support of spatial multiplexing over a different frequency range.
Figure 22B:
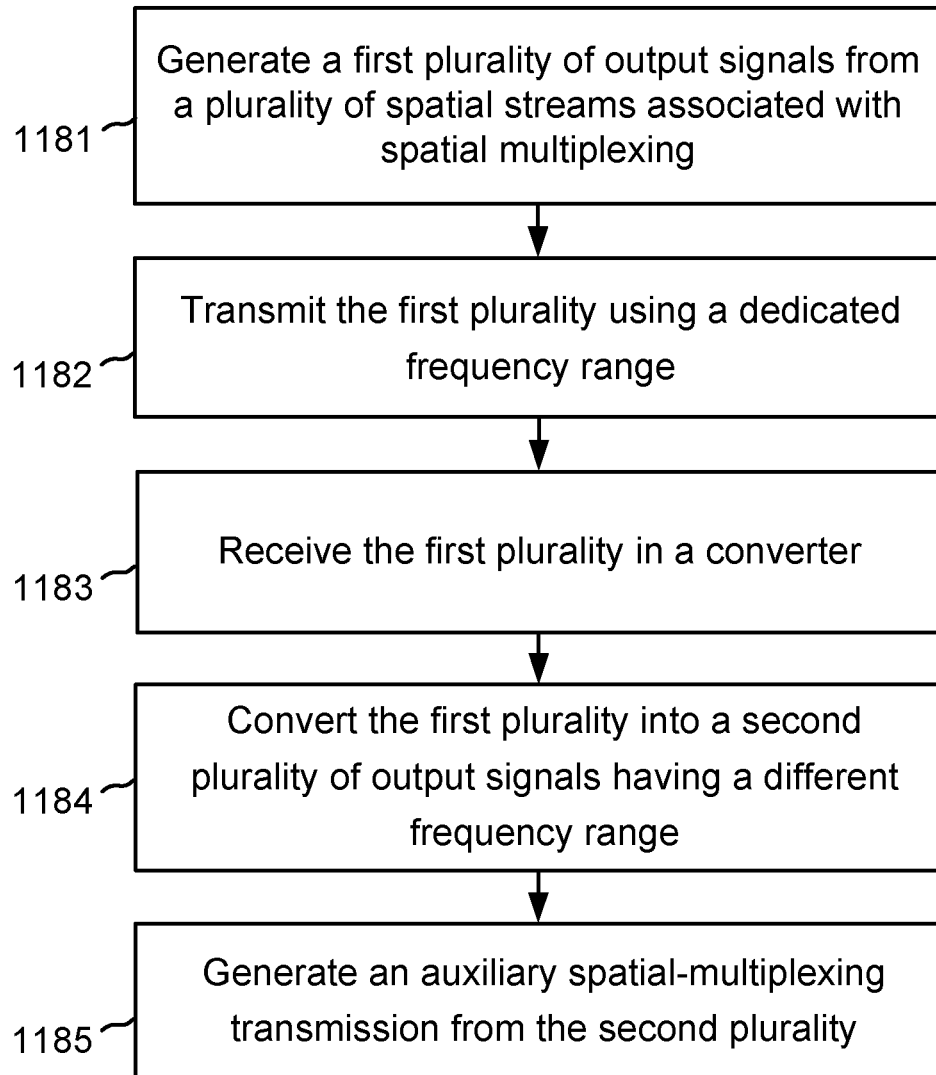
FIG. 22B illustrates one embodiment of a method for using a first transmission to facilitate generation of an auxiliary spatial multiplexing transmission.

The following paragraphs are associated with FIG. 22A and FIG. 22B.

One embodiment is a system operative to utilize a dedicated frequency range in support of spatial multiplexing over a different frequency range, comprising: an access point 1-AP (FIG. 22A) operative to generate a first set of spatial streams 1-st-1, 1-st-2, 1-st-3, in which the access point 1-AP is further operative to: wirelessly transmit the first set of spatial streams as a first spatial-multiplexing transmission 4-out-1', 4-out-2', 4-out-3' occupying a certain single frequency range 4-wfr-1 (FIG. 22A), and wirelessly transmit, again and in parallel to said first spatial-multiplexing transmission, the first set of spatial streams as a second spatial-multiplexing transmission 4-out-a, 4-out-b, 4-out-c occupying a dedicated frequency range 4-wfr-2 (FIG. 22A) that is different than said certain single frequency range 4-wfr-1; and a converter 3-con-1 (FIG. 22A), located away from the access point 1-AP, in which the converter is operative to: (i) receive the second spatial-multiplexing transmission 4-out-a, 4-out-b, 4-out-c, (ii) convert the second spatial-multiplexing transmission from the dedicated frequency range 4-wfr-2 into the certain single frequency range 4-wfr-1, and (iii) re-transmit the second spatial-multiplexing transmission as a third spatial-multiplexing transmission 4-out-1, 4-out-2, 4-out-3 (FIG. 22A) now occupying the single frequency range 4-wfr-1.

In one embodiment, both the first 4-out-1', 4-out-2', 4-out-3' and third 4-out-1, 4-out-2, 4-out-3 spatial-multiplexing transmissions occupy the same certain single frequency range 4-wfr-1 and are transmitted in parallel, thereby allowing any wireless client device 5-cl-1, 5-cl-2, 5-cl-3 that receives: (i) the first spatial-multiplexing transmission 4-out-1', 4-out-2', 4-out-3', (ii) the third spatial-multiplexing transmission 4-out-1, 4-out-2, 4-out-3, (iii) or any combination thereof, to successfully decode the first set of spatial streams 1-st-1, 1-st-2, 1-st-3.

In one embodiment, the access point 1-AP comprises: a first set of antennas 3-ant-1', 3-ant-2', 3-ant-3', in which the first set of antennas are operative to facilitate said first spatial-multiplexing transmission 4-out-1', 4-out-2', 4-out-3'; and a second set of antennas 3-ant-a', 3-ant-b', 3-ant-c', in which the second set of antennas are operative to facilitate said second spatial-multiplexing transmission 4-out-a, 4-out-b, 4-out-c. In one embodiment, the converter 3-con-1 comprises: a third set of antennas 3-ant-a, 3-ant-b, 3-ant-c, in which the third set of antennas are operative to facilitate said reception of the second spatial-multiplexing transmission 4-out-a, 4-out-b, 4-out-c; and a fourth set of antennas 3-ant-1, 3-ant-2, 3-ant-3, in which the fourth set of antennas are operative to facilitate said transmission of the third spatial-multiplexing transmission 4-out-1, 4-out-2, 4-out-3.

In one embodiment, the access point 1-AP comprises: a first set of antennas 3-ant-1', 3-ant-2', 3-ant-3', in which the first set of antennas are operative to facilitate both said first spatial-multiplexing transmission 4-out-1', 4-out-2', 4-out-3' and said second spatial-multiplexing transmission 4-out-a, 4-out-b, 4-out-c. In one embodiment, the converter 3-con-1 comprises: a third set of antennas 3-ant-a, 3-ant-b, 3-ant-c, in which the third set of antennas are operative to facilitate both said reception of the second spatial-multiplexing transmission 4-out-a, 4-out-b, 4-out-c and said transmission of the third spatial-multiplexing transmission 4-out-1, 4-out-2, 4-out-3. In one embodiment, the access point 1-AP comprises a base converter 1-BC that includes a plurality of mixers 1-xs that converts the plurality of streams 1-st-1, 1-st-2, 1-st-3 to the second spatial-multiplexing transmission 4-out-a, 4-out-b, 4-out-c that occupy the dedicated frequency range 4-wfr-2.

In one embodiment, said conversion of the second spatial-multiplexing transmission from the dedicated frequency range 4-wfr-2 into the certain single frequency range 4-wfr-1 is performed by a set of radio frequency (RF) chains 3-RF-1, 3-RF-2, 3-RF-3 in the converter 3-con-1, thereby facilitating said transmission in parallel of the first 4-out-1', 4-out-2', 4-out-3' and third 4-out-1, 4-out-2, 4-out-3 spatial-multiplexing transmissions. In one embodiment, said RF chains 3-RF-1, 3-RF-2, 3-RF-3 comprise a set of mixers, in which using said dedicated frequency range 4-wfr-2 for the second spatial-multiplexing transmission 4-out-a, 4-out-b, 4-out-c prevents the third 4-out-1, 4-out-2, 4-out-3 spatial-multiplexing transmission, which is generated by the converter 3-con-1, from adversely affecting reception of the second spatial-multiplexing transmission in the same converter 3-con-1 (e.g., preventing oscillation in the converter).

In one embodiment, said first, second, and third spatial-multiplexing transmissions are associated with a transmission technique related to orthogonal frequency division multiplexing (OFDM), such as IEEE 802.11/WiFi, thereby allowing for symbol-level macro-diversity in conjunction with the first and third spatial-multiplexing transmissions, which share the same certain single frequency range 4-wfr-1. In one embodiment, said conversion is a radio frequency (RF) conversion that does not involve symbol decoding, thereby facilitating near zero latency, and therefore further enabling said symbol-level macro-diversity.

In one embodiment, said converter 3-con-1 is physically located between the access point 1-AP and at least one of the wireless clients 5-cl-1, thereby functioning as a relay or a range extender.

FIG. 22B illustrates one embodiment of a method for using a first transmission to facilitate generation of an auxiliary spatial multiplexing transmission. The method includes: in step 1181, generating, in an access point 1-AP (FIG. 22A), from a plurality of N spatial streams 1-st-1, 1-st-2, 1-st-3, a first plurality of N output signals 4-out-a, 4-out-b, 4-out-c respectively (N=3 in this example). In step 1182, transmitting wirelessly, by the access point 1-AP, the first plurality of N output signals 4-out-a, 4-out-b, 4-out-c using a dedicated frequency range 4-wfr-2 (FIG. 22A). In step 1183, receiving, in a converter 3-con-1 (FIG. 22A) located away from the access point 1-AP, the first plurality of N output signals 4-out-a, 4-out-b, 4-out-c. In step 1184, converting, in the converter 3-con-1, the first plurality of N output signals received 4-out-a, 4-out-b, 4-out-c into a second plurality of M output signals 4-out-1, 4-out-2, 4-out-3 (FIG. 22A) all occupying a certain single frequency range 4-wfr-1 (FIG. 22A) that is different than said dedicated frequency range 4-wfr-2, in which M is equal or greater than N (M=3 in this example). In step 1185, transmitting, by the converter 3-con-1, the second plurality of M output signals 4-out-1, 4-out-2, 4-out-3 all occupying the certain single frequency range 4-wfr-1, thereby generating an auxiliary spatial-multiplexing transmission 4-out-1, 4-out-2, 4-out-3 conveying the plurality of N spatial streams 1-st-1, 1-st-2, 1-st-3.

In one embodiment, the method further comprises: further generating, in the access point 1-AP, from the plurality of N spatial streams 1-st-1, 1-st-2, 1-st-3, a third plurality of N output signals 4-out-1', 4-out-2', 4-out-3' respectively (N=3 in this example); and further transmitting wirelessly, by the access point 1-AP, the third plurality of N output signals 4-out-1', 4-out-2', 4-out-3' using the dedicated frequency range 4-wfr-2, thereby generating a primary spatial-multiplexing transmission 4-out-1', 4-out-2', 4-out-3' further conveying the plurality of N spatial streams 1-st-1, 1-st-2, 1-st-3. In one embodiment, the transmissions of both said primary spatial-multiplexing transmission 4-out-1', 4-out-2', 4-out-3' and the auxiliary spatial-multiplexing transmission 4-out-1, 4-out-2, 4-out-3 are done simultaneously and using the same certain single frequency range 4-wfr-1, so as to allow any wireless client device 5-cl-1, 5-cl-2, 5-cl-3 that receives: (i) the primary spatial-multiplexing transmission 4-out-1', 4-out-2', 4-out-3', (ii) the auxiliary spatial-multiplexing transmission 4-out-1, 4-out-2, 4-out-3, (iii) or any combination thereof, to successfully decode the plurality of N spatial streams 1-st-1, 1-st-2, 1-st-3.

In one embodiment, said transmission wirelessly, of the first plurality of N output signals 4-out-a, 4-out-b, 4-out-c using the dedicated frequency range 4-wfr-2, is a dedicated spatial-multiplexing transmission 4-out-a, 4-out-b, 4-out-c, in which each of the N output signals 4-out-a, 4-out-b, 4-out-c in the first plurality occupies the same dedicated frequency range 4-wfr-2. In one embodiment, said conversion of the first plurality of N output signals 4-out-a, 4-out-b, 4-out-c received into the second plurality of M output signals 4-out-1, 4-out-2, 4-out-3 comprises: generating each one of the M output signals 4-out-1, 4-out-2, 4-out-3 from one of the N output signals 4-out-a, 4-out-b, 4-out-c or form a linear combination of at least two of the N output signals 4-out-a, 4-out-b, 4-out-c.

In one embodiment, said transmission wirelessly, of the first plurality of N output signals 4-out-a, 4-out-b, 4-out-c using the dedicated frequency range 4-wfr-2, is not a spatial-multiplexing transmission, in which each of the N output signals 4-out-a, 4-out-b, 4-out-c in the first plurality occupies a different frequency sub-range in the dedicated frequency range 4-wfr-2. In one embodiment, said conversion of the first plurality of N output signals received 4-out-a, 4-out-b, 4-out-c into the second plurality of M output signals 4-out-1, 4-out-2, 4-out-3 comprises: converting each of the first plurality of N output signals 4-out-a, 4-out-b, 4-out-c from the respective one of the different frequency sub-ranges into the respective one of the M output signals 4-out-1, 4-out-2, 4-out-3 occupying the certain single frequency range 4-wfr-1, in which M=N.

Figure 23C:
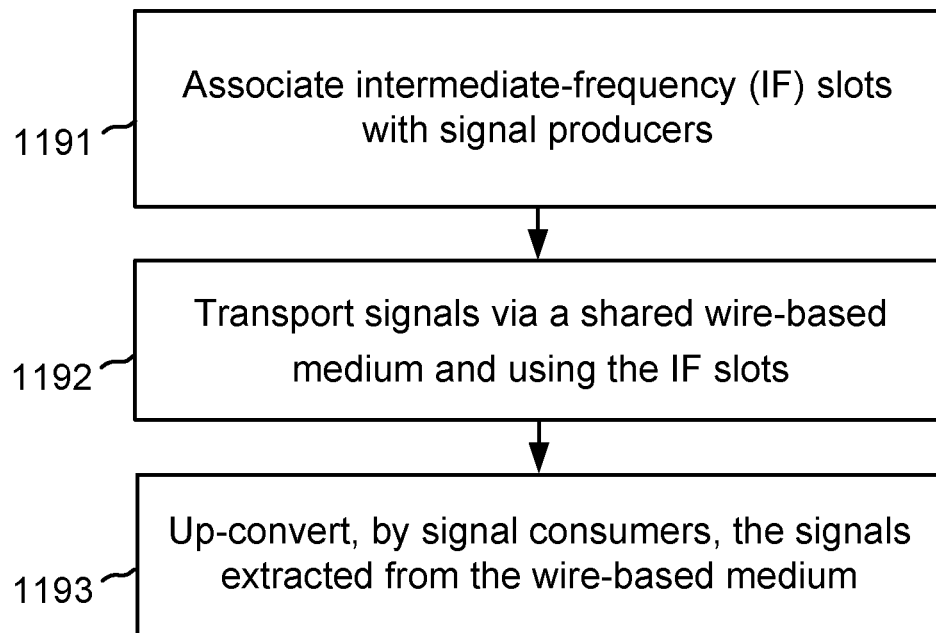
FIG. 23C illustrates one embodiment of a method for transporting signals between different elements in a vehicle using a shared wire-based medium.

The following paragraphs are associated with FIG. 23A, FIG. 23B, and FIG. 23C.

In one embodiment, a shared wired-based medium 2-WM (FIG. 23A) is deployed inside a vehicle 1-vehicle, so as to interconnect various in-vehicle communication components such as radio transceivers, antennas, and processors 1-source-1, 1-source-2, 3-ant-1, 3-ant-2, 3-ant-3, 3-ant-4. The shared wired-based medium 2-WM may be used by each of the communication components to send and receive intermediate-frequency (IF) signals 2-sig-1, 2-sig-2, 2-sig-3, 2-sig-4 (FIG. 23B) to and from at least one of the other communication components, thereby implementing an efficient in-vehicle IF communication bus, in which each of the IF signals 2-sig-1, 2-sig-2, 2-sig-3, 2-sig-4 may be a frequency-shifted version of an original signal produced by one of the communication components (e.g., produced by transceiver 1-source-2), and in which such IF signal, after being transported by the shared wired-based medium 2-WM, is extracted from the shared wired-based medium by at least one of the other communication components (e.g., by an antenna related component 3-ant-1), which in turn frequency-shifts the extracted IF signal into a respective radio-frequency (RF) signal (e.g., one of the RF signals 2-sig-r-1, 2-sig-r-2, 2-sig-r-3, 2-sig-r-4 in FIG. 23B) that could be then wirelessly transmitted outside of the vehicle 1-vehicle. A single communication component (e.g., transceiver 1-source-2) can use the IF bus 2-WM to send signals to several ones of the other components at the same time (e.g., send a signal to both a first front-facing antenna 3-ant-2 and a second rear-facing antenna 3-ant-3), or to switch (demultiplex) the signal so as to select one of the other communication component (e.g., a third antenna 3-ant-4) as a single destination for the signal.

One embodiment is a system operative to transport multi-standard signals between different elements in a vehicle using a shared wire-based medium, comprising: at least a first transmission source 1-source-1 and a second transmission source 1-source-2, all embedded in a vehicle 1-vehicle (FIG. 23A), in which the first transmission source is configured to generate a first intermediate frequency (IF) signal 2-sig-1 (FIG. 23B) associated with a first wireless transmission standard and having a first frequency span 2-IF-1 (FIG. 23B), and the second transmission source is configured to generate a second IF signal 2-sig-2 associated with a second wireless transmission standard and having a second different frequency span 2-IF-2; at least a first antenna 3-ant-1 co-located with a first converter 3-x-a (FIG. 23A) and a second antenna 3-ant-2 co-located with a second converter 3-x-b, all embedded in the vehicle 1-vehicle; and a shared wired-based medium 2-WM (FIG. 23A) interconnecting the transmission sources 1-source-1, 1-source-2 and converters 3-x-a, 3-x-b.

In one embodiment, the system is configured to: transport, via the shared wired-based medium 2-WM, the first IF signal 2-sig-1 from the first transmission source 1-source-1 to the first converter 3-x-a, and the second IF signal 2-sig-2 from the second transmission source 1-source-2 to the second converter 2-x-b; up-convert the first IF signal 2-sig-1 transported and the second IF signal 2-sig-2 transported, respectively by the first converter 3-x-a and the second converter 3-x-b, into a first radio frequency (RF) signal 2-sig-r-1 (FIG. 23B) having a frequency span 2-RF-1 associated with the first standard and a second RF signal 2-sig-r-2 having a frequency span 2-RF-2 associated with the second standard; and transmit wirelessly the first RF signal 2-sig-r-1 and the second RF signal 2-sig-r-2 respectively via the first antenna 3-ant-1 and the second antenna 3-ant-2.

In one embodiment, the system is further configured to: receive a first inbound RF signal 2-sig-r-3 (FIG. 23B) having a frequency span 2-RF-3 associated with the first standard and a second inbound RF signal 2-sig-r-4 having a frequency span 2-RF-4 associated with the second standard via the first antenna 3-ant-1 and the second antenna 3-ant-2 respectively; down-convert the first inbound RF signal 2-sig-r-3 and the second inbound RF signal 2-sig-r-4, by the first converter 3-*x-a* and the second converted 3-*x-b* respectively, into a first inbound IF signal 2-sig-3 (FIG. 23B) having a third frequency span 2-IF-3 and a second inbound IF signal 2-sig-4 having a fourth different frequency span 2-IF-4 respectively; and transport, via the shared wired-based medium 2-WM, the first inbound IF signal 2-sig-3 from the first converter 3-*x-a* to a first receiver 1-source-1 operative to decode the first inbound IF signal in conjunction with the first standard, and the second inbound IF signal 2-sig-4 from the second converter 3-*x-b* to a second receiver 1-source-2 operative to decode the second inbound IF signal in conjunction with the second standard.

In one embodiment, the first standard is a cellular communication standard associated with one of: (i) long term evolution cellular technology (LTE), (ii) second generation cellular technology (2G), (iii) third generation cellular technology (3G), (iv) fourth generation cellular technology (4G), and (v) fifth generation cellular technology (5G); and the second standard is a cellular communication standard associated with a different one of: (i) long term evolution cellular technology (LTE), (ii) second generation cellular technology (2G), (iii) third generation cellular technology (3G), (iv) fourth generation cellular technology (4G), and (v) fifth generation cellular technology (5G).

In one embodiment, the frequency span associated with the first standard is associated with one of: (i) a 500 MHz (five hundred megahertz) band (i.e., frequencies between 500 MHz and 600 MHz), (ii) a 600 MHz (six hundred megahertz) band, (iii) a 700 MHz (seven hundred megahertz) band, (iv) a 800 MHz (eight hundred megahertz) band, and (v) a 900 MHz (nine hundred megahertz) band, (vi) a 1.7 GHz (one point seven gigahertz) band (i.e., frequencies between 1.7 GHz and 1.8 GHz), (vii) a 1.8 GHz (one point eight gigahertz) band, (viii) a 1.9 GHz (one point nine gigahertz) band, (ix) a 2.1 GHz (two point one gigahertz) band, (x) a 2.3 GHz (two point three gigahertz) band, (xi) a 2.4 GHz (two point four gigahertz) band, (xii) a 2.5 GHz (two point five gigahertz) band, (xiii) a 3.6 GHz (three point six gigahertz) band, (xiv) a 26 GHz (twenty six gigahertz) band, and (xv) a millimeter-wave band; and the frequency span associated with the second standard is associated with a different one of: (i) a 500 MHz (five hundred megahertz) band, (ii) a 600 MHz (six hundred megahertz) band, (iii) a 700 MHz (seven hundred megahertz) band, (iv) a 800 MHz (eight hundred megahertz) band, and (v) a 900 MHz (nine hundred megahertz) band, (vi) a 1.7 GHz (one point seven gigahertz) band, (vii) a 1.8 GHz (one point eight gigahertz) band, (viii) a 1.9 GHz (one point nine gigahertz) band, (ix) a 2.1 GHz (two point one gigahertz) band, (x) a 2.3 GHz (two point three gigahertz) band, (xi) a 2.4 GHz (two point four gigahertz) band, (xii) a 2.5 GHz (two point five gigahertz) band, (xiii) a 3.6 GHz (three point six gigahertz) band, (xiv) a 26 GHz (twenty six gigahertz) band (i.e., frequencies between 26 GHz and 27 GHz), and (xv) a millimeter-wave band.

In one embodiment, the first standard is a cellular communication standard associated with at least one of: (i) long term evolution cellular technology (LTE), (ii) second generation cellular technology (2G), (iii) third generation cellular technology (3G), (iv) fourth generation cellular technology (4G), and (v) fifth generation cellular technology (5G); and the second standard is a radar standard associated with at least one of: (i) millimeter-wave radar technology, (ii) microwave radar technology, (iii) phased-array radar technology, and (iv) MIMO radar technology.

In one embodiment, the first standard is a general purpose cellular communication standard; and the second standard is a vehicle-to-everything (V2X) communication standard. In one embodiment, the V2X communication standard is associated with at least one of: (i) IEEE 801.11p dedicated short-range communication (DSRC), and (ii) 3GPP cellular vehicle-to-everything (C-V2X) communication.

In one embodiment, the first converter 3-*x-a* is a first RF mixer operative to shift the first IF signal 2-sig-1 into a higher frequency associated with the frequency span 2-RF-1 of the first standard; and the second converter 3-*x-b* is a second RF mixer operative to shift the second IF signal 2-sig-2 into a higher frequency associated with the frequency span 2-RF-2 of the second standard.

In one embodiment, the first transmission source 1-source-1 comprises: (i) a first transmitter 1-source-1 configured to generate an original version of the first RF signal 2-sig-r-1 having the frequency span 2-RF-1 associated with the first standard, and (ii) a first down-converter 3-*x-c* configured to shift the original version of the first RF signal into a lower frequency associated with the frequency span 2-IF-1 of the first IF signal 2-sig-1; and the second transmission source 1-source-2 comprises: (i) a second transmitter 1-source-2 configured to generate an original version of the second RF signal 2-sig-r-2 having the frequency span 2-RF-2 associated with the second standard, and (ii) a second down-converter 3-*x-d* configured to shift the original version of the second RF signal into a lower frequency associated with the frequency span 2-IF-2 of the second IF signal 2-sig-2, in which the first RF signal 2-sig-r-1 is an exact replica of the original version of the first RF signal 2-sig-r-1 and having the exact same frequency span 2-RF-1, and the second RF signal 2-sig-r-2 is an exact replica of the original version of the first RF signal 2-sig-r-2 and having the exact same frequency span 2-RF-2.

In one embodiment, the shared wired-based medium 2-WM is associated with at least one of: (i) a coaxial cable, (ii) a twisted pair wire, (iii) a cat5/cat6/cat7 cable, and (iv) any cable capable of facilitating propagation of electromagnetic signals.

In one embodiment, the transmission sources 1-source-1, 1-source-2 and the converters 3-*x-a*, 3-*x-b* are connected to the shared wired-based medium 2-WM at different points using tri-port RF elements 3-dip (FIG. 23A). In one embodiment, the tri-port RF elements 3-dip are diplexers.

FIG. 23C illustrates one embodiment of a method for transporting multi-standard signals between different elements in a vehicle using a shared wire-based medium. The method includes: In step 1191, associating, in a vehicle 1-vehicle (FIG. 23A), a plurality of intermediate frequency (IF) slots 2-IF-1, 2-IF-2 (FIG. 23B) respectively with a plurality of signal producers 1-source-1, 1-source-2 (FIG. 23A) that are associated respectively with a plurality of wireless transmission standards. In step 1192, transporting, via a shared wire-based medium 2-WM (FIG. 23A), using the plurality of IF slots IF-1, 2-IF-2, respectively a plurality of signals 2-sig-1, 2-sig-2 (FIG. 23B) from the plurality of signal producers 1-source-1, 1-source-2 to a plurality of signal consumers 3-ant-1, 3-ant-2 (FIG. 23A). In step 1193, up-converting, by the plurality of signal consumers 3-ant-1, 3-ant-2, from the shared wire-based medium 2-WM, the plurality of signals 2-sig-1, 2-sig-2 into a respective plurality of radio-frequency (RF) signals 2-sig-r-1, 2-sig-r-2 (FIG. 23B) having respectively a plurality of RF frequency spans 2-RF-1, 2-RF-2 (FIG. 23B) associated respectively with the plurality of wireless transmission standards.

In one embodiment, at least one of the signal producers 1-source-1 is a baseband transmitter/processor operative to convert data symbols into at least one of the signals 1-sig-1 that therefore constitutes a modulated signal for transmission; at least one of the respective signal consumers 3-ant-1 comprises a mixer 3-x-a and an antenna 3-ant-1; said up-converting of the respective signal 1-sig-1 into the respective RF signal 1-sig-r-1 is done by said mixer 3-x-a; and the method further comprises: transmitting wirelessly the respective RF signal 1-sig-r-1 via said antenna 3-ant-1. In one embodiment, the baseband transmitter 1-source-1 is associated with one of: (i) a long term evolution cellular technology (LTE) transmitter, (ii) a second generation cellular technology (2G) transmitter, (iii) a third generation cellular technology (3G) transmitter, (iv) a fourth generation cellular technology (4G) transmitter, and (v) a fifth generation cellular technology (5G) transmitter. In one embodiment, the baseband transmitter 1-source-1 is associated with a vehicle-to-everything (V2X) communication standard transmitter.

In one embodiment, at least one of the signal producers comprises an antenna 3-ant-1 with a mixer 3-x-a together operative to receive a wireless input signal 2-sig-r-3 conveying data symbols and down-convert the wireless input signal into at least one of the respective signals 2-sig-3 associated with one of the IF slots 2-IF-3; at least one of the respective signal consumers comprises a receiver 1-source-1 and a second mixer 3-x-c; said up-converting of the respective signal 2-sig-3 into the respective RF signal 2-sig-r-3 is done by said second mixer 3-x-c; and the method further comprises: decoding, by the receiver 1-source-1, the data symbols present in the respective RF signal 2-sig-r-3. In one embodiment, the receiver 1-source-1 is associated with at least one of: (i) a FM radio receiver, in which the respective wireless transmission standard is a FM radio transmission standard, (ii) a digital video broadcasting terrestrial (DVB-T) receiver, in which the respective wireless transmission standard is DVB-T, (iii) an advanced television systems committee (ATSC) receiver, in which the respective wireless transmission standard is ATSC, (iv) a satellite radio receiver, (v) a digital audio broadcasting (DAB) receiver, in which the respective wireless transmission standard is DAB, and (vi) an in-band on-channel (IBOC) digital radio receiver, in which the respective wireless transmission standard is IBOC. In one embodiment, the receiver 1-source-1 is associated with one of: (i) a long term evolution cellular technology (LTE) receiver, (ii) a second generation cellular technology (2G) receiver, (iii) a third generation cellular technology (3G) receiver, (iv) a fourth generation cellular technology (4G) receiver, and (v) a fifth generation cellular technology (5G) receiver. In one embodiment, the receiver 1-source-1 is associated with a vehicle-to-everything (V2X) communication standard receiver.

One embodiment is a system operative to transport signals between different elements in a vehicle using a shared wire-based medium, comprising: a first transmission source 1-source-1 (FIG. 23A) embedded at a first location in a vehicle 1-vehicle and configured to generate a first transmission signal 2-sig-r-1 (FIG. 23B); a first converter 3-x-c co-located with the first transmission source 1-source-1; a first antenna 3-ant-1 embedded at a second location in the vehicle 1-vehicle; a second converter 3-x-a co-located with the first antenna 3-ant-1; and a shared wire-based medium 2-WM interconnecting the first converted 3-x-c and the second converter 3-x-a.

In one embodiment, the system is configured to: use the first converter 3-x-c to shift in frequency the first transmission signal 2-sig-r-1, thereby producing an intermediate-frequency (IF) version 2-sig-1 of the first transmission signal 2-sig-r-1; transport the IF version 2-sig-1 of the first signal 2-sig-r-1, via the shared wire-based medium 2-WM, from the first converter 3-x-c into the second converter 3-x-a; use the second converter 3-x-a to extract the IF version 2-sig-1 of the first signal from the shared wire-based medium 2-WM, and shift in frequency the IF version 2-sig-1 of the first signal, thereby producing a radio-frequency (RF) version 2-sig-r-1 of the first signal; and wirelessly transmit the RF version 2-sig-r-1 of the first signal via the first antenna 3-ant-1.

In one embodiment, the system further comprises: a second transmission source 1-source-2 embedded at a third location in the vehicle 1-vehicle and configured to generate a second transmission signal 2-sig-r-2; a third converter 3-x-d co-located with the second transmission source 1-source-2; a second antenna 3-ant-2 embedded at a fourth location in the vehicle 1-vehicle; and a fourth converter 3-x-b co-located with the second antenna 3-ant-2; wherein the system is further configured to: use the third converter 3-x-d to shift in frequency the second transmission signal 2-sig-r-2, thereby producing an IF version 2-sig-2 of the second signal 2-sig-r-2, in which the IF version of the second signal has a different frequency span 2-IF-2 than the IF version 2-sig-1 of the first signal, which has the frequency span 2-IF-1; transport the IF version 2-sig-2 of the second signal, via the shared wire-based medium 2-WM, from the third converter 3-x-d into the fourth converter 3-x-b, in which the IF version 2-sig-2 of the second signal coexists in the shared wire-based medium 2-WM together with the IF version 2-sig-1 of the first signal as the two signals have different frequency spans 2-IF-2, 2-IF-1; use the fourth converter 3-x-b to extract the IF version 2-sig-2 of the second signal from the shared wire-based medium 2-WM, and shift in frequency the IF version 2-sig-2 of the second signal, thereby producing a RF version 2-sig-r-2 of the second signal; and wirelessly transmit the RF version 2-sig-r-2 of the second signal via the second antenna 3-ant-2.

In one embodiment, the IF version 2-sig-2 of the second signal and the IF version 2-sig-1 of the first signal contain frequencies below 500 MHz (five hundred megahertz); and the RF version 2-sig-r-2 of the second signal and the RF version 2-sig-r-1 of the first signal contain frequencies above 500 MHz (five hundred megahertz), in which the shared wire-based medium 2-WM is better (e.g., more efficient) at transporting frequencies below 500 MHz (five hundred megahertz) than transporting frequencies above 500 MHz (five hundred megahertz).

In one embodiment, the IF version 2-sig-2 of the second signal and the IF version 2-sig-1 of the first signal contain frequencies below 1 GHz (one gigahertz); and the RF version 2-sig-r-2 of the second signal and the RF version 2-sig-r-1 of the first signal contain frequencies above 1 GHz (one gigahertz), in which the shared wire-based medium 2-WM is better (e.g., more efficient) at transporting frequencies below 1 GHz (one gigahertz) than transporting frequencies above 1 GHz (one gigahertz).

In one embodiment, the IF version 2-sig-2 of the second signal and the IF version 2-sig-1 of the first signal contain frequencies below 1.5 GHz (one point five gigahertz); and the RF version 2-sig-r-2 of the second signal and the RF version 2-sig-r-1 of the first signal contain frequencies above 1.5 GHz (one point five gigahertz), in which the shared wire-based medium 2-WM is better (e.g., more efficient) at transporting frequencies below 1.5 GHz (one point five gigahertz) than transporting frequencies above 1.5 GHz (one point five gigahertz).

In one embodiment, the second antenna 3-ant-2 and the first antenna 3-ant-1 are a same one antenna operative to transmit the RF version 2-sig-r-2 of the first signal and the RF version of the second signal 2-sig-r-1 via two different bands respectively 2-RF-1, 2-RF-2.

In one embodiment, the vehicle 1-vehicle is an on-road vehicle having a length of at least two meters; the first location and the second location are separated by at least one meter; the second location and the fourth location are associated with an exterior surface of the vehicle related to at least one of: (i) a roof of the vehicle, in which at least one of the antennas 3-ant-1, 3-ant-2 is mounted on the roof of the vehicle (e.g., as shown by 3-ant-1 and 3-ant-4), (ii) a front side of the vehicle, in which at least one of the antennas 3-ant-2 points forward, (iii) a rear side of the vehicle, in which at least one of the antennas 3-ant-1, 3-ant-2 points backwards (e.g., as shown by 3-ant-3), and (iv) a door of the vehicle, in which at least one of the antennas 3-ant-1, 3-ant-2 points sideways; and the first location and the third location are associated with internal locations in the vehicle 1-vehicle, in which the first transmission source 1-source-1 and the second transmission source 1-source-2 are either co-located at a single internal location or separated in two different internal locations in the vehicle.

In one embodiment, the system is further configured to: receive a first inbound RF signal 2-sig-r-3 via the first antenna 3-ant-1; down-convert the first inbound RF signal 2-sig-r-3, by the second converter 3-x-a, into a first inbound IF signal 2-sig-3; and transport, via the shared wired-based medium 2-WM, the first inbound IF signal 2-sig-3 from the second converter 3-x-a to a first receiver associated with the first transmission source 1-source-1.

In one embodiment, the system further comprises: a second antenna 3-ant-2 embedded at a third location in the vehicle 1-vehicle; and a third converter 3-x-b co-located with the second antenna 3-ant-2; wherein the system is further configured to: transport the IF version 2-sig-1 of the first signal, via the shared wire-based medium 2-WM, from the first converter 3-x-c into the third converter 3-x-b; use the third converter 3-x-b to extract the IF version 2-sig-1 of the first signal from the shared wire-based medium 2-WM, and shift in frequency the IF version 2-sig-1 of the first signal, thereby producing a second radio-frequency (RF) version of the first signal 2-sig-r-1; and wirelessly transmit the second RF version of the first signal 2-sig-r-1 via the second antenna 3-ant-2.

In one embodiment, the system is further configured to: measure, between and by the first converter 3-x-c and the second converter 3-x-a, a frequency response of the shared wire-based medium 2-WM; and equalize, by at least one of the second converter 3-x-a and the first converter 3-x-c, the RF version 2-sig-r-1 of the first signal using said measurement.

The following paragraphs are associated with FIG. 24A, FIG. 24B, FIG. 24C, FIG. 24D, FIG. 24E, FIG. 24F, FIG. 24G.

Figure 24A:
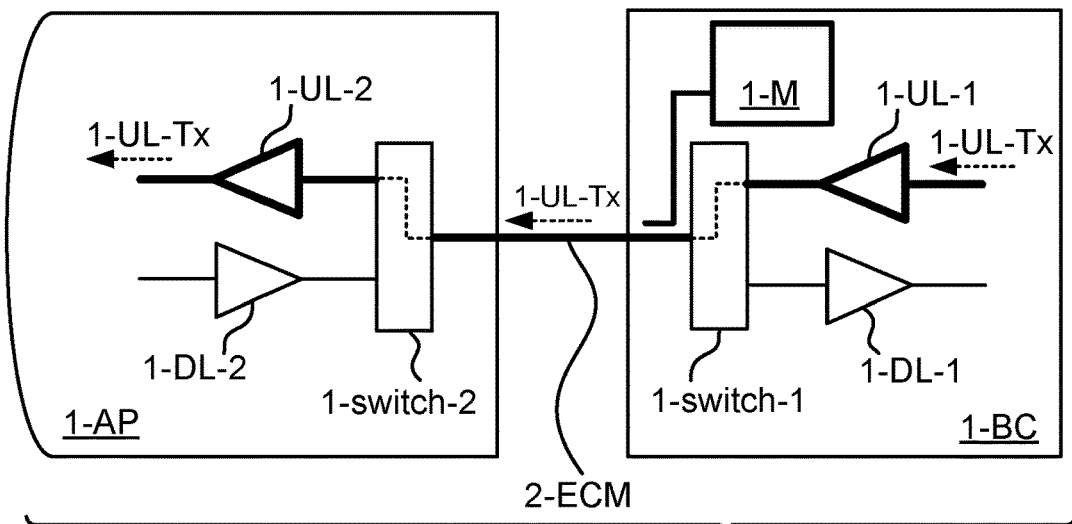
FIG. 24A illustrates one embodiment of a half-duplex transceiver in uplink reception mode and comprising two parts.
Figure 24B:
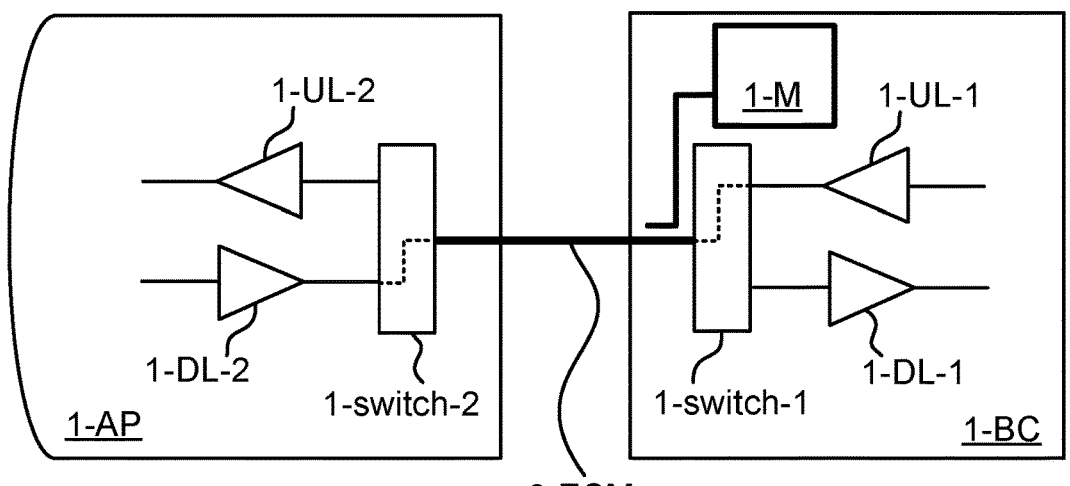
FIG. 24B illustrates one embodiment of the half-duplex transceiver sensing a transition into downlink mode.
Figure 24C:
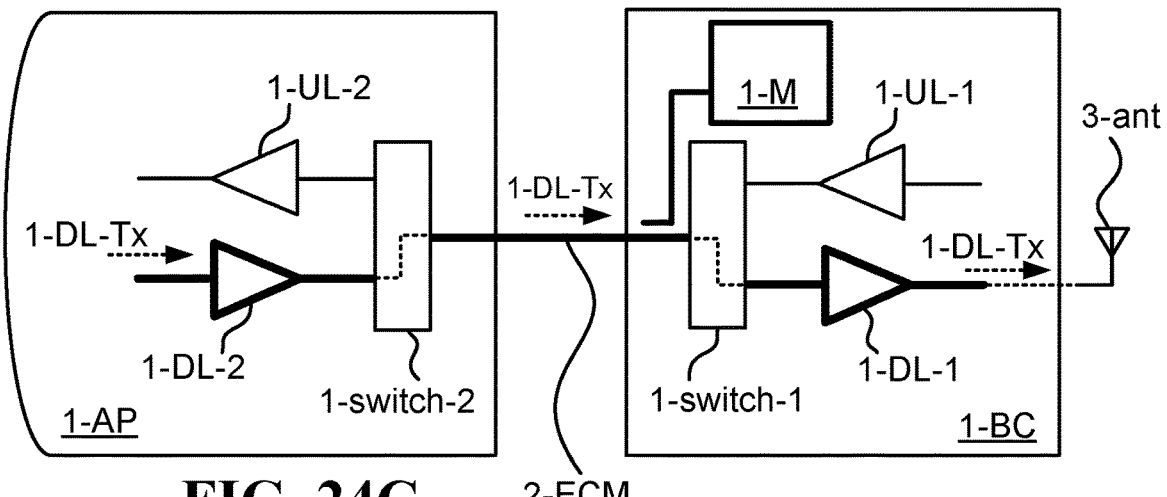
FIG. 24C illustrates one embodiment of the half-duplex transceiver in downlink transmission mode.
Figure 24D:
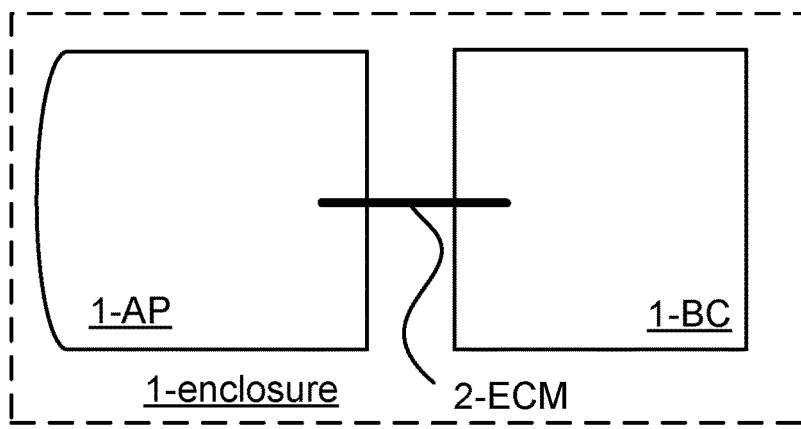
FIG. 24D illustrates one embodiment of the half-duplex transceiver comprising two parts.
Figure 24E:
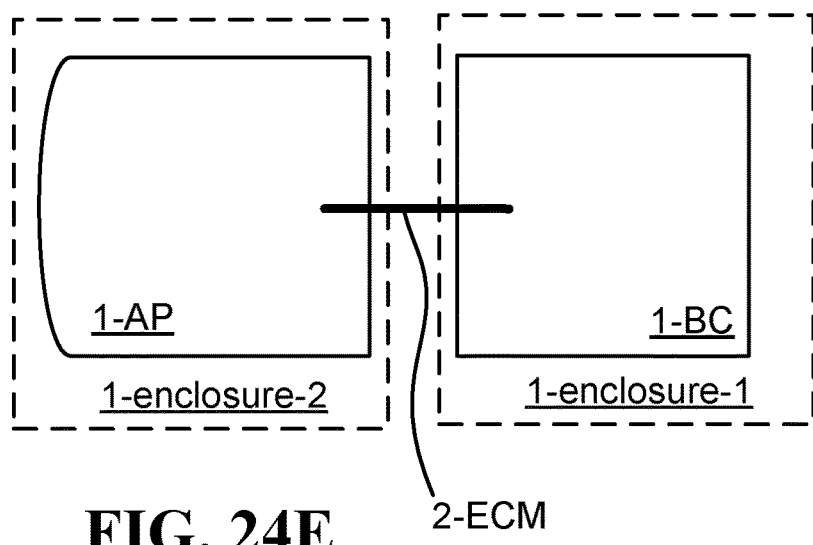
FIG. 24E illustrates one embodiment of the half-duplex transceiver comprising two parts.
Figure 24F:
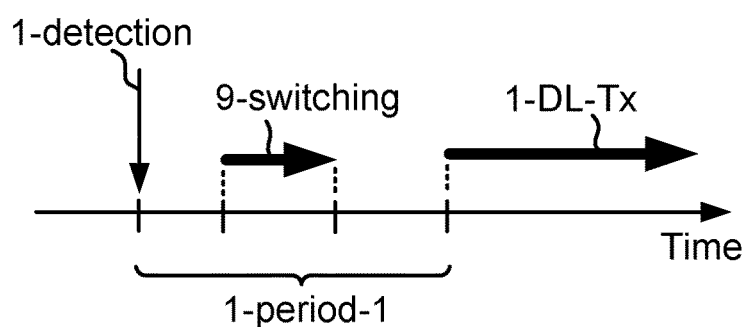
FIG. 24F illustrates one embodiment of transient properties associated with the half-duplex transceiver.
Figure 24G:
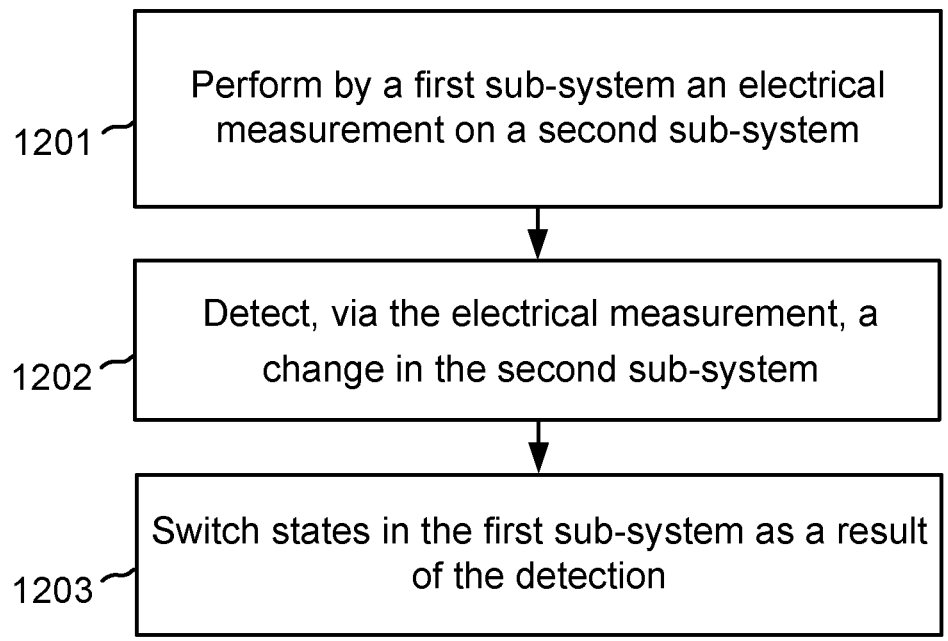
FIG. 24G illustrates one embodiment of a method for facilitating interaction between different parts of a half-duplex transceiver.

FIG. 24G illustrates one embodiment of a method for facilitating interaction between different parts of a half-duplex transceiver 1-BC-AP (FIG. 24A).

In step 1201, performing, by a first sub-system 1-BC (FIG. 24A) of a half-duplex transceiver 1-BC-AP (FIG. 24A), an electrical measurement in conjunction with a second sub-system 1-AP (FIG. 24A) of the same half-duplex transceiver, thereby monitoring, by said first sub-system 1-BC, changes in at least one electrical characteristic associated with said second sub-system 1-AP.

In step 1202, detecting 1-detection (FIG. 24F), in conjunction with the electrical measurement, by the first sub-system 1-BC, a change in the at least one electrical characteristic associated with the second sub-system 1-AP, in which such change indicates a transition of the second sub-system 1-AP from a current state of reception (FIG. 24A) into a state of transmission (FIG. 24B).

In step 1203, switching 9-switching (FIG. 24F) preemptively (FIG. 24C), as a direct result of said detection 1-detection and prior to an actual transmission 1-DL-Tx (FIG. 24C, FIG. 24F) from the second sub-system 1-AP, at least a first circuit 1-switch-1 in the first sub-system 1-BC from a first state (FIG. 24B) into a second state (FIG. 24C), in which said second sate is required to facilitate the actual transmission 1-DL-Tx in conjunction with the half-duplex transceiver 1-BC-AP as a whole.

One embodiment further comprises: receiving the actual transmission 1-DL-Tx (FIG. 24C, FIG. 24F) in the first sub-system 1-BC, from the second sub-system 1-AP, after a certain period of time 1-period-1 (FIG. 24F) following the detection 1-detection; and at least relaying, by the first sub-system 1-BC, said actual transmission received 1-DL-Tx, in which said relaying is facilitated by the switching preemptively 9-switching of at least the first circuit 1-switch-1 in the first sub-system 1-BC from the first state into the second state.

In one embodiment, said certain period of time 1-period-1 is longer than a time it takes the first sub-system 1-BC to successfully complete the switching 9-switching of the first circuit 1-switch-1 in the first sub-system from the first state into the second state, thereby further facilitating said at least relaying of the actual transmission 1-DL-Tx.

In one embodiment, the electrical measurement is associated with a voltage-standing-wave-ratio-like (VSWR-like) measurement done by the first sub-system 1-BC in conjunction with the second sub-system 1-AP of the same half-duplex transceiver 1-BC-AP; and In one embodiment, the at least one electrical characteristic associated with said second sub-system, which is monitored, is signal reflection. For example, a monitoring circuitry 1-M (FIG. 24A) inside the first sub-system 1-BC performs repeatedly the electrical measurement by sending repeatedly a signal to the second sub-system 1-AP and sensing repeatedly a reflection of that signal back from the second sub-system. When the reflection changes, then a conclusion is made that an uplink component 1-UL-2 (FIG. 24B) in the second sub-system 1-AP is no longer on-line, and that, instead, a downlink component 1-DL-2 (FIG. 24B) in the second sub-system 1-AP has been switched on-line and is ready for an actual transmission 1-DL-Tx (FIG. 24C) to begin. Consequently, the first sub-system switches on-line (FIG. 24C) a local downlink component 1-DL-1, thereby achieving the switching from the first state into the second state in anticipation of the actual transmission 1-DL-Tx.

In one embodiment, the electrical measurement is associated with a noise measurement done by the first sub-system 1-BC in conjunction with the second sub-system 1-AP of the same half-duplex transceiver; and In one embodiment, the at least one electrical characteristic associated with said second sub-system, which is monitored, is noise generation. For example, a monitoring circuitry 1-M (FIG. 24A) inside the first sub-system 1-BC performs repeatedly the electrical measurement by sensing repeatedly a noise generated by an uplink component 1-UL-2 in the second sub-system. When the noise changes, then a conclusion is made that the uplink component 1-UL-2 (FIG. 24B) in the second sub-system 1-AP is no longer on-line, and that, instead, a downlink component 1-DL-2 (FIG. 24B) in the second sub-system 1-AP has been switched on-line and is ready for an actual transmission 1-DL-Tx (FIG. 24C) to begin. Consequently, the first subsystem switches on-line (FIG. 24C) a local downlink component 1-DL-1, thereby achieving the switching from the first state into the second state in anticipation of the actual transmission 1-DL-Tx.

In one embodiment, the at least one electrical characteristic associated with said second sub-system, which is monitored, is associated with at least one of: (i) electrical capacitance, (ii) electrical inductance, (iii) electrical impedance, and/or (iv) electrical conductance.

In one embodiment, the performing of the electrical measurement, and consequently the monitoring, are done repeatedly and actively by the first sub-system 1-BC.

One embodiment is a half-duplex transceiver 1-BC-AP (FIG. 24A) operative to facilitate interaction between different parts thereof, comprising: an electrically conductive medium 2-ECM (FIG. 24A); a radio-head 1-BC (FIG. 24A) comprising: a first uplink amplifier 1-UL-1, a first downlink amplifier 1-DL-1, and a first switching circuitry 1-switch-1 currently connecting, directly or indirectly, the first uplink amplifier 1-UL-1 to the electrically conductive medium 2-ECM; a base-station 1-AP (FIG. 24A) comprising: a second downlink amplifier 1-DL-2, a second uplink amplifier 1-UL-2, and a second switching circuitry 1-switch-2 currently connecting, directly or indirectly, the second uplink amplifier 1-UL-2 to the electrically conductive medium 2-ECM, thereby creating an uplink path (FIG. 24A) comprising the first uplink amplifier 1-UL-1, the electrically conductive medium 2-ECM, and the second uplink amplifier 1-UL-2; and a monitoring circuitry 1-M (FIG. 24A, FIG. 24B) configured to: perform (FIG. 24A, FIG. 24B), via the electrically conductive medium 2-ECM, an electrical measurement to detect a change in at least one electrical characteristic associated with the base-station 1-AP, in which said change is associated with the second switching circuitry 1-switch-2 now disconnecting (FIG. 24B) the second uplink amplifier 1-UL-2 from the electrically conductive medium and connecting (FIG. 24B) the second downlink amplifier 1-DL-2 to the electrically conductive medium 2-ECM; and as a direct result of said detection: cause the first switching circuitry 1-switch-1 to disconnect (FIG. 24C) the first uplink amplifier 1-UL-1 from the electrically conductive medium 2-ECM and connect (FIG. 24C) the first downlink amplifier 1-DL-1 to the electrically conductive medium 2-ECM, thereby creating, prior to an actual downlink transmission 1-DL-Tx (FIG. 24C) by the base-station 1-AP, a downlink path (FIG. 24C) comprising the second downlink amplifier 1-DL-2, the electrically conductive medium 2-ECM, and the first downlink amplifier 1-DL-1.

In one embodiment, the radio-head 1-BC is an extension of the base-station 1-AP; and the monitoring circuitry 1-M is a component in the radio-head 1-BC.

In one embodiment, the radio-head 1-BC is co-located with the base-station 1-AP inside a single enclosure 1-enclosure (FIG. 24D).

In one embodiment, the radio-head 1-BC is located inside a first enclosure 1-enclosure-1 (FIG. 24E); and the base-station 1-AP is located inside a second enclosure 1-enclosure-2 (FIG. 24E).

In one embodiment, the base-station 1-AP is configured to transmit the actual downlink transmission 1-DL-Tx via the second downlink amplifier 1-DL-2; and the radio-head 1-BC is configured to receive (FIG. 24C) the actual downlink transmission 1-DL-Tx via the electrically conductive medium 2-ECM and the first downlink amplifier 1-DL-1; thereby making use of the downlink path.

In one embodiment, the radio-head 1-BC is associated with an antenna 3-ant (FIG. 24C); and the radio-head 1-BC is further configured to wirelessly transmit via the antenna 3-ant the actual downlink transmission received 1-DL-Tx.

In one embodiment, the antenna 3-ant (FIG. 24C, FIG. 1A) is a remote-antenna interconnected with the radio-head 1-BC (FIG. 24C, FIG. 1A) via a wire-based-medium 2-WM (FIG. 1A).

In one embodiment, wherein prior to the creation of the downlink path: the radio-head 1-BC is configured to transmit an uplink transmission 1-UL-Tx (FIG. 24A) via the first uplink amplifier 1-UL-1; and the base-station 1-AP is configured to receive the uplink transmission 1-UL-1 via the electrically conductive medium 2-ECM and the second uplink amplifier 1-UL-2; in which the downlink transmission 1-DL-Tx (FIG. 24C) and the uplink transmission 1-UL-Tx (FIG. 24A) occur at different times and are therefore mutually exclusive.

In one embodiment, the base-station 1-AP constitutes at least one of: (i) an access point such as a WiFi access point, (ii) a base-transceiver-station (BTS) such as a LTE-BTS or a 5G-BTS, and/or (iii) a wireless transceiver.

In one embodiment, the electrically conductive medium 2-ECM comprises at least one of: (i) an electrical wire, (ii) a coaxial cable, (iii) a twisted pair, (iv) an Ethernet cable, and/or (v) a conductor of a printed circuit board.

In one embodiment, the monitoring circuitry 1-M is further configured to perform the electrical measurement using frequencies outside the range of frequencies used by the half-duplex transceiver for downlink and uplink communication 1-UL-Tx, 1-DL-Tx, thereby facilitating coexistence of the electrical measurement with uplink communication 1-UL-Tx.

One embodiment is a half-duplex transceiver 1-BC-AP (FIG. 24A) operative to facilitate interaction between different parts thereof, comprising: an electrically conductive medium 2-ECM (FIG. 24C); a radio-head 1-BC (FIG. 24C) comprising: a first uplink amplifier 1-UL-1, a first downlink amplifier 1-DL-1, and a first switching circuitry 1-switch-1 currently connecting (FIG. 24C), directly or indirectly, the first downlink amplifier 1-DL-1 to the electrically conductive medium 2-ECM; a base-station 1-AP (FIG. 24C) comprising: a second downlink amplifier 1-DL-2, a second uplink amplifier 1-UL-2, and a second switching circuitry 1-switch-2 currently connecting (FIG. 24C), directly or indirectly, the second downlink amplifier 1-DL-2 to the electrically conductive medium 2-ECM, thereby creating a downlink path comprising the second downlink amplifier 1-DL-2, the electrically conductive medium 2-ECM, and the first downlink amplifier 1-DL-1; and a monitoring circuitry 1-M (FIG. 24C) configured to: perform, via the electrically conductive medium 2-ECM, an electrical measurement to detect a change in at least one electrical characteristic associated with the base-station 1-AP, in which said change is associated with the second switching circuitry 1-switch-2 now disconnecting the second downlink amplifier 1-DL-2 from the electrically conductive medium 2-ECM and connecting the second uplink amplifier 1-UL-2 to the electrically conductive medium 2-ECM; and as a direct result of said detection: cause the first switching circuitry 1-switch-1 to disconnect the first downlink amplifier 1-DL-1 from the electrically conductive medium 2-ECM and connect the first uplink amplifier 1-UL-1 to the electrically conductive medium 2-ECM, thereby creating, prior to an actual uplink transmission 1-UL-Tx (FIG. 24A), an uplink path comprising the first uplink amplifier 1-UL-1, the electrically conductive medium 2-ECM, and the second uplink amplifier 1-UL-2.

In one embodiment, the monitoring circuitry 1-M is further configured to perform the electrical measurement using frequencies outside the range of frequencies used by the half-duplex transceiver for downlink and uplink communication 1-UL-Tx (FIG. 24A), 1-DL-Tx (FIG. 24C), thereby facilitating coexistence of the electrical measurement with downlink communication 1-DL-Tx (FIG. 24C).

Figure 25A:
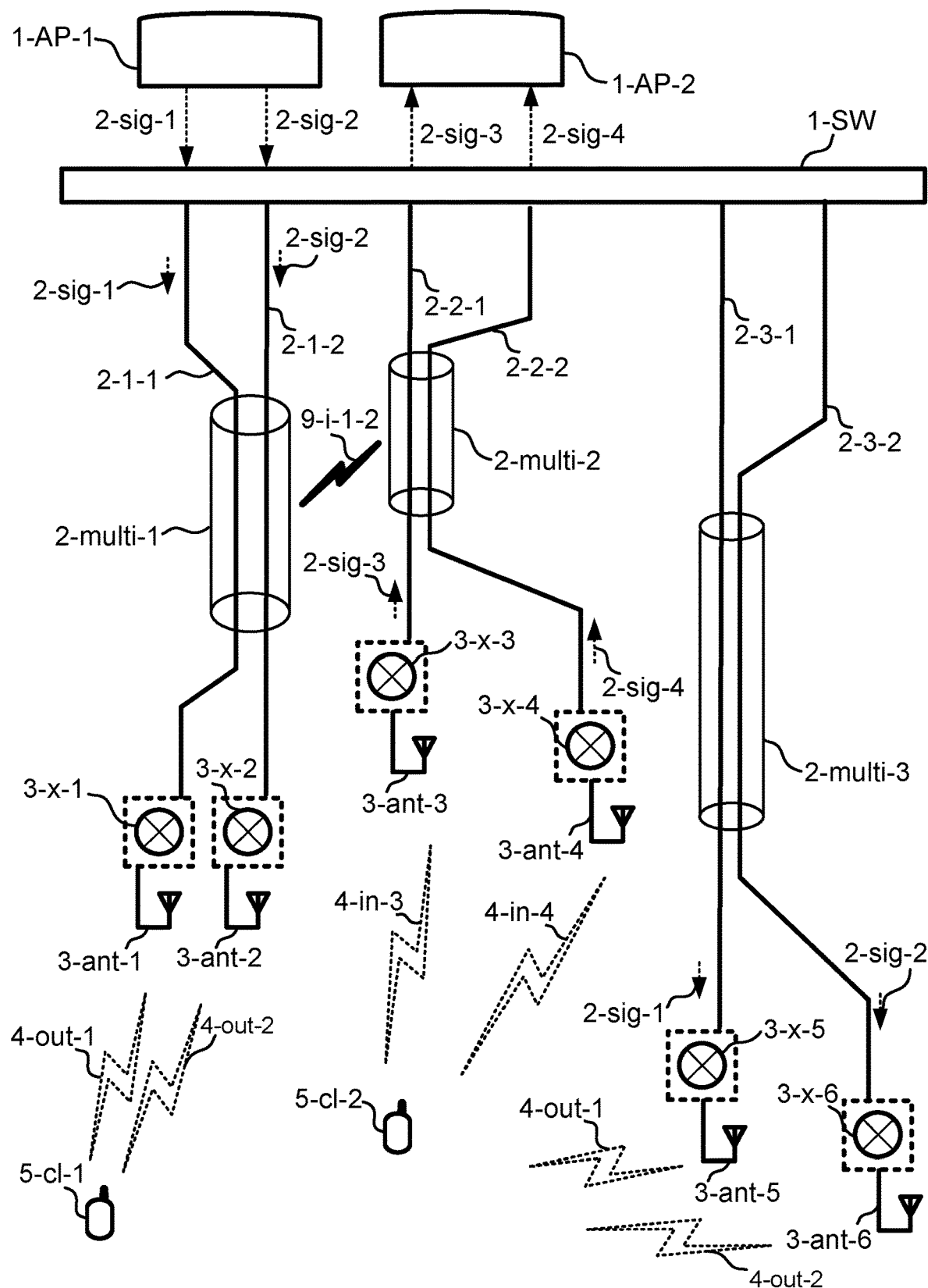
FIG. 25A illustrates one embodiment of a system operative to adapt to electromagnetic interferences induced between twisted pairs carrying signals.
Figure 25B:
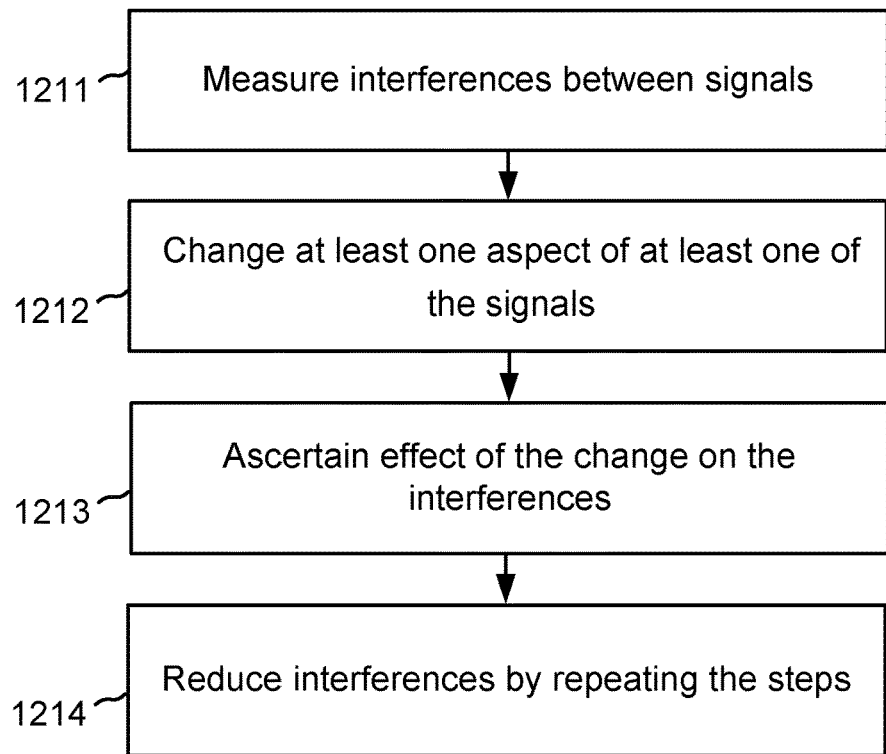
FIG. 25B illustrates one embodiment of a method for adapting to electromagnetic interferences induced between twisted pairs carrying signals.
Figure 25C:
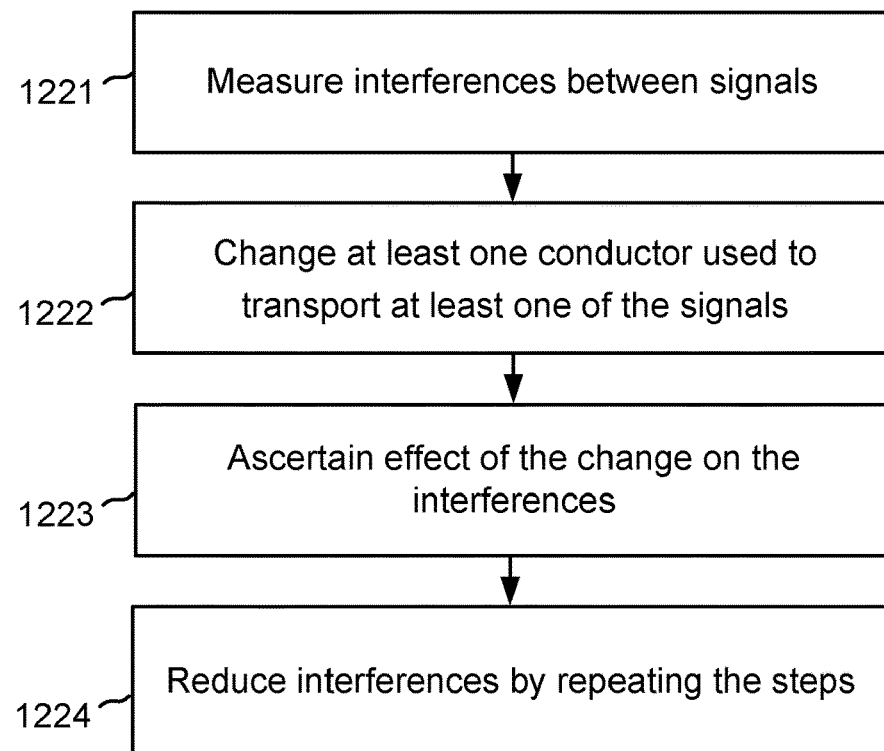
FIG. 25C illustrates one embodiment of a method for adapting to electromagnetic interferences induced between twisted pairs carrying signals.

The following paragraphs are associated with FIG. 25A, FIG. 25B, FIG. 25C.

One embodiment is a system (FIG. 25A) operative to adapt to electromagnetic interferences induced between twisted pairs carrying signals, comprising: a plurality of twisted pairs 2-1-1, 2-1-2, 2-2-1, 2-2-2, 2-3-1, 2-3-2 (FIG. 25A) that are co-located, thereby causing signals present in each of the twisted pairs to induce a uniquely respective measure of interfering signals on each of the other twisted pairs (e.g., signal 2-sig-2 present in twisted pair 2-1-2 induces 9-i-1-2 an interference on twisted pair 2-2-1 that adversely affects reception of signal 2-sig-3, FIG. 25A); and at least a first transceiver 1-AP-1 and a second transceiver 1-AP-2 (FIG. 25A), each operative to inject and receive a combination of signals having a respective combination of power levels associated with a respective combination of frequencies into/from a respective combination of twisted pairs selected from the plurality of twisted pairs (e.g., 1-AP-1 injects the signals 2-sig-1, 2-sig-2 respectively into selected twisted pairs 2-1-1, 2-1-2, in which the signals 2-sig-1, 2-sig-2 are associated with a certain respective combination of power levels and frequencies, and 1-AP-2 receives the signals 2-sig-3, 2-sig-4 respectively via selected twisted pairs 2-2-1, 2-2-2, in which the signals 2-sig-3, 2-sig-4 are associated with a respective certain combination of power levels and frequencies); wherein the system is configured to: ascertain a level of said interferences induced, via the twisted pairs, between the at least two combinations of signals of the at least two transceivers (e.g., ascertain the interferences induced 9-i-1-2 via twisted pairs 2-1-2, 2-2-2 between the signals 2-sig-2 and 2-sig-3); and change, according to a certain criterion, at least one of: (i) the combination of power levels for at least one of the transceivers (e.g., reduce the power level at which 1-AP-1 generates signal 2-sig-2), (ii) the combination of frequencies for at least one of the transceivers (e.g., change the frequency span/offset of 2-sig-3), and/or (iii) the combination of twisted pairs selected for at least one of the transceivers (e.g., cause 1-AP-2 to stop using twisted pairs 2-2-1, 2-2-2, and instead start using twisted pairs 2-3-1, 2-3-2), until reducing said level of interferences induced to below a certain threshold.

In one embodiment, the system further comprises a plurality of converters 3-x (FIG. 25A) electrically connected to the plurality of twisted pairs 2-1-1, 2-1-2, 2-2-1, 2-2-2, 2-3-1, 2-3-2; and the system is further configured to receive, in each of a combination of converters connected respectively to the combination of twisted pairs selected for the respective transceiver, the combination of signals of that respective transceiver, and re-transmit wirelessly, from the respective combination of converters, the combination of signals received (e.g., the converters 3-x-1, 3-x-2 receive the signals 2-sig-1, 2-sig-2 from transceiver 1-AP-1, respectively via twisted pairs 2-1-1, 2-1-2, and then re-transmit the signals received as wireless signals 4-out-1, 4-out-2 respectively via antennas 3-ant-1, 2-ant-2); in which the wireless re-transmissions are operative to cause different levels of additional interferences in conjunction with the twisted pairs, and the system is further configured to factor in the different levels of additional interferences in conjunction with said changes.

In one embodiment, the system is further configured to set said certain threshold according to the different levels of additional interferences, in which strong additional interferences allows for a higher threshold to be tolerated, and a lack of additional interferences dictates a lower threshold to be achieved.

In one embodiment, the system is further configured to set said certain threshold according to a level of traffic associated with at least one of the transceivers 1-AP-1, 1-AP-2, in which lower levels of traffic allow for a higher threshold to be tolerated, and higher levels of traffic dictate a lower threshold to be achieved.

In one embodiment, said power levels change comprises decreasing a power level of at least one of the signals (e.g., 2-sig-2) in the respective combination from a first level to a second lower level, thereby reducing said level of interferences induced to below the certain threshold.

In one embodiment, said first level is above 0 (zero) dBm, and said second level is below −20 (minus twenty) dBm.

In one embodiment, said first level is above 20 (twenty) dBm, and said second level is below 0 (zero) dBm.

In one embodiment, at least one of the signals (e.g., 2-sig-2) of the first transceiver 1-AP-1 spans at least some specific frequencies that are also spanned by at least one of the signals (e.g., 2-sig-3) of the second transceiver 1-AP-2, and therefore the certain level of induced interferences is above the certain threshold; and said frequency change comprises switching at least one of the signals (e.g., 2-sig-2) to a frequency range not comprising the specific frequencies, thereby achieving said reduction of level of interferences induced to below the certain threshold.

In one embodiment, at least a specific one of the twisted pairs (e.g., 2-1-2) in the combination of the first transceiver 1-AP-1 is closer, than a currently unused twisted pair (e.g., 2-3-2), to at least a specific one of the twisted pairs (e.g., 2-2-1) in the combination of the second transceiver 1-AP-2, in which said change comprises halting, by the first transceiver 1-AP-1, injection of one of the respective signals 2-sig-2 into said specific one of the twisted pairs 2-1-2, and starting, by the first transceiver, injection of that respective signal 2-sig-2 into the currently unused twisted pair 2-3-2, thereby achieving said reduction of level of interferences induced to below the certain threshold.

In one embodiment, the system further comprises an electrical switching matrix 1-SW (FIG. 25A); in which said halting and starting is done automatically using the switching matrix.

In one embodiment, said halting and starting is done by respectively first manually disconnecting the first transceiver 1-AP-1 from the specific one of the twisted pairs 2-1-2, and then manually reconnecting the first transceiver to the unused twisted pair 2-3-2.

In one embodiment, said interferences induced are associated with at least a first signal (e.g., 2-sig-2) transmitted by the first transceiver 1-AP-1 interfering with at least a second signal (e.g., 2-sig-3) received by the second transceiver 1-AP-2; said second signal received 2-sig-3 is associated with a quadrature-amplitude-modulation (QAM) having a bandwidth of between 5 (five) megahertz (MHz) and 100 (one hundred) megahertz (MHz); said certain threshold is below −70 (minus seventy) dBm in conjunction with a first level of performance; said certain threshold is below −80 (minus eighty) dBm in conjunction with a second better level of performance; and said certain threshold is below −90 (minus ninety) dBm in conjunction with a third still better level of performance.

In one embodiment, at least one of the signals 2-sig-1, 2-sig-2, 2-sig-3, 2-sig-4 of one of the combinations is associated with a communication standard related to at least one of: (i) WiFi, (ii), LTE, and/or (iii) 5G.

In one embodiment, the combination of signals associated with at least one of the transceivers (e.g., the combination 2-sig-1, 2-sig-2 associated with 1-AP-1) is associated with a multiple-input-multiple-output (MIMO) transmission/reception.

In one embodiment, said changes are done randomly until reducing said level of interferences induced to below the certain threshold, in which said certain criterion is a random criterion.

In one embodiment, said changes are done consecutively until converging to said level of interferences below the certain threshold, in which said certain criterion is associated with predicting which change to try next is expected to yield best results.

FIG. 25A also illustrates multi-conductor cables 2-multi (e.g., 2-multi-1, 2-multi-2, 2-multi-3), antennas 3-ant (e.g., 3-ant-1, 3-ant-2, 3-ant-3, 3-ant-4, 3-ant-5, 3-ant-6), mixers 3-x (e.g., 3-x-1, 3-x-2, 3-x-3, 3-x-4, 3-x-5, 3-x-6), wireless input signals 4-in (e.g., 4-in-3, 4-in-4), and client devices 5-cl (e.g., 5-cl-1, 5-cl-2).

One embodiment is a method (FIG. 25B) for adapting to electromagnetic interferences induced between twisted pairs carrying signals.

In step 1211, measuring interferences induced 9-i-1-2 (FIG. 25A) between twisted pairs 2-1-1, 2-1-2, 2-2-1, 2-2-2, 2-3-1, 2-3-2 carrying signals 2-sig-1, 2-sig-2, 2-sig-3, 2-sig-4 in which the signals belong to a plurality of transceivers 1-AP-1, 1-AP-2.

In step 1212, the method includes changing at least one aspect of at least one of the signals.

In step 1213, the method includes ascertaining the effect of said changing on said interferences induced.

In step 1214, the method includes reducing, eventually, using trial and error in conjunction with said changing and ascertaining, said interferences induced to below a certain threshold level.

In one embodiment, said aspect is a frequency span. In one embodiment, said aspect is a power level.

One embodiment is a method (FIG. 25C) for adapting to electromagnetic interferences induced between twisted pairs carrying signals, comprising:

In step 1221, the method includes measuring interferences induced 9-i-1-2 (FIG. 25A) between twisted pairs 2-1-1, 2-1-2, 2-2-1, 2-2-2, 2-3-1, 2-3-2 carrying signals 2-sig-1, 2-sig-2, 2-sig-3, 2-sig-4 in which the signals belong to a plurality of transceivers 1-AP-1, 1-AP-2.

In step 1222, the method includes changing at least one twisted pair (e.g., 2-1-2) used by one of the transceivers (e.g., 1-AP-1) with another twisted pair (e.g., 2-3-2).

In step 1223, the method includes ascertaining the effect of said changing on said interferences induced.

In step 1224, the method includes reducing, eventually, using trial and error in conjunction with said changing and ascertaining, said interferences induced to below a certain threshold level.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor, but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A method for improving reception using macro-diversity transmissions, comprising:
   converting a plurality of streams associated with spatial multiplexing into a plurality of intermediary frequency (IF) signals;
   transmitting the plurality of IF signals at least twice: a first time respectively over a plurality of conductors belonging to a first multi-conductor cable reaching a first location, and a second time respectively over a plurality of conductors belonging to a second multi-conductor cable reaching a second location;
   shifting, at the first location, the plurality of IF signals respectively into a first plurality of output signals each occupying a single wireless frequency range, and transmitting the first plurality of output signals respectively over a first plurality of antennas; and
   shifting, at the second location, the plurality of IF signals respectively into a second plurality of output signals each occupying the single wireless frequency range, and transmitting the second plurality of output signals respectively over a second plurality of antennas, in which the first plurality of output signals transmitted wirelessly and the second plurality of output signals transmitted wirelessly, all occupying the single wireless frequency range, are combined wirelessly at different spatial locations so as to create macro-diversity in conjunction with the spatial multiplexing.

2. The method of claim 1, wherein the first and second multi-conductor cables are multi-paired cables.

3. The method of claim 2, wherein the multi-paired cables are category 5 cables (CAT5).

4. The method of claim 1, wherein the plurality of streams are formed together from a plurality of independent data streams as part of a conversion process associated with the spatial multiplexing, in which a first client device decodes the plurality of independent data streams from the output signals combined and in conjunction with said macro-diversity.

5. The method of claim 4, wherein the first plurality of output signals and the second plurality of output signals are orthogonal frequency-division multiplexing (OFDM) and/or orthogonal frequency-division multiple access (OFDMA), in which a plurality of sub-carriers in the first plurality of output signals and the second plurality of output signals facilitate said macro-diversity in conjunction with the spatial multiplexing.

6. The method of claim 4, wherein said formation of the plurality of streams comprises generating each of the streams from a linear combination of at least two of the plurality of independent data streams, in accordance with said spatial multiplexing.

7. The method of claim 1, wherein the plurality of streams are generated by an access point.

8. The method of claim 7, wherein the access point is a WiFi access point supporting at least partly a standard associated with IEEE 802.11 in which the spatial multiplexing in conjunction with plurality of streams is part of the standard.

9. The method of claim 8, wherein the standard associated with IEEE 802.11 includes IEEE 802.11n and/or IEEE 802.11ac.

10. The method of claim 8, wherein each of the plurality of IF signals has a bandwidth that is either 20 Mhz, 40 Mhz, 80 Mhz, or 160 MHz.

11. The method of claim 10, wherein each of the plurality of IF signals has a center frequency located below 1 Ghz.

12. The method of claim 8, wherein the single wireless frequency range is located in either a 2.4 Ghz band or a 5 Ghz band.

13. The method of claim 7, wherein the access point is an LTE access point or an LTE base-station supporting at least partly a standard associated with LTE, in which the spatial multiplexing in conjunction with the plurality of streams is part of the standard.

14. The method of claim 4, wherein the first client device is located in a first room during said decoding and in conjunction with said macro-diversity.

15. The method of claim 14, wherein the first client device is located in a second room after being located in the first room and still in conjunction with said macro-diversity.

16. The method of claim 4, wherein a second client device is located in a second room and decodes the plurality of independent data streams from the output signals combined and in conjunction with said macro-diversity.

17. A system operative to improve reception using macro-diversity transmissions, comprising:
   at least two converters; and
   an access point operative to:
      convert a plurality of streams associated with spatial multiplexing into a plurality of intermediary frequency (IF) signals, and transmit the plurality of IF signals at least twice: a first time respectively over a plurality of conductors belonging to a first multi-conductor cable reaching a first location, and a second time respectively over a plurality of conductors belonging to a second multi-conductor cable reaching a second location;

wherein the system is configured to:
shift, at the first location, using one of the converters, the plurality of IF signals respectively into a first plurality of output signals each occupying a single wireless frequency range, and transmit the first plurality of output signals respectively over a first plurality of antennas, and shift, at the second location, using another one of the converters, the plurality of IF signals respectively into a second plurality of output signals each occupying the single wireless frequency range, and transmitting the second plurality of output signals respectively over a second plurality of antennas, in which the first plurality of output signals transmitted wirelessly and the second plurality of output signals transmitted wirelessly, all occupying the single wireless frequency range, are combined wirelessly at different spatial locations so as to create macro-diversity in conjunction with the spatial multiplexing.

* * * * *